(12) United States Patent
Murakami et al.

(10) Patent No.: US 11,350,146 B2
(45) Date of Patent: *May 31, 2022

(54) CONTENT TRANSMISSION METHOD AND CONTENT PLAYBACK METHOD

(71) Applicant: Panasonic Intellectual Property Corporation of America, Torrance, CA (US)

(72) Inventors: Yutaka Murakami, Kanagawa (JP); Tomohiro Kimura, Osaka (JP)

(73) Assignee: PANASONIC INTELLECTUAL PROPERTY CORPORATION OF AMERICA, Torrance, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/160,738

(22) Filed: Jan. 28, 2021

(65) Prior Publication Data

US 2021/0152861 A1 May 20, 2021

Related U.S. Application Data

(63) Continuation of application No. 15/942,845, filed on Apr. 2, 2018, now Pat. No. 10,945,010, which is a
(Continued)

(30) Foreign Application Priority Data

Oct. 31, 2013 (JP) .................................. 2013-227397
Jan. 7, 2014 (JP) .................................. 2014-000902

(51) Int. Cl.
*H04N 21/242* (2011.01)
*H04H 20/18* (2008.01)
(Continued)

(52) U.S. Cl.
CPC .......... *H04N 21/242* (2013.01); *H04H 20/18* (2013.01); *H04N 21/2381* (2013.01); *H04N 21/462* (2013.01); *H04N 21/4622* (2013.01)

(58) Field of Classification Search
CPC .... H04N 21/237; H04N 21/30; H04N 21/232; H04N 21/234327
See application file for complete search history.

(56) References Cited

U.S. PATENT DOCUMENTS 8,516,333 B1    8/2013  Dave
8,656,261 B2    2/2014  Lee
(Continued)

FOREIGN PATENT DOCUMENTS

CN    101702667       5/2010
GB    2 440 979 A     2/2008
(Continued)

OTHER PUBLICATIONS

Extended European Search Report dated Apr. 15, 2020 in corresponding European Patent Application No. 19217026.4.
(Continued)

*Primary Examiner* — Chenea Davis
(74) *Attorney, Agent, or Firm* — Wenderoth, Lind & Ponack, L.L.P.

(57) ABSTRACT

Provided is a method for transmitting a broadcasting content and a line content, the broadcasting content and the line content being synchronously displayed, the method including: generating a line parity packet from a plurality of line data packets in each of which the line content is stored; transmitting the line data packet and the line parity packet through a communication line; and transmitting a plurality of broadcasting data packets in each of which the broadcasting content is stored, from a base station using a broadcasting wave, a transfer clock time of the broadcasting
(Continued)

content being delayed by a predetermined time compared with a transfer clock time of the line content. At this point, video quality can be improved when the real-time broadcasting program content and the real-time line content are simultaneously displayed.

3 Claims, 57 Drawing Sheets

Related U.S. Application Data continuation of application No. 15/134,409, filed on Apr. 21, 2016, now Pat. No. 9,967,602, which is a continuation of application No. PCT/JP2014/005437, filed on Oct. 28, 2014.

(51) Int. Cl.
*H04N 21/2381* (2011.01)
*H04N 21/462* (2011.01)

(56) References Cited

U.S. PATENT DOCUMENTS

| | | |
|---|---|---|
| 2005/0111371 A1 | 5/2005 | Miura et al. |
| 2005/0229074 A1 | 10/2005 | Chawla et al. |
| 2005/0249240 A1 | 11/2005 | Boyce |
| 2009/0222709 A1 | 9/2009 | Lin et al. |
| 2011/0060974 A1 | 3/2011 | Viger |
| 2011/0093762 A1 | 4/2011 | Kwon et al. |
| 2011/0305213 A1 | 12/2011 | Löhr et al. |
| 2012/0192039 A1 | 7/2012 | Hannuksela |
| 2013/0136208 A1 | 5/2013 | Murakami et al. |
| 2014/0075472 A1 | 3/2014 | Mitsuya et al. |
| 2014/0214967 A1 | 7/2014 | Baba et al. |
| 2015/0067521 A1 | 3/2015 | Heo |

FOREIGN PATENT DOCUMENTS

| | | |
|---|---|---|
| JP | H10-178419 A | 6/1998 |
| JP | 2008-060761 | 3/2008 |
| JP | 2012-120140 | 6/2012 |
| JP | 2012-129579 | 7/2012 |
| JP | 2013-9343 | 1/2013 |
| JP | 2013-009358 | 1/2013 |
| WO | 2012/161129 | 11/2012 |
| WO | 2013/031556 | 3/2013 |

OTHER PUBLICATIONS

Seferoglu et al., "Congestion State-Based Dynamic FEC Algorithm for Media Friendly Transport Layer," IEEE, 2009, XP031483138, pp. 1-10.

International Search Report of PCT application No. PCT/JP2014/005437 dated Jan. 27, 2015.

Masaru Takechi et al., "Hybridcast o Sasaeru Gijutsu", NHK Science and Technical Research Laboratories R&D Report, May 2012, No. 133, pp. 20-27 (Whole Sentence Translation).

Wataru Kameyama et al., "MPEG-1/MPEG-2/MPEG-4 Digital Hoso Kyokasho", vol. 1, 1st edition, IDG Japan, Inc.,Feb. 2003, pp. 297-299, 307-309 (Partial Translation).

Extended European Search Report dated Jul. 19, 2016 in related European Application No. 14858136.6.

Fujisawa et al., "HybridCast; Advanced Hybrid Broadcast and Broadband System", International Broadcasting Conference 2012; Sep. 12, 2012-Sep. 17, 2012; Amsterdam, Sep. 12, 2012, XP030082407.

Akitsugu Baba et al., "Seamless, Synchronous, and Supportive: Welcome to HybridCast: An advanced hybrid broadcast and broadband system", IEEE Consumer Electronics Magazine, Mar. 2012.

Office Action with Search Report dated Jul. 4, 2018 in corresponding Chinese Patent Application No. 201480055236.3, with English-language translation of Search Report.

Extended European Search Report dated Apr. 4, 2022 in European patent application No. 21204307.9, 10 pages.

Gómez-Barquero et al., "A Novel Physical Layer Split FEC Scheme for Long Time Interleaving With Fast Zapping Support", IEEE Transactions On Broadcasting, IEEE Service Center, Piscataway, NJ, US, vol. 58, No. 2, Jun. 1, 2012, pp. 269-276, XP011444587, 8 pages.

CONTENT TRANSMISSION METHOD AND CONTENT PLAYBACK METHOD

BACKGROUND

1. Technical Field

The present disclosure relates to a packet transmission method, a content playback method, a packet transmission system, and a terminal device. For example, the present disclosure relates to a packet transmission method, a packet transmission system, and a terminal device for transferring good quality video information in a broadcasting and communication cooperation service.

2. Description of the Related Art

The broadcasting and communication cooperation service is developed as a new approach. The broadcasting and communication cooperation service is one in which a broadcasting program content transmitted from a broadcasting station and a content (hereinafter referred to as a "line content", although there are other names) distributed by a service provider through an telecommunications line such as the Internet are cooperated with each other, namely, "the terminal device receives the broadcasting program content and the line content".

PTL 1 discloses a method for distributing the real-time broadcasting program content and the real-time line content to the terminal device in providing the service.

CITATION LIST

Patent Literatures

PTL 1: International Patent Publication No. 2013/031556
PTL 2: Unexamined Japanese Patent Publication No. 2012-120140
PTL 3: Unexamined Japanese Patent Publication No. 2012-129579

SUMMARY

In one general aspect, the techniques disclosed here feature a method for transmitting a broadcasting content and a line content, the broadcasting content and the line content being synchronously displayed, the method including: generating a line parity packet from a plurality of line data packets in each of which the line content is stored; transmitting the line data packet and the line parity packet through a communication line; and transmitting a plurality of broadcasting data packets in each of which the broadcasting content is stored, from a base station using a broadcasting wave, a transfer clock time of the broadcasting content being delayed by a predetermined time compared with a transfer clock time of the line content.

These general and specific aspects may be implemented by any combination of a system, a device and a method.

Further advantages and effects of one aspect of the present disclosure will be apparent from the description and drawings. The advantages and/or effects are provided by the characteristics described in some exemplary embodiments, the description, and all the advantages and/or effects need not to be provided in order to obtain the drawings, but at least one identical characteristic.

Figure 1:
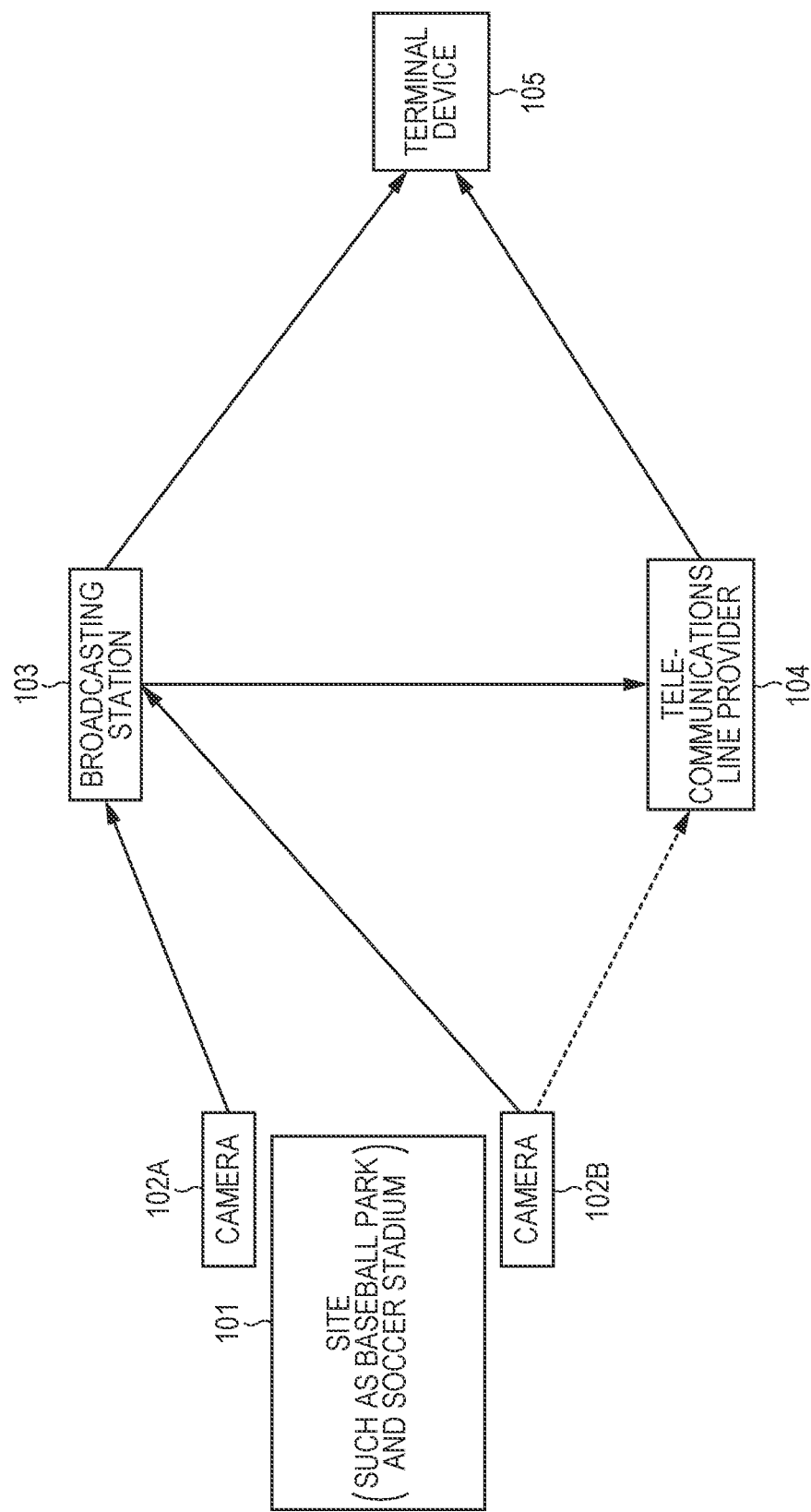
FIG. 1 is a view illustrating an example of a relationship among a broadcasting station, an telecommunications line provider, and a terminal device.

DETAILED DESCRIPTION (Underlying Knowledge Forming Basis of the Present Disclosure)

There is a demand that the terminal device receives the real-time broadcasting program content and the real-time line content with high quality. For the line content, in the terminal device, there is a high possibility that a packet delay and packet missing (packet loss) becomes troublesome. This point will be described below.

It is considered that the terminal device receives the real-time broadcasting program content and the real-time line content to display the contents on a display part included in the terminal device or a display device connected to the terminal device. The terminal device separately displays the real-time broadcasting program content and the real-time line content. In the case that the line content is displayed, the terminal device can control the video display in consideration of the packet delay and packet loss of the line content.

In the case that the real-time broadcasting program content and the real-time line content are simultaneously displayed on the display (or display device), it is necessary for the terminal device to deal with some situations when the video of the broadcasting program content and the video of the line content are temporally synchronized with each other.

The case that the broadcasting station transfers the real-time broadcasting program content to the terminal device will be described below. The broadcasting station transmits the broadcasting program content in one of a wireless manner (such as terrestrial digital broadcasting and satellite digital broadcasting) and a wired manner (such as cable broadcasting). Sometimes quality of a broadcasting program content is degraded depending on a situation of a propagation path. In order to overcome the quality degradation, the broadcasting station maintains the quality of the broadcasting program content at a high level by introducing an error correction code in order to deal with a poor situation of the propagation path. A situation in which information about the broadcasting program content arrives partially with a delay is out of the present disclosure.

On the other hand, in the case that a protocol such as a UDP (User Datagram Protocol) is used in the line content transferred to the terminal device through the telecommunications line, the quality of the line content is degraded due to the packet delay and the packet missing (packet loss). In the case that the real-time broadcasting program content and the real-time line content are simultaneously displayed on the display (or display device), it is necessary for the terminal device to deal with some situations when the video of the broadcasting program content and the video of the line content are temporally synchronized with each other.

For example, the terminal device delays the video display of the real-time broadcasting program content in consideration of an arrival delay of a packet of the line content. It is necessary to provide a storage of data for the arrival delay in the terminal device, which results in a problem in that a system scale of the terminal device increases.

When the terminal device displays the video of the line content in synchronization with the video display of the real-time broadcasting program content, there is a high possibility of largely disturbing the video of the line content due to the packet delay or packet missing of the line content.

An object of the present disclosure is to provide a transmission system and a terminal device for reducing system scales thereof and for displaying the high-quality video in simultaneously displaying the real-time broadcasting program content and the real-time line content on the display (or display device).

In the method of the present disclosure, the terminal device can start the decoding of the line content by receiving at least the numbers of line data packets and line parity packets, so that the quality of the line content, which is transferred through the communication line in which possibly the packet delay or the packet missing is generated, can be improved. The transfer clock time of the broadcasting content is delayed by a predetermined time compared with the transfer clock time of the line content. Therefore, a capacity of a storage in which the broadcasting content is temporarily stored can be reduced in the terminal device of the reception side compared with the case that the transfer clock time of the broadcasting content is not delayed relative to the transfer clock time of the line content.

Hereinafter, exemplary embodiments of the present disclosure will be described with reference to the drawings.

First Exemplary Embodiment

FIG. 1 illustrates an example of a relationship among a broadcasting station, an telecommunications line provider, and a terminal device in a first exemplary embodiment. Referring to FIG. 1, cameras 102A and 102B perform photographing at different angles in site 101 such as a baseball park and a soccer stadium.

Broadcasting station 103 receives "first video and/or audio information" photographed with camera 102A, and transfers "first video and/or audio information" to terminal device 105 in a wired manner such as a cable or a wireless manner.

Broadcasting station 103 receives "second video and/or audio information" photographed with camera 102B, and transmits "second video and/or audio information" to terminal device 105 through telecommunications line provider 104.

Alternatively, "second video and/or audio information" may directly be transferred to telecommunications line provider 104 with no use of broadcasting station 103, and then transferred to terminal device 105.

Figure 2:
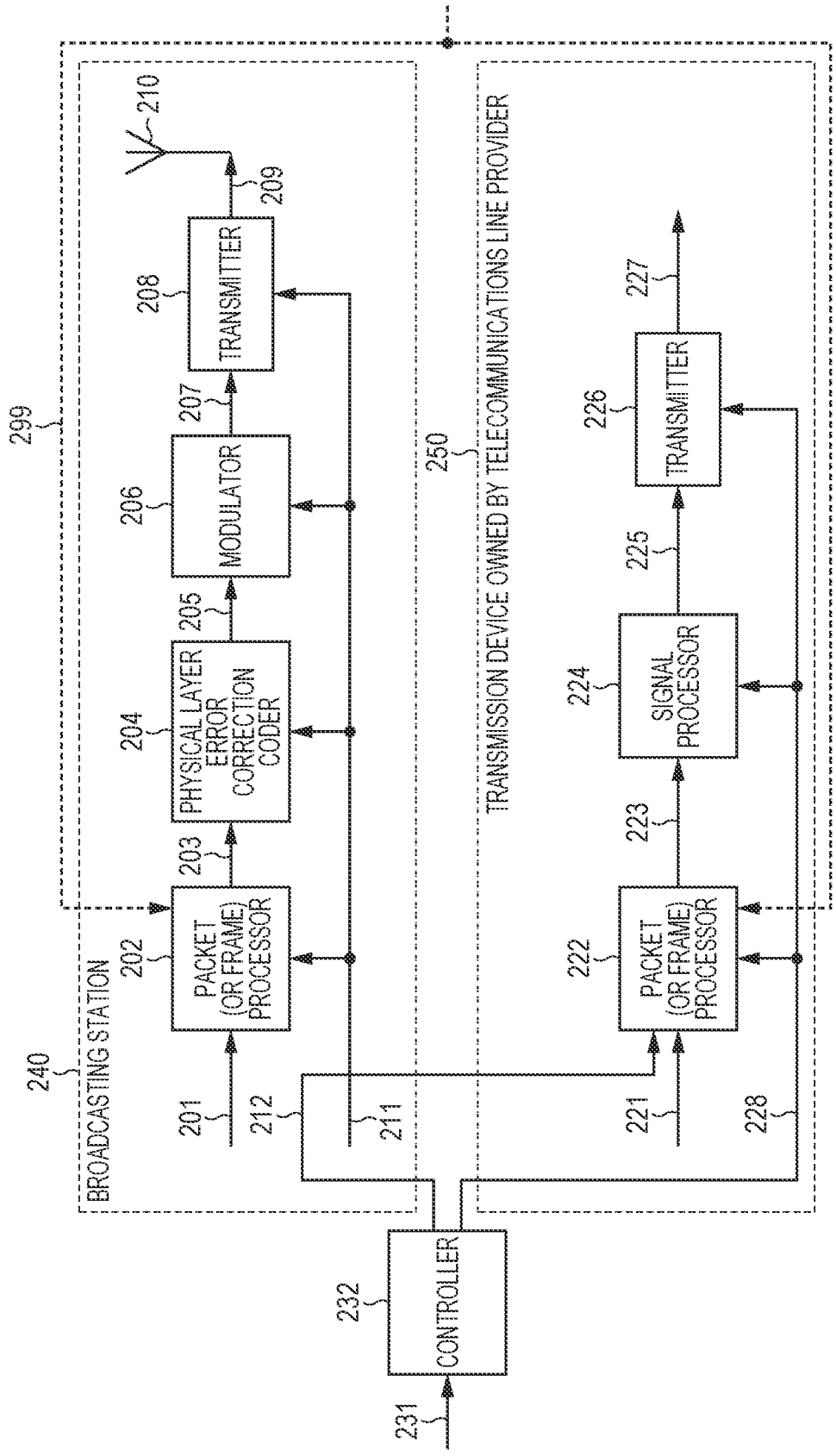
FIG. 2 is a view illustrating configuration examples of the broadcasting station and a transmission device owned by the telecommunications line provider.

FIG. 2 illustrates configuration examples of broadcasting station 240 and transmission device owned by the telecommunications line provider 250 in the present embodiment. Controller 232 may be provided independently of broadcasting station 240 and the transmission device owned by telecommunications line provider 250, included in the broadcasting station 240, or included in the transmission device owned by telecommunications line provider 250. FIG. 2 illustrates the configuration in which controller 232 is provided independently of the broadcasting station and the transmission device.

"First video and/or audio information" 201 and first control signal 211 are input to packet (or frame) processor 202, and packet (or frame) processor 202 performs packet (or frame) processing according to first control signal 211, and outputs first video and/or audio information 203 after the packet (or frame) processing. The detailed operation is described later.

First video and/or audio information 203 after the packet (or frame) processing and first control signal 211 are input to physical layer error correction coder 204, and physical layer error correction coder 204 performs coding of an error correction code scheme (specific error correction code and code rate) according to first control signal 211, and outputs error-correction-coded data 205.

Error-correction-coded data 205 and first control signal 211 are input to modulator 206, and modulator 206 performs modulation according to a modulation scheme pursuant to first control signal 211, and outputs baseband signal 207.

Baseband signal 207 and first control signal 211 are input to transmitter 208, and transmitter 208 performs signal processing based on a transfer method pursuant to first control signal 211, and outputs modulated signal 209 as a radio wave from antenna 210. The data transferred by modulated signal 209 is delivered to the terminal device.

In the description, one modulated signal is transmitted by way of example. Alternatively, a transmission method, disclosed in PTLs 1 and 2, for transmitting the plurality of modulated signals at the same time and the same frequency using the plurality of antennas may be adopted. Examples of the transfer methods include a single carrier scheme, a multi-carrier scheme such as an OFDM (orthogonal frequency division multiplexing) scheme, and a spread spectrum communication scheme. In FIG. 2, broadcasting station 240 performs the wireless transfer by way of example. Alternatively, a wired transfer method such as a cable may be adopted.

Second video and/or audio information 231 are input to controller 232, and controller 232 outputs second video and/or audio information 212 and second control signal 228. Second control signal 228 includes information about the transmission method. Second video and/or audio information 212 is transmitted through broadcasting station 240.

Second video and/or audio information 212, second video and/or audio information 221 directly delivered to the telecommunications line provider, and second control signal 228 are input to packet (or frame) processor 222. Packet (or frame) processor 222 selects effective second video and/or audio information from second video and/or audio information 212 and second video and/or audio information 221 using second control signal 228, performs packet (or frame) processing, and outputs second video and/or audio information 223 after the packet (or frame) processing. The detailed operation is described later.

Second video and/or audio information 223 after the packet (or frame) processing and second control signal 228 are input to signal processor 224, and signal processor 224 performs processing on each layer (such as an MAC (Media Access Control) layer and a physical layer) based on second control signal 228, and outputs signal 225 after the signal processing.

Signal 225 after the signal processing and second control signal 228 are input to transmitter 226, and transmitter 226 generates transmission signal 227 based on second control signal 228, and outputs transmission signal 227. The data transferred by transmission signal 227 is delivered to the terminal device.

The data transferred by transmission signal 227 may be delivered to the terminal device by applying another transmission scheme and standard. Examples of the transmission scheme and standard includes wireless LAN (Local Area Network), PLC (Power Line Communications), a wireless transfer scheme in which millimeter wave is used, a cellular scheme (cellular communication system), and a wireless MAN (Metropolitan Area Network). However, an internet protocol is generally used in the data transferred by transmission signal 227, and a TCP (transmission Control Protocol) or a UDP (User Datagram Protocol) is used as a transfer protocol (the TCP is one of a suite of components, the other is an IP (Internet Protocol), and the whole suite is referred to as TCP/IP).

Figure 3:
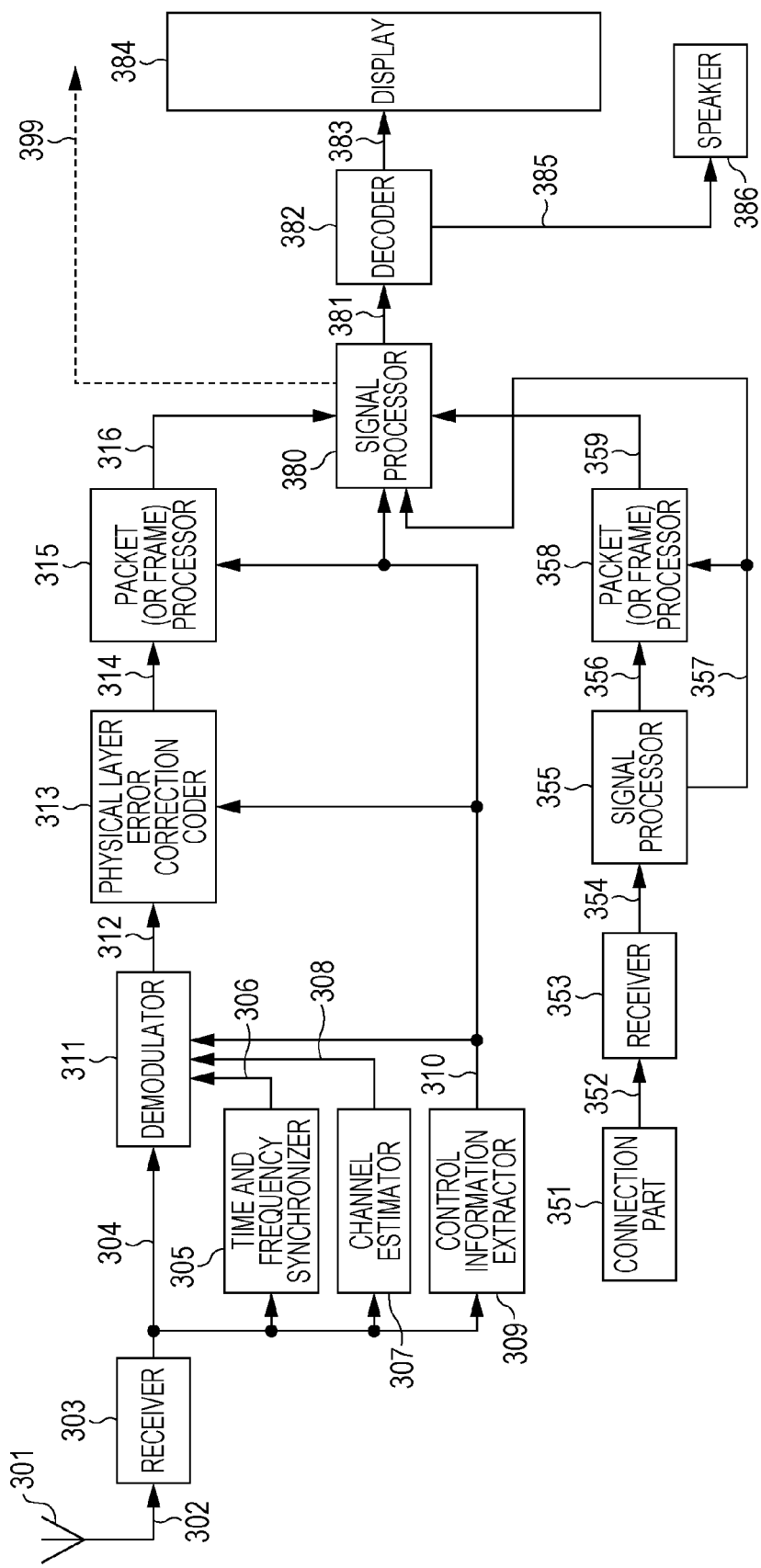
FIG. 3 is a view illustrating a configuration example of the terminal device.

FIG. 3 illustrates a configuration example of the terminal device. Antenna 301 receives the modulated signal transmitted from the broadcasting station. Reception signal 302 received by antenna 301 is input to receiver 303, and receiver 303 performs pieces of processing such as frequency conversion and orthogonal demodulation, and outputs baseband signal 304.

Baseband signal 304 is input to time and frequency synchronizer 305. Time and frequency synchronizer 305 extracts a preamble, a pilot symbol, a reference symbol, and the like, which are included in the modulated signal transmitted from the broadcasting station, performs time synchronization, frequency synchronization, a frequency offset, and the like, and outputs synchronous signal 306.

Baseband signal 304 is input to channel estimator 307. Channel estimator 307 extracts the preamble, pilot symbol, reference symbol, and the like, which are included in the modulated signal transmitted from the broadcasting station, estimates a state of a propagation path (channel estimation), and outputs channel estimation signal 308.

Baseband signal 304 is input to control information extractor 309, and control information extractor 309 extracts a control information symbol included in the modulated signal transmitted from the broadcasting station, performs pieces of processing such as control information symbol demodulation and error correction decoding, and outputs control information signal 310.

Baseband signal 304, synchronous signal 306, channel estimation signal 308, and control information signal 310 are input to demodulator 311. Demodulator 311 demodulates baseband signal 304 using synchronous signal 306 and channel estimation signal 308 based on the information about the modulated signal included in control information signal 310, obtains a logarithmic likelihood ratio of each bit, and outputs logarithmic likelihood ratio signal 312. The operation of demodulator 311 is described in PTLs 2 and 3.

Logarithmic likelihood ratio signal 312 and control information signal 310 are input to physical layer error correction decoder 313, and physical layer error correction decoder 313 performs the error correction decoding based on information (such as the error correction code information, a code length (block length), and a code rate) about the error correction code included in control information signal 310, and outputs received data 314.

Received data 314 and control information signal 310 are input to packet (or frame) processor 315, and packet (or frame) processor 315 performs the packet (or frame) processing based on the information about control information signal 310, and outputs data 316 after the packet (or frame) processing. The detailed operation is described later.

In the above description, the wireless transfer is performed by way of example. Alternatively, a wired transfer method such as a cable may be adopted. In the description, one modulated signal is transmitted by way of example. Alternatively, the transmission methods, disclosed in PTLs 1 and 2, for transmitting the plurality of modulated signals at the same time and the same frequency using the plurality of antennas may be adopted. Examples of the transfer methods include a single carrier scheme, a multi-carrier scheme such as an OFDM (orthogonal frequency division multiplexing) scheme, and a spread spectrum communication scheme. The processing corresponding to the transfer method is performed by each part in FIGS. 2 and 3.

Signal 352 transferred through a cable is input to receiver 353 connected to connection part 351, and receiver 353 outputs reception signal 354.

Reception signal 354 is input to signal processor 355, and signal processor 355 separates information and control information, and outputs received data 356 and control information 357.

Received data 356 and control information signal 357 are input to packet (or frame) processor 358, and packet (or frame) processor 358 performs the packet (or frame) processing on the received data based on control information 357, and outputs data 359 after the packet (or frame) processing. The detailed operation is described later.

Although the transfer scheme corresponding to connection part 351 is used in the above description, either the wired communication scheme or a wireless communication scheme may be used in the transfer scheme.

Data 316 after the packet (or frame) processing, control information signal 310, data 359 after the packet (or frame) processing, and control information 357 are input to signal processor 380, and signal processor 380 generates the data in order to display two videos on display 384, and outputs data 381.

Decoder 382 decodes the video and audio signal of data 381 to output video signal 383 and audio signal 385. Video signal 383 is output to display 384 or output from an external output terminal, and sound of audio signal 385 is output as sound from speaker 386 or audio signal 385 is output from an external output terminal.

A transmission method in which "the error correction code restoring the packet or frame loss is not used in the broadcasting station while the error correction code restoring the packet or frame loss is used in the transmission device of the telecommunications line provider" will be described below.

Figure 4:
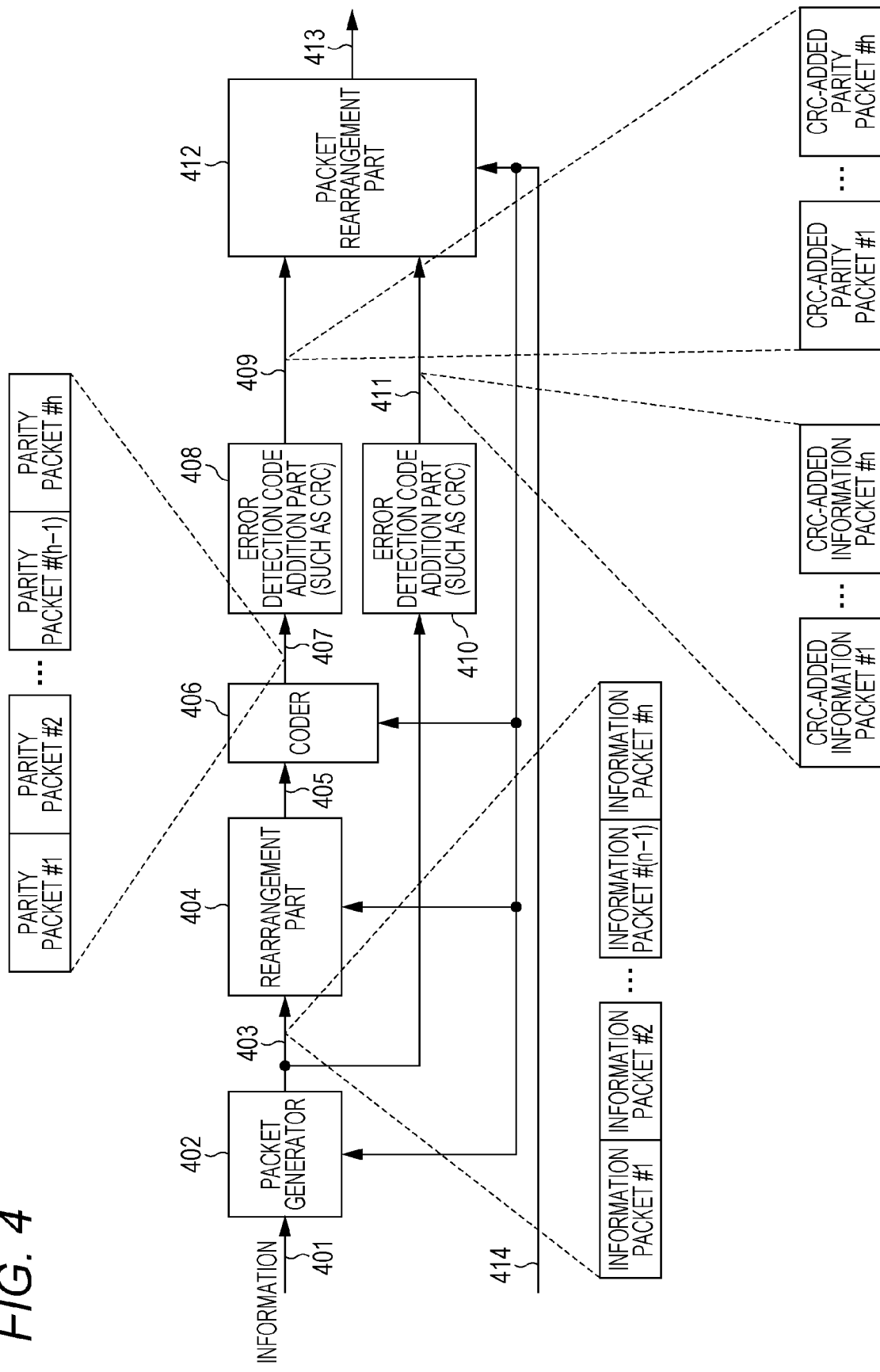
FIG. 4 is a view illustrating a configuration example of a portion associated with an error correction coding method in the transmission device of the telecommunications line provider.

FIG. 4 illustrates a configuration of a portion associated with the error correction coding method for restoring the packet or frame loss in the transmission device of the telecommunications line provider (also referred to as "packet-level error correction coding). The configuration examples in FIG. 4 is included in the packet (or frame) processor 222 of transmission device 250 in FIG. 2 owned by the telecommunications line provider.

Information 401 and control information signal 414 are input to packet generator 402, and packet generator 402 outputs information packet 403 based on information about a packet size (a number of bits constituting one packet), the information about the packet size being included in control information signal 414. In FIG. 4, packet generator 402 generates information packet #1, information packet #2, . . . , information packet #(n−1), and information packet #n (that is, information packet #k (k is an integer of 1 to n (n is an integer of 2 or more))). In the case that the number of bits of the information enough to generate information packets #1 to #n is lacked, packet generator 402 generates information packets #1 to #n by, for example, inserting known data.

Information packet 403 and control information signal 414 are input to rearrangement part 404, and rearrangement part 404 rearranges the data based on information about rearrangement method included in control information signal 414, and outputs data sequence 405 after the rearrangement. Transmission device 250 does not necessarily perform the rearrangement. For example, information packets #1 to #n are input to rearrangement part 404, and rearrangement part 404 performs the rearrangement within a bit sequence constituting information packets #1 to #n.

Data sequence 405 after the rearrangement and control information signal 414 are output to coder 408, and coder 408 performs coding based on an error (missing) correction coding scheme (such as information about the error (missing) correction coding scheme to be used, the code length (block length), and the code rate) included in control information 414, and outputs parity packet 407. In FIG. 4, coder 408 generates parity packet #1, parity packet #2, . . . , parity packet #(h−1), and parity packet #h (that is, parity packet #k (k is an integer of 1 to h (h is an integer of 1 or more))).

Parity packet 407 is input to error detection code addition part 408. Error detection code addition part 408 adds, for example, CRC (Cyclic Redundancy Check) to parity packet 407 such that the error can be detected in units of packets, and error detection code addition part 408 outputs CRC-added parity packet 409. The addition of the CRC enables the reception device to determine whether all the pieces of data in the packet are correct or whether the packet is lacked.

Although the addition of the CRC is described by way of example, any block code or inspection code may be used as long as whether all the pieces of data in the packet are correct or whether the packet is lacked can be determined.

In FIG. 4, error detection code addition part 408 generates CRC-added parity packet #1, CRC-added parity packet #2, . . . , CRC-added parity packet #(h−1), and CRC-added parity packet #h (that is, error detection code addition part 408 generates CRC-added parity packet #k (k is an integer of 1 to h (h is an integer of 1 or more))).

Similarly, information packet 403 is input to error detection code addition part 408. Error detection code addition part 410 adds the CRC to information packet 403 such that the error can be detected in units of packets, and error detection code addition part 410 outputs CRC-added information packet 411. The addition of the CRC enables the reception device to determine whether all the pieces of data in the packet are correct or whether the packet is lacked.

Although the addition of the CRC is described by way of example, any block code or inspection code may be used as long as whether all the pieces of data in the packet are correct or whether the packet is lacked can be determined.

In FIG. 4, error detection code addition part 410 generates CRC-added information packet #1, CRC-added information packet #2, . . . , CRC-added information packet #(n−1), and CRC-added information packet #n (that is, error detection code addition part 410 generates CRC-added information packet #k (k is an integer of 1 to n (n is an integer of 2 or more))).

In FIG. 4, information 401 may include the control information (such as the information about the type of information and the information about the video coding scheme (the frame rate, the compression ratio, and the compression method)). However, the control information is not limited to the information about the type of information and the information about the video coding scheme. This point is described later.

Figure 5:
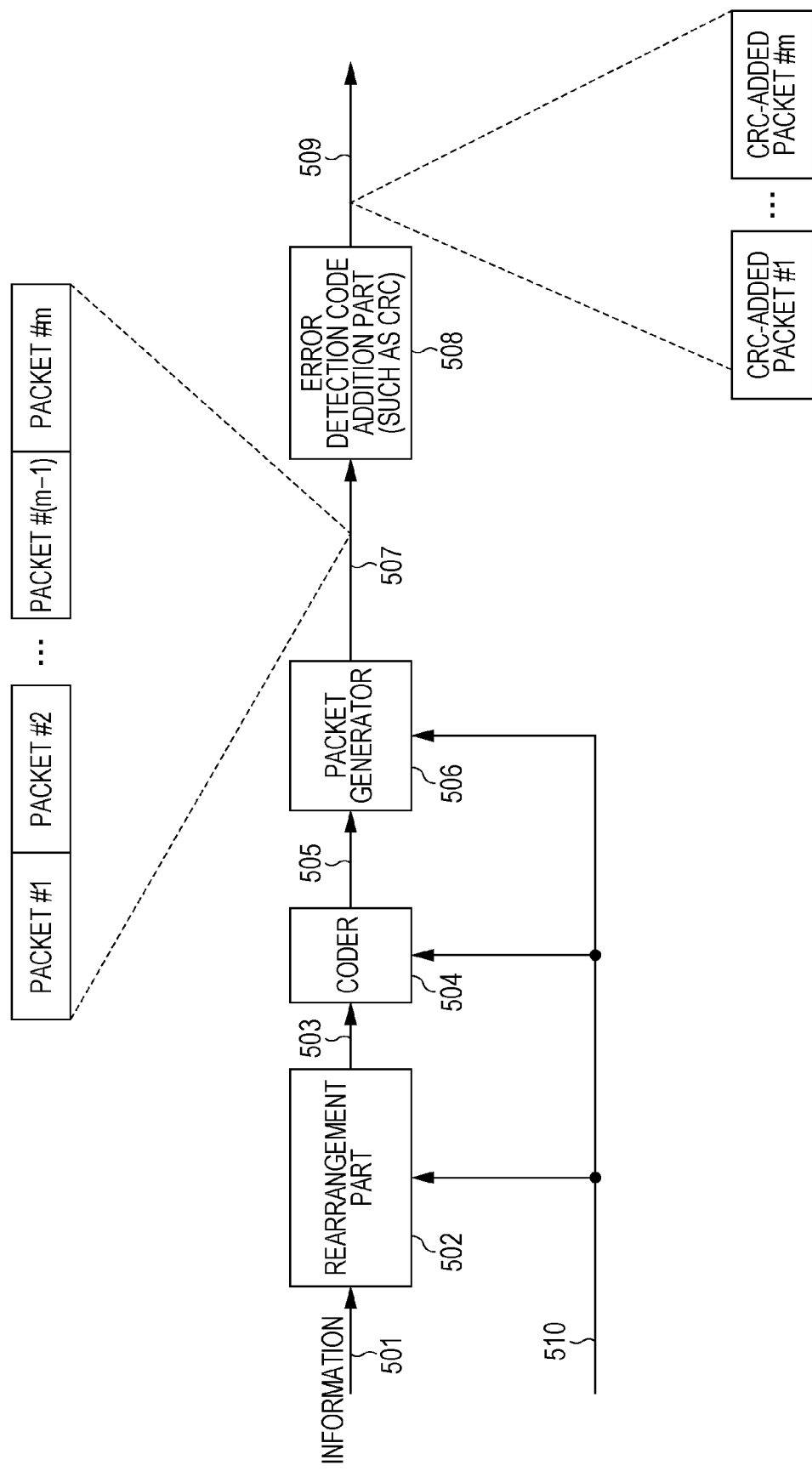
FIG. 5 is a view illustrating a configuration example of the portion associated with the error correction coding method of the transmission device of the telecommunications line provider.

FIG. 5 illustrates a configuration different from that in FIG. 4. FIG. 5 illustrates a portion associated with the error correction coding method for restoring the packet or frame loss in the transmission device of the telecommunications line provider. The configuration examples in FIG. 5 is included in the packet (or frame) processor 222 of transmission device 250 in FIG. 2 owned by the telecommunications line provider.

Information 501 and control information signal 510 are input to rearrangement part 502, and rearrangement part 502 rearranges the data based on information about rearrangement method included in control information signal 510, and outputs information 503 after the rearrangement.

Information 503 after the rearrangement and control information signal 510 are input to coder 504, and coder 504 performs the coding based on the error (missing) correction coding scheme (such as the information about the error (missing) correction coding scheme to be used, the code length (block length), and the code rate) included in control information 510, and outputs coded data 505. The code to be used in the coding may be either a systematic code (a code in which an information sequence is included in a codeword as is) or a nonsystematic code.

Coded data 505 and control information signal 510 are input to packet generator 506, and packet generator 506 outputs packet 507 based on information about the packet size (the number of bits constituting one packet), the information about the packet size being included in control information signal 503. In FIG. 5, packet generator 506 generates packet #1, packet #2, . . . , packet #(m−1), and information packet #m (that is, packet #k (k is an integer of 1 to m (m is an integer of 2 or more))). In the case that the number of bits of the information enough to generate information packets #1 to #m is lacked, coder 504 performs the coding by, for example, inserting known data in rearranged information 503.

Packet 507 is input to error detection code addition part 508. Error detection code addition part 508 adds the CRC to parity packet 507 such that the error can be detected in units of packets, and error detection code addition part 508 outputs CRC-added packet 509. The addition of the CRC enables the reception device to determine whether all the pieces of data in the packet are correct or whether the packet is lacked.

Although the addition of the CRC is described by way of example, any block code or inspection code may be used as long as whether all the pieces of data in the packet are correct or whether the packet is lacked can be determined.

In FIG. 5, error detection code addition part 508 generates CRC-added information packet #1, CRC-added information packet #2, . . . , CRC-added information packet #(m−1), and CRC-added information packet #m (that is, error detection code addition part 508 generates CRC-added information packet #k (k is an integer of 1 to n (m is an integer of 2 or more))).

Information 501 in FIG. 5 may include the control information (such as the information about the type of information and the information about the video coding scheme (the frame rate, the compression ratio, and the compression method)). However, the control information is not limited to the information about the type of information and the information about the video coding scheme. This point is described later.

An example of the packet construction method will be described below.

Figure 6:
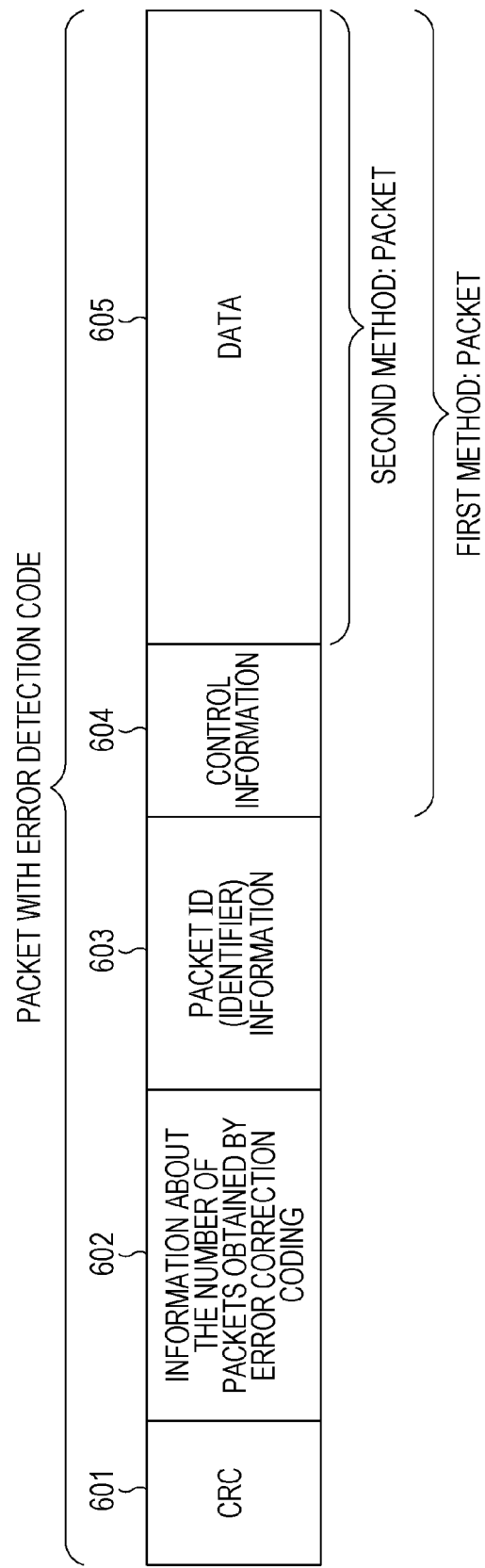
FIG. 6 is a view illustrating an example of a packet construction method.

FIG. 6 illustrates an example of the packet construction method. In the transmission device, CRC 601 can be used to detect an error.

For example, in FIG. 4, because the number of packets is n while the number of parity packets is h, "information about the number of packets obtained by the error correction code" 602 becomes "n+h". In FIG. 5, the information about the number of packets obtained by the error correction code becomes "m".

"Packet ID (identification) (identifier) information" 603 will be described below.

For example, in FIG. 4, because the number of packets obtained by the error correction code is "n+h", each of error detection code addition parts 408 and 410 prepares "0" to "n+h−1" as a packet ID (identification) (identifier). Each of error detection code addition parts 408 and 410 provides one of identifiers "0" to "n+h−1" to each packet. Specifically, each of error detection code addition parts 408 and 410 provides one of IDs "0" to "n+h−1" to each of h parity packets in FIG. 4 and each of n information packets in FIG. 4.

In FIG. 5, because the number of packets obtained by the error correction code is "m", error detection code addition part 508 prepares "0" to "m−1" as the packet ID. Error detection code addition part 508 provides one of identifiers "0" to "m−1" to each packet. Specifically, in FIG. 5, error detection code addition part 508 provides one of identifiers "0" to "m−1" to each of m packets.

Control information 604 is one except for "the information about the number of packets obtained by the error correction code" and "the packet ID (identification) (identifier)". For example, in the transmission device, the information about the error correction coding scheme at the packet level and the number of bits (or the number of bytes) of a packet length, when the packet length is variable, may be used as the control information.

Data 605 is the data to be transferred to the terminal device (in this case, for example, video data and audio data).

Figure 7:
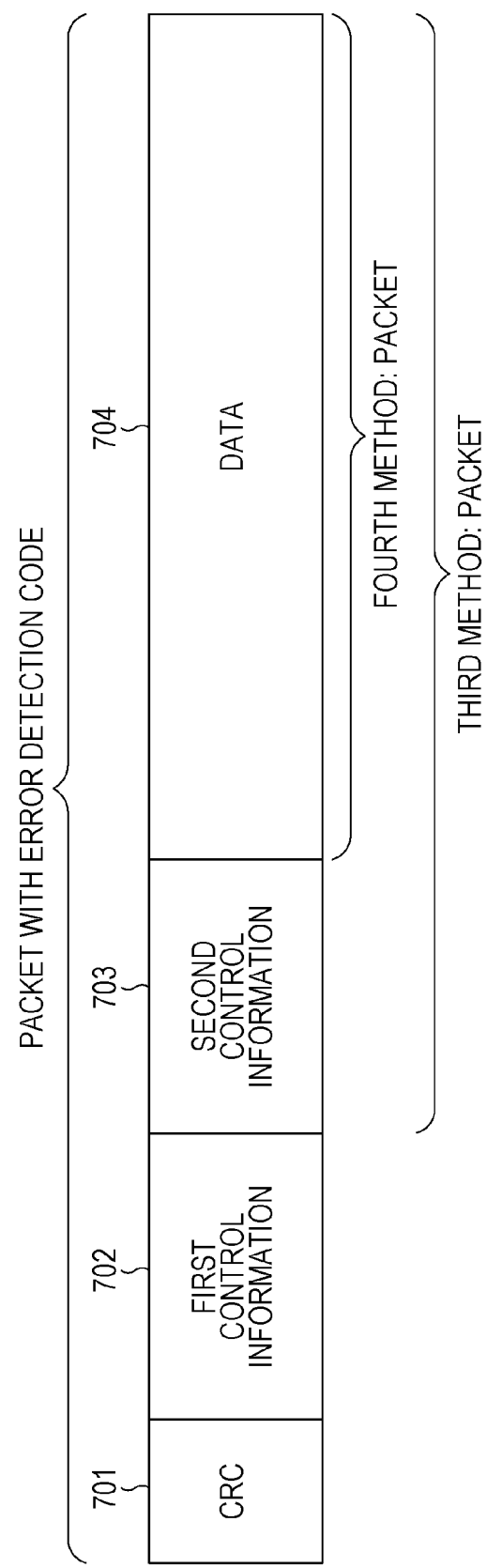
FIG. 7 is a view illustrating an example of the packet construction method.

FIG. 7 illustrates an example of the packet construction method different from that in FIG. 6. In the transmission device, CRC 701 can be used to detect an error.

Examples of the information belonging to first control information 702 and second control information 703 include "information about the number of packets obtained by the error correction code", "information about the packet ID (identification) (identifier)", the information about the error correction coding scheme at the packet level, and the number of bits (or the number of bytes) of the packet length when the packet length is variable.

Data 704 is the data to be transferred to the terminal device (in this case, for example, video data and audio data).

A data group including "CRC" 601, "information about the number of packets obtained by the error correction coding" 602, "information about the packet ID (identifier)" 603, "control information" 604, and "data" 605 in FIG. 6 corresponds to "one packet with error detection code" in FIGS. 4 and 5.

A data group including "CRC" 701, "first control information" 702, "second control information" 703, and "data" 704 in FIG. 7 corresponds to "one packet with error detection code" in FIGS. 4 and 5.

At this point, by way of example, the following four methods will be described as the packet construction method in FIGS. 4 and 5.

First Method:

In FIG. 6, control information 604 and data 605 are a packet before error detection code in FIGS. 4 and 5. Accordingly, control information 604 and data 605 constitute the input of the error correction coding processing (coder 406 or 504). On the other hand, information 602 about the number of packets obtained by the error correction coding, information 603 about the packet ID (identification) (identifier), and CRC 601 that is of an example of the error detection code are added to control information 604 and data 605 by a control information addition part (not illustrated in FIGS. 4 and 5) to constitute a packet with error detection code.

For example, in the case that 32 packets are obtained by the error correction coding, one of values 0 to 31 is taken as the packet ID in the error correction coding processing.

Figure 8:
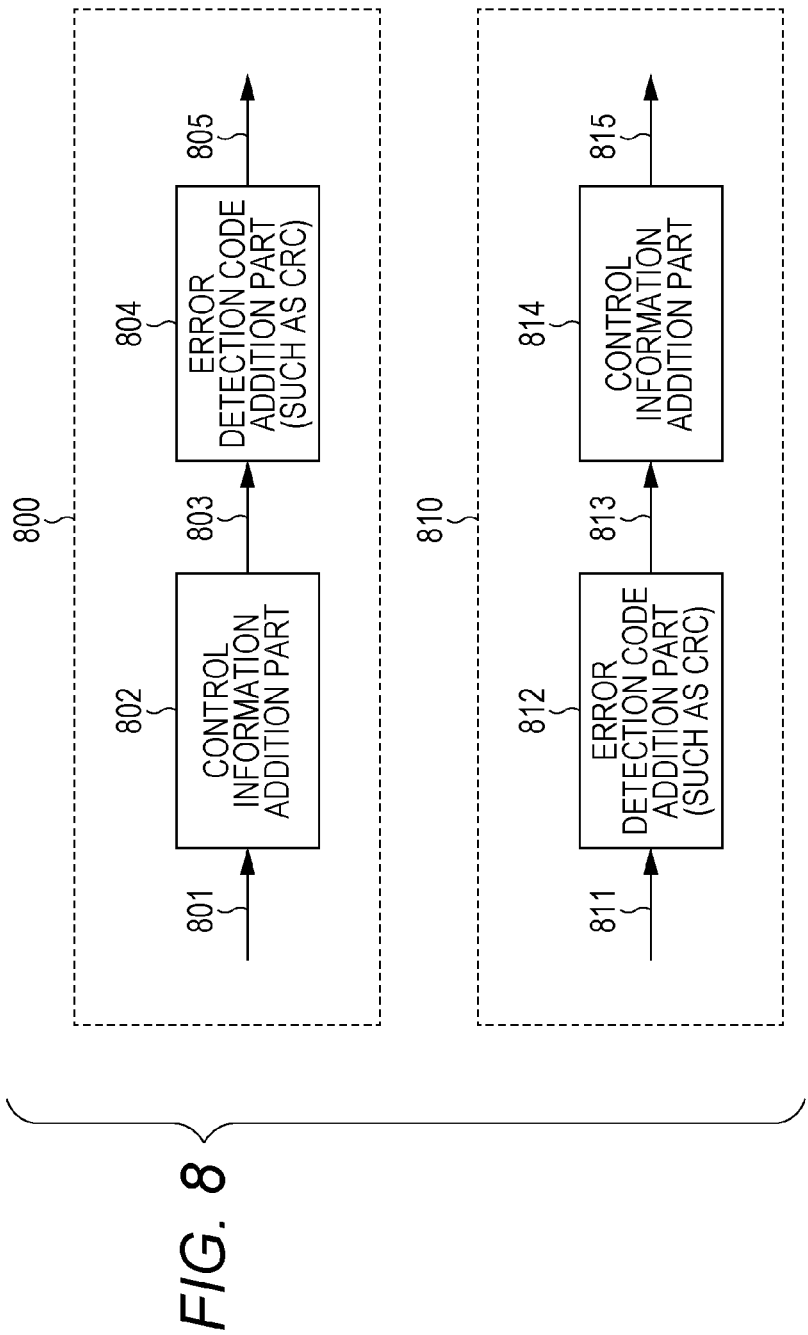
FIG. 8 is a view illustrating configuration examples of the case that a control information addition part is located at a preceding stage of an error detection code addition part and the case that the control information addition part is located at a subsequent stage of the error detection code addition part.

FIG. 8 illustrates a configuration in which a control information addition part is added to a preceding or subsequent stage of error detection code addition parts 408, 410, and 508 in FIGS. 4 and 5.

FIG. 8A illustrates an example of configuration 800 of the error correction coding processing in which the control information addition part is added to the preceding stage of the error detection code addition part. In the first method, control information 604 and data 605 (corresponding to reference mark 801) are input to control information addition part 802, and control information addition part 802 adds information 602 about the number of packets obtained by the error correction coding and information 603 about the packet ID (identification) (identifier), and outputs data group 803.

Data group 803 is input to error detection code addition part 804, and error detection code addition part 804 adds CRC 601, and outputs packet 805 with error detection code.

FIG. 8B illustrates an example of configuration 810 of the error correction coding processing in which the control information addition part is added to the subsequent stage of the error detection code addition part. In the first method, control information 604 and data 605 (corresponding to reference mark 811) are input to error detection code addition part 812, and error detection code addition part 812 adds CRC 601, and outputs data group 813.

Data group 813 is input to control information addition part 814, and control information addition part 814 adds information 602 about the number of packets obtained by the error correction coding and information 603 about the packet ID (identification) (identifier), and outputs packet 815 with error detection code.

Second Method:

In FIG. 6, data 605 is a packet before error detection code in FIGS. 4 and 5. Accordingly, data 605 constitutes the input of the error correction coding processing (coder 406 or 504). On the other hand, information 602 about the number of packets obtained by the error correction coding, information 603 about the packet ID (identification) (identifier), control information 604, and CRC 601 that is of an example of the error detection code are added to data 605 by the control information addition part (not illustrated in FIGS. 4 and 5) to constitute the packet with error detection code.

For example, in the case that 32 packets are obtained by the error correction coding, one of values 0 to 31 is taken as the packet ID in the error correction coding processing.

FIG. 8 illustrates a configuration in which a control information addition part is added to a preceding or subsequent stage of error detection code addition parts 408, 410, and 508 in FIGS. 4 and 5.

FIG. 8A illustrates an example of configuration 800 of the error correction coding processing in which the control information addition part is added to the preceding stage of the error detection code addition part. In the second method, data 605 (corresponding to reference mark 801) is input to control information addition part 802, and control information addition part 802 adds information 602 about the number of packets obtained by the error correction coding, information 603 about the packet ID (identification) (identifier), and control information 604, and outputs data group 803.

Data group 803 is input to error detection code addition part 804, and error detection code addition part 804 adds CRC 601, and outputs packet 805 with error detection code.

FIG. 8B illustrates an example of configuration 810 of the error correction coding processing in which the control information addition part is added to the subsequent stage of the error detection code addition part. In the second method, data 605 (corresponding to reference mark 811) is input to error detection code addition part 812, and error detection code addition part 812 adds CRC 601, and outputs data group 813.

Data group 813 is input to control information addition part 814, and control information addition part 814 adds information 602 about the number of packets obtained by the error correction coding, information 603 about the packet ID (identification) (identifier), and control information 604, and outputs packet 815 with error detection code.

Third Method:

In FIG. 7, data 704 and second control information 703 are the packet before error detection code in FIGS. 4 and 5. Accordingly, data 704 and second control information 703 constitute the input of the error correction coding processing (coder 406 or 504). On the other hand, first control information 702 and CRC 701 that is of an example of the error detection code are added to data 704 and second control information 703 by the control information addition part (not illustrated in FIGS. 4 and 5) to constitute the packet with error detection code.

For example, in the case that 32 packets are obtained by the error correction coding, one of values 0 to 31 is taken as the packet ID in the error correction coding processing.

FIG. 8 illustrates a configuration in which a control information addition part is added to a preceding or subsequent stage of error detection code addition parts 408, 410, and 508 in FIGS. 4 and 5.

FIG. 8A illustrates an example of configuration 800 of the error correction coding processing in which the control information addition part is added to the preceding stage of the error detection code addition part. In the third method, data 704 and second control information 703 (corresponding to reference mark 801) are input to control information addition part 802, and control information addition part 802 adds first control information 702, and outputs data group 803.

Data group 803 is input to error detection code addition part 804, and error detection code addition part 804 adds CRC 601, and outputs packet 805 with error detection code.

FIG. 8B illustrates an example of configuration 810 of the error correction coding processing in which the control information addition part is added to the subsequent stage of the error detection code addition part. In the third method, data 704 and second control information 703 (corresponding to reference mark 811) are input to error detection code addition part 812, and error detection code addition part 812 adds CRC 601, and outputs data group 813.

Data group 813 is input to control information addition part 814, and control information addition part 814 adds first control information 702, and outputs packet 815 with error detection code.

Fourth Method:

In FIG. 7, data 704 is a packet before error detection code in FIGS. 4 and 5. Accordingly, data 704 constitutes the input of the error correction coding processing (coder 406 or 504). On the other hand, first control information 702, second control information 703, and CRC 701 that is of an example of the error detection code are added to data 704 by the control information addition part (not illustrated in FIGS. 4 and 5) to constitute the packet with error detection code.

For example, in the case that 32 packets are obtained by the error correction coding, one of values 0 to 31 is taken as the packet ID in the error correction coding processing.

FIG. 8 illustrates a configuration in which a control information addition part is added to a preceding or subsequent stage of error detection code addition parts 408, 410, and 508 in FIGS. 4 and 5.

FIG. 8A illustrates an example of configuration 800 of the error correction coding processing in which the control information addition part is added to the preceding stage of the error detection code addition part. In the fourth method, data 704 (corresponding to reference mark 801) is input to control information addition part 802, and control information addition part 802 adds first control information 702 and second control information 703, and outputs data group 803.

Data group 803 is input to error detection code addition part 804, and error detection code addition part 804 adds CRC 601, and outputs packet 805 with error detection code.

FIG. 8B illustrates an example of configuration 810 of the error correction coding processing in which the control information addition part is added to the subsequent stage of the error detection code addition part. In the fourth method, data 704 (corresponding to reference mark 811) is input to error detection code addition part 812, and error detection code addition part 812 adds CRC 601, and outputs data group 813.

Data group 813 is input to control information addition part 814, and control information addition part 814 adds first control information 702 and second control information 703, and outputs packet 815 with error detection code.

Although not described above, the information about the clock time may be included in each packet or some packets. All the packets may include the information about the clock time, or a specific packet may include the information about the clock time.

The information about the clock time may be included in the modulated signal transmitted by the broadcasting station. The information about the clock time may be included in all the packets or frames, or the information about the clock time may be included in a specific packet or frame.

Using the information about the clock time included in the packet transmitted from the telecommunications line provider and the information about the clock time included in the modulated signal transmitted from the broadcasting station, the terminal device can adjust the temporal synchronization between the video transmitted from the telecommunications line provider and the video transmitted from the broadcasting station, and display the two synchronized videos on the display included in the terminal device. Therefore, the terminal device can lower a probability of giving a viewer a discomfort feeling.

The information about the clock time includes the information transmitted from the telecommunications line provider as described above, the information about the clock time also includes the information transmitted from the broadcaster, and the terminal device can perform the decoding of the first and second videos and the temporal synchronization of the display using the pieces of information. In the terminal device, the pieces of information about the clock times can be used in the timing of the error correction decoding at the packet level in the exemplary embodiment.

Although the term "packet" is used in the above description, other names such as "frame" and "block" may be used. "Packet", "frame", or "block" includes the plurality of bits.

The modulated signal transmitted from the broadcasting station does not necessarily have a data structure based on the packet (in the case that the modulated signal has the data structure based on the packet, the packet length and the configuration of the control information may be identical to or different from those of the configuration of the packet transmitted from the telecommunications line provider.

The pieces of timing of the packet transmitted from the broadcasting station and telecommunications line provider and the terminal device reception situations of the packets transmitted from the broadcasting station and telecommunications line provider will be described below. The broadcasting station transmits the packet in the following description. However, the information is not necessarily transmitted in units of packets, but the information may be transmitted in units of frames or streams. For convenience, the broadcasting station and telecommunications line provider transmit the pieces of information in units of packets by way of example.

Figure 9:
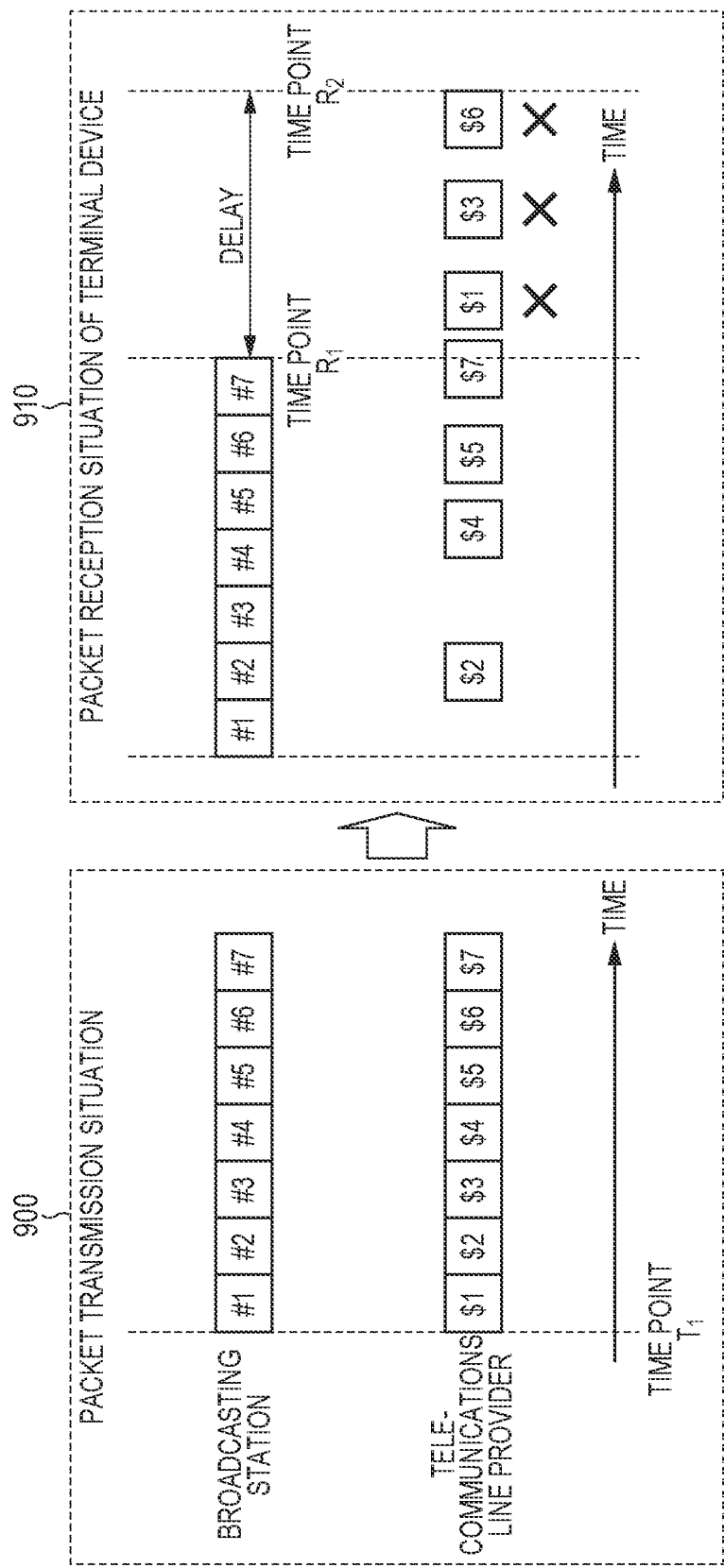
FIG. 9 is a view illustrating examples of a packet transmission situation and a packet reception situation.

FIG. 9A illustrates an example of transmission situation 900 of the packets in which the broadcasting station and the telecommunications line provider transmit the pieces of information about the two videos at the identical clock time from different angles. In FIG. 9, a horizontal axis indicates time. The broadcasting station transmits the data of the first video and that the telecommunications line provider transmits the data of the second video (the first video and the second video are the videos at the identical clock time from the different angles).

In FIG. 9, the first video includes packet "#1", packet "#2", packet "#3", packet "#4", packet "#5", packet "#6", and packet "#7", and the second video includes packet "$1", packet "$2", packet "$3", packet "$4", packet "$5", packet "$6", and packet "$7".

The first video includes packets except for packet "#1", packet "#2", packet "#3", packet "#4", packet "#5", packet "#6", and packet "#7", and the broadcasting station similarly transmits the packet from then on (although not illustrated in FIG. 9). The second video includes packets except for packet "#1", packet "#2", packet "#3", packet "#4", packet "#5", packet "#6", and packet "#7", and the telecommunications line provider similarly transmits the packet from then on (although not illustrated in FIG. 9).

FIG. 9A illustrates a situation in which the broadcasting station and the telecommunications line provider transmit the packets, and the broadcasting station transmits packet "#1", packet "#2", packet "#3", packet "#4", packet "#5", packet "#6", and packet "#7" while the telecommunications line provider transmits packet "$1", packet "$2", packet "$3", packet "$4", packet "$5", packet "$6", and packet "$7".

Packet "#1" and packet "$1" transmitted from clock time $T_1$ in FIG. 9 are the packets including the video at the identical clock time, and the broadcasting station and the telecommunications line provider currently transmit the packets.

FIG. 9B illustrates packet reception situation 910 of the terminal device. Packet "#1", packet "#2", packet "#3", packet "#4", packet "#5", packet "#6", and packet "#7" transmitted from the broadcasting station arrive sequentially at the terminal device in the identical order, and arrives continuously at the terminal device because the broadcasting station continuously transmits the packets. Accordingly, in FIG. 9B, the terminal device receives packet "#1", packet "#2", packet "#3", packet "#4", packet "#5", packet "#6", and packet "#7", and the reception is completed at time point $R_1$.

As described above, the telecommunications line provider transmits the packet to the terminal device using the TCP (TCP/IP) or UDP. Accordingly, even if the broadcasting station and the telecommunications line provider transmit the pieces of information about the two videos at the identical clock time from the different angle as illustrated in FIG. 9A, an arrival delay of the packet and a rearrangement of the packets are generated in the packets transmitted from the telecommunications line provider as illustrated in FIG. 9B. The terminal device can easily predict the method in which the packet transmitted from the broadcasting station arrives at the terminal device, but the terminal device can hardly predict the method in which the packet transmitted from the telecommunications line provider arrives at the terminal device.

For example, in the case that the packet is received as illustrated in FIG. 9B, assuming that $R_1$ is a clock time at which the terminal device completes the reception of the last packet of the broadcasting station, and that $R_2$ is a clock time at which the terminal device completes the reception of the last packet of the telecommunications line provider, frequently $R_1 < R_2$ holds.

Because the first video and the second video are the two videos at the identical clock time from the different angles, unless the first video and the second video are synchronously displayed on display 384 included in the terminal device of FIG. 3, there is a high possibility of providing an uncomfortable feeling to the viewer. For example, in the case that the first video is a general angle of soccer while the second video is an angle of an individual player, there is a high possibility of dissatisfying the viewer when the first video is a moment at which player A shoots a goal at the general angle of the soccer while the second video is a moment at which the player A already makes the goal.

In the case that the decoding of the first video and the decoding of the second video at clock time $R_1$, the first video is displayed on the terminal device, and the second video is hardly displayed with little disturbance on the terminal device because packet "$1", packet "$3", and packet "$6" of the second video do not arrive.

In the case that the decoding of the first video and the decoding of the second video are performed at clock time $R_2$, the terminal device delays the clock time at which the first video is displayed in order to synchronize the first video display and the second video display. Accordingly, in the terminal device, it is necessary to provide a storage (buffer) for the delay of the first video data. For a small delay amount (or within a permissible range), the terminal device may use the method for delaying the start clock time of the decoding. However, the delay amount is not kept constant in the TCP (TCP/IP) or UDP, and possibly the delay amount is further increased in the case that the terminal device obtains the packet through a wireless LAN. Therefore, in the method for delaying the start clock time of the decoding, it is necessary to enlarge the scale of the storage in the terminal device in order to synchronously display the first video and the second video. In consideration of this point, for the adaption of the method for delaying the decoding start clock time in the terminal device, there is a demand for introduction of a technique of decreasing the disturbance of the video even if a delay time is shortened.

Figure 10:
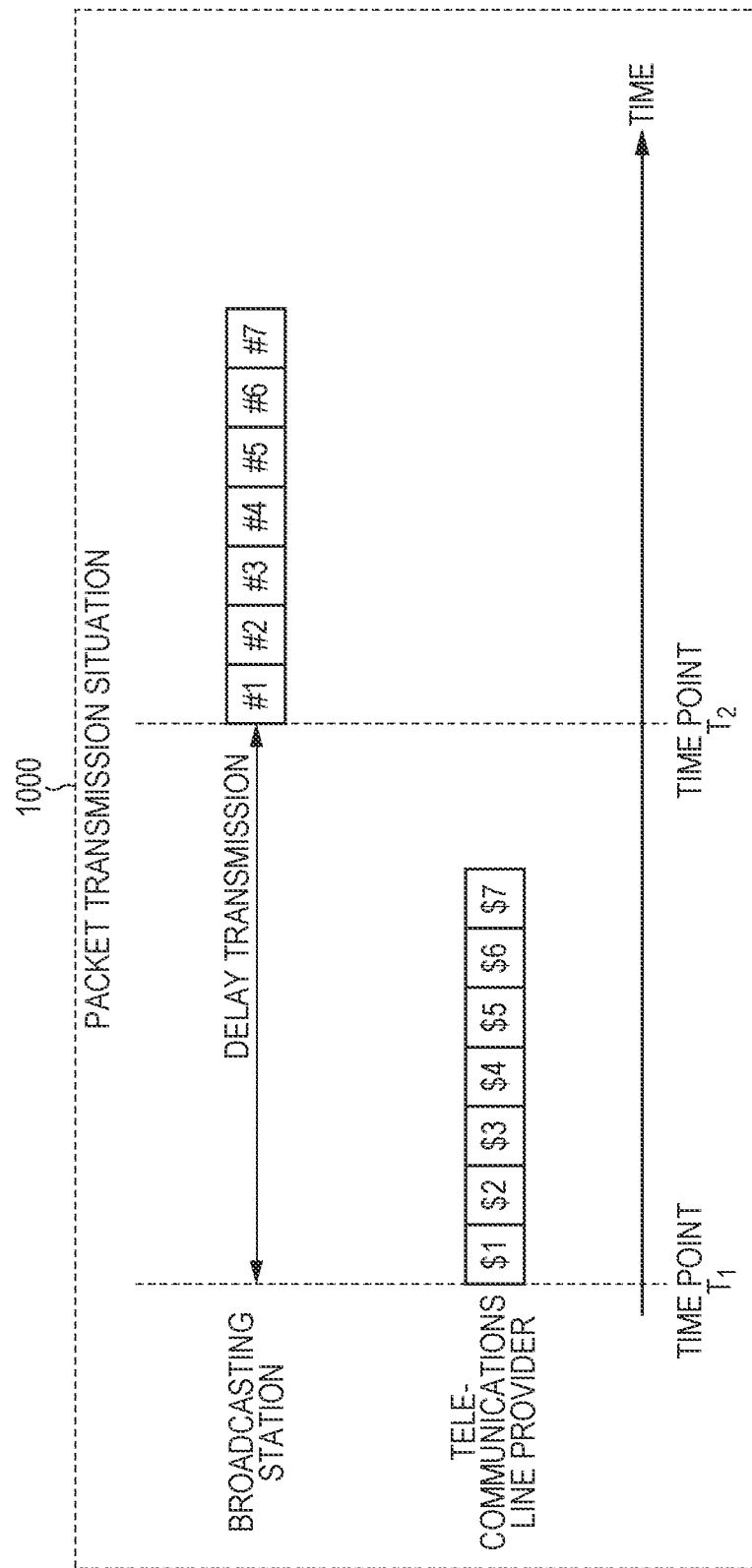
FIG. 10 is a view illustrating an example of the packet transmission situation.

A transmission method in FIG. 10 is proposed as a method for shortening the delay time to reduce the disturbance of the video. FIG. 10 illustrates an example of transmission situation 1000 of the packets in which the broadcasting station and the telecommunications line provider transmit the pieces of information about the two videos at the identical clock time from different angles. In FIG. 10, the horizontal axis indicates the time. Transmission situation 1000 in FIG. 10 differs from transmission situation 900 in FIG. 9A in that the packet transmitted from the broadcasting station is delayed in consideration of the arrival delay of the packet transmitted from the telecommunications line provider at the terminal device. In FIG. 10, the telecommunications line provider starts the transmission of the packet from clock time point $T_1$ to sequentially transmit packet "#1", packet "#2", packet "#3", packet "#4", packet "#5", packet "#6", and packet "#7".

Therefore, packet (or frame) processors 202 and 222 in FIG. 2 have a packet (or frame) accumulating function in order to delay and transmit the generated packet, and transmit the packet or frame with the packet or frame delayed for an accumulated amount.

In FIG. 10, the broadcasting station starts the transmission of the packet from clock time point $T_2$ ($T_1 \neq T_2$; although $T_1 < T_2$ in this case, $T_1 > T_2$ might hold) to sequentially transmit packet "#1", packet "#2", packet "#3", packet "#4", packet "#5", packet "#6", and packet "#7".

Figure 11:
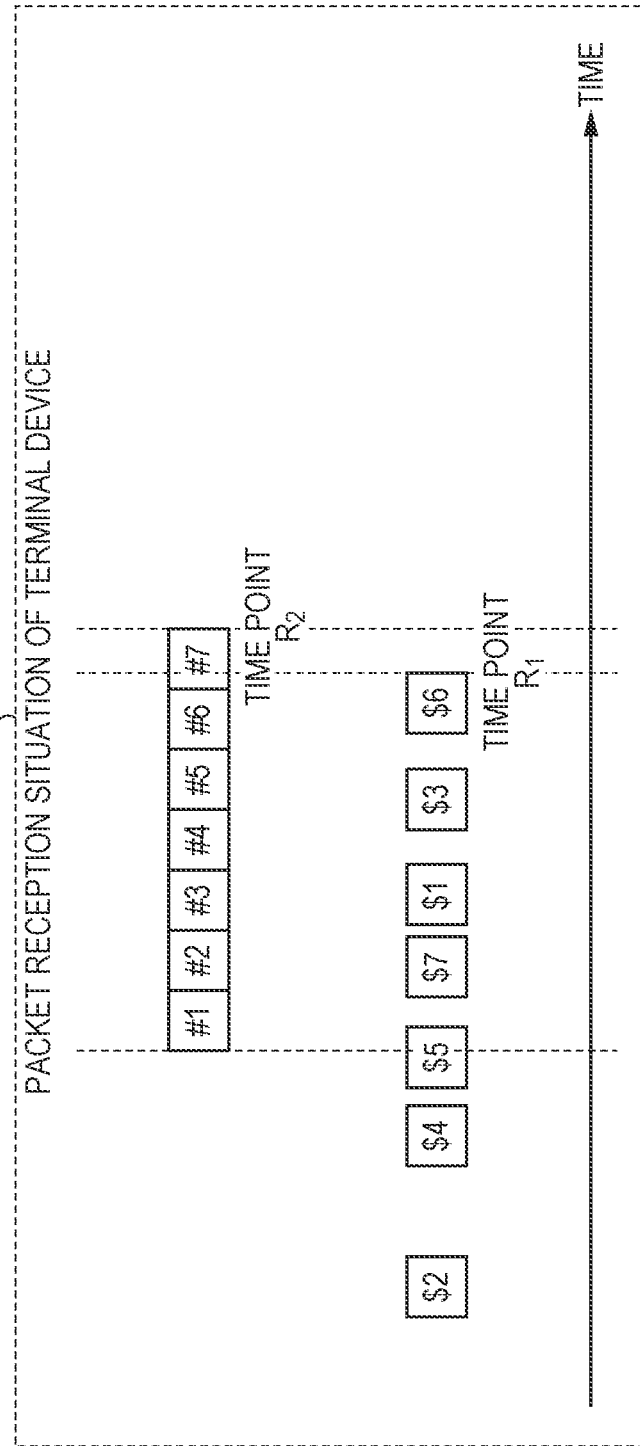
FIG. 11 is a view illustrating an example of the packet reception situation.

FIG. 11 illustrates an example of reception situation 1100 of the packet that is received with the terminal device when the broadcasting station and the telecommunications line provider transmit the packets in FIG. 10.

In FIG. 11, similarly to the example in FIG. 9, the terminal device receives packets "#1" to "#7" transmitted from the broadcasting station, and completes the reception of all the packets at clock time $R_2$.

The terminal device receives the packet transmitted from the telecommunications line provider, and completes the reception of all the packets transmitted from the telecommunications line provider at clock time $R_1$. Because the packet in FIG. 10 is transmitted, $R_1 < R_2$ holds in FIG. 11. Compared with the case that the packet in FIG. 9 is transmitted, there is a possibility of being able to decrease a difference between "the time point at which the terminal device completes the reception for all the packets transmitted from the broadcasting station" and "the time point at which the terminal device completes the reception for all the packets transmitted from the telecommunications line provider". Accordingly, the circuit scale used to accumulate and store the packet can be reduced in the terminal device. In FIG. 11, the decoding of the first video and the decoding of the second video may be started at clock time $R_2$. However, it is necessary for the broadcasting station and the telecommunications line provider to provide a packet accumulator that delays and transmits the packet, which leads to the enlargement of the circuit scale.

Because actually the plurality (a large number) of terminal devices exist, compared with the enlargement of the circuit scale in the broadcasting station or telecommunications line provider, the enlargement of the circuit scale in the terminal device becomes troublesome from the viewpoint of the enlargement of the total circuit scale. Accordingly, the method is effective in suppressing the disturbance of the video while suppressing the enlargement of the circuit scale.

Figure 12:
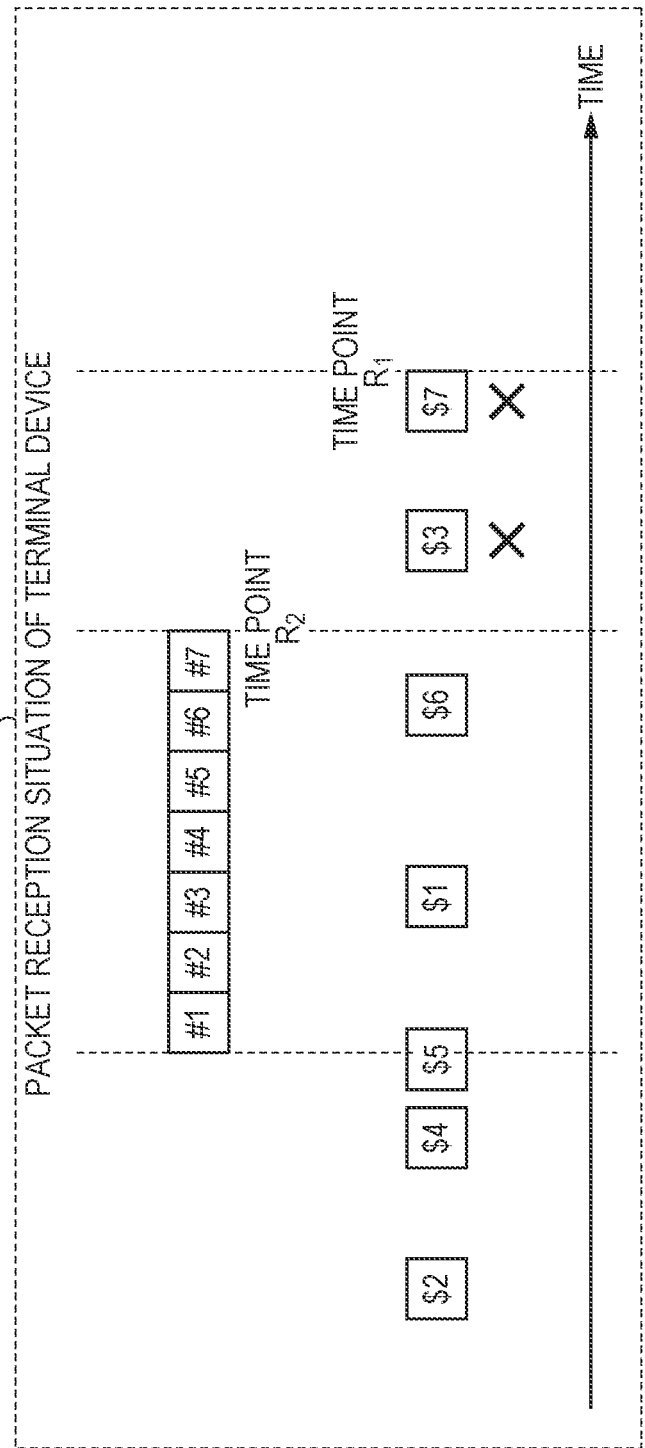
FIG. 12 is a view illustrating an example of the packet reception situation.

However, the disturbance of the video is not always generated. For example, the terminal device receives the packet as illustrated in FIG. 12, namely, the terminal device receives the packet transmitted from the telecommunications line provider with a delay as illustrated in FIG. 9B. The difference between "the time point at which the terminal device completes the reception for all the packets transmitted from the broadcasting station" and "the time point at which the terminal device completes the reception for all the packets transmitted from the telecommunications line provider" is decreased compared with the case in FIG. 9B. However, because the terminal device synchronously displays the first and second videos at clock time $R_1$ at which packet "$3" and packet "$7" are lost, the disturbance of the second video is generated in the case that the decoding of the second video is started.

The broadcasting station and the transmission device of the telecommunications line provider control the delay amount, which allows the reduction of the disturbance of the second video.

Signal processor 380 of the terminal device in FIG. 3 obtains the information about the difference in arrival time between the packet transmitted from the broadcasting station and the packet transmitted from the telecommunications line provider at the identical clock time (or its statistical information), and outputs the time difference information 399. Time difference information 399 is transmitted from the transmission device of the terminal device to the telecommunications line provider.

Transmission device 250 of the telecommunications line provider in FIG. 2 includes a receiver (not illustrated) to acquire time difference information 299 transmitted from the terminal device. Time difference information 299 is input to packet (or frame) processors 202 and 222, and each of packet (or frame) processors 202 and 222 changes the amount of packet or frame storage to control transmission timing, and outputs the packet or frame in which the delay amount is controlled.

In FIG. 2, it is difficult for broadcasting station 240 to control the delay amount in each terminal device (because of multicasting). Accordingly, packet (or frame) processor 222 of transmission device 250 of the telecommunications line provider controls the delay amount for each terminal device. In the case that transmission device 250 of telecommunications line provider does not individually transmit the packet to the terminal device, namely, in the case that transmission device 250 performs the multicasting, broadcasting station 240 may control the delay time (packet transmission timing), or the telecommunications line provider may control the delay time (packet transmission timing).

The case that "the transmission device of the telecommunications line provider uses the error correction code restoring the packet or frame loss (the packet-level error correction coding)" will be described below.

The telecommunications line provider transfers the information about the second video including 16384×4=65536 bits. At this point, because the number of bits of the information constituting one packet is set to 16384 bits (additionally, as described above, the control information is separately transferred), the information about the second video is the information bits that can obtain 65536/16384=4 packets. The telecommunications line provider performs the error correction code (the packet-level error correction coding) restoring the packet or frame loss as illustrated in FIGS.

4 and 5. The error correction code used at that time has the code length of 114688 bits and the code rate of 4/7.

For example, the packet in FIG. 4 is generated in the error correction code of the systematic code. For example, the packet in FIG. 5 is generated in the error correction code of the nonsystematic code. The telecommunications line provider performs the coding in FIG. 4 or 5 on the information about the second video including 65536 bits to generate 7 packets (because the number of bits of the information constituting one packet is 16384 bits).

The 7 packets are packet "$1", packet "$2", packet "$3", packet "$4", packet "$5", packet "$6", and packet "$7". When the number of bits larger than that of the pre-coding information is received, namely, when at least 5 packets are received, the terminal device can restore all the packets. Therefore, for example, the broadcasting station and the telecommunications line provider transmit the packets as illustrated in FIG. 9A (the detailed description is already made).

Figure 13:
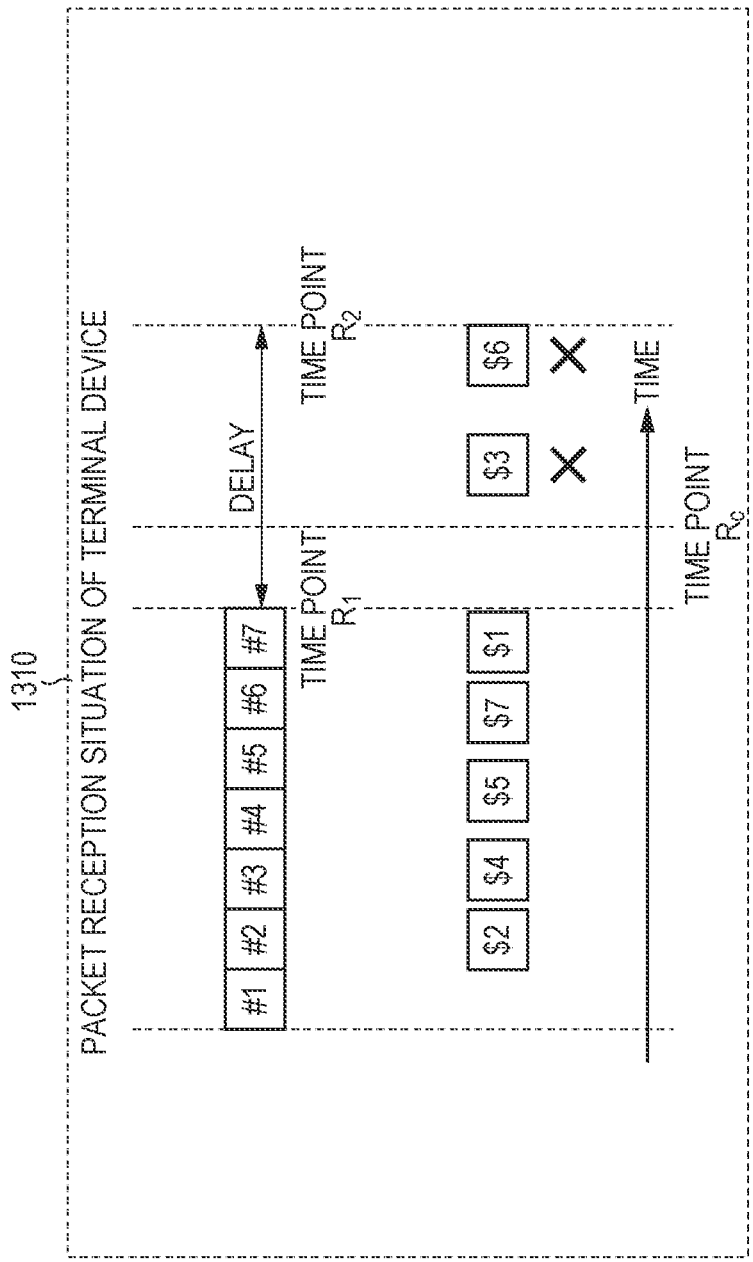
FIG. 13 is a view illustrating an example of the packet reception situation.

In the case that the terminal device in FIG. 3 is in the packet reception situation in FIG. 13, the terminal device decodes the packet-level error correction code at clock time $R_c$ in FIG. 13. That is, each of packet (or frame) processors 315 and 358 of the terminal device in FIG. 3 includes a storage (buffer), and packet (or frame) processor 315 sequentially stores the packet or frame data and delays the data processing in the case that the terminal device receives the packet (or frame) of the broadcasting station. The terminal device performs the packet-level error correction decoding on the packet transmitted from the telecommunications line provider after a certain period elapses since the reception of all the packets is completed.

At clock time $R_c$ in FIG. 13, the terminal device loses packet "$3" and packet "$6" (however, packet "$3" and packet "$6" are illustrated in FIG. 13 for convenience). Because the terminal device obtains at least 5 packets as described above, all the packets, namely, packet "$1", packet "$2", packet "$3", packet "$4", packet "$5", packet "$6", and packet "$7" can be obtained.

Accordingly, the terminal device can obtain the first video and the second video by performing the decoding of the first video and the decoding of the second video after time point $R_c$, and can synchronously display the first video and the second video. Accordingly, the terminal device can synchronously display the first video and the second video on the display. Because the terminal device can obtain all the packets of the second videos at clock time $R_c$ even if not losing packet "$3" and packet "$6", it is not necessary for the terminal device to wait for the packet until clock time $R_2$ in FIG. 13.

Accordingly, the circuit scale of the storage in which the packet or frame data of the first video is stored can largely be reduced because waiting time necessary for obtaining all the packets of the second video is shortened in the terminal device. Conventionally, the disturbance of the video is generated in the terminal device due to the packet loss of the second video. On the other hand, in the first exemplary embodiment, the disturbance of the video is not generated even if the packet loss of a specific amount or less is generated.

In the above description, "the broadcasting station and the telecommunications line provider transmit the packets as illustrated in FIG. 9 A". For example, the broadcasting station and the telecommunications line provider may transmit the packets (or frame) of the first video at the identical clock time and the packets of the second video at the identical clock time with a time difference as illustrated in FIG. 10. In the case that the terminal device receives the packets (or frames) transmitted from the broadcasting station and the telecommunications line provider as illustrated in FIG. 13, the terminal device loses packet "$3" and packet "$6" at time point $R_c$. However, because the terminal device obtains at least 5 packets as described above, all the packets, namely, packet "$1", packet "$2", packet "$3", packet "$4", packet "$5", packet "$6", and packet "$7" can be obtained.

Accordingly, the terminal device can obtain the first video and the second video by performing the decoding of the first video and the decoding of the second video after time point $R_c$, and can synchronously display the first video and the second video. Therefore, it is not necessary for the terminal device to wait for the synchronous display until time point $R_2$ in FIG. 13 at which all the packets of the second video are obtained.

Figure 14:
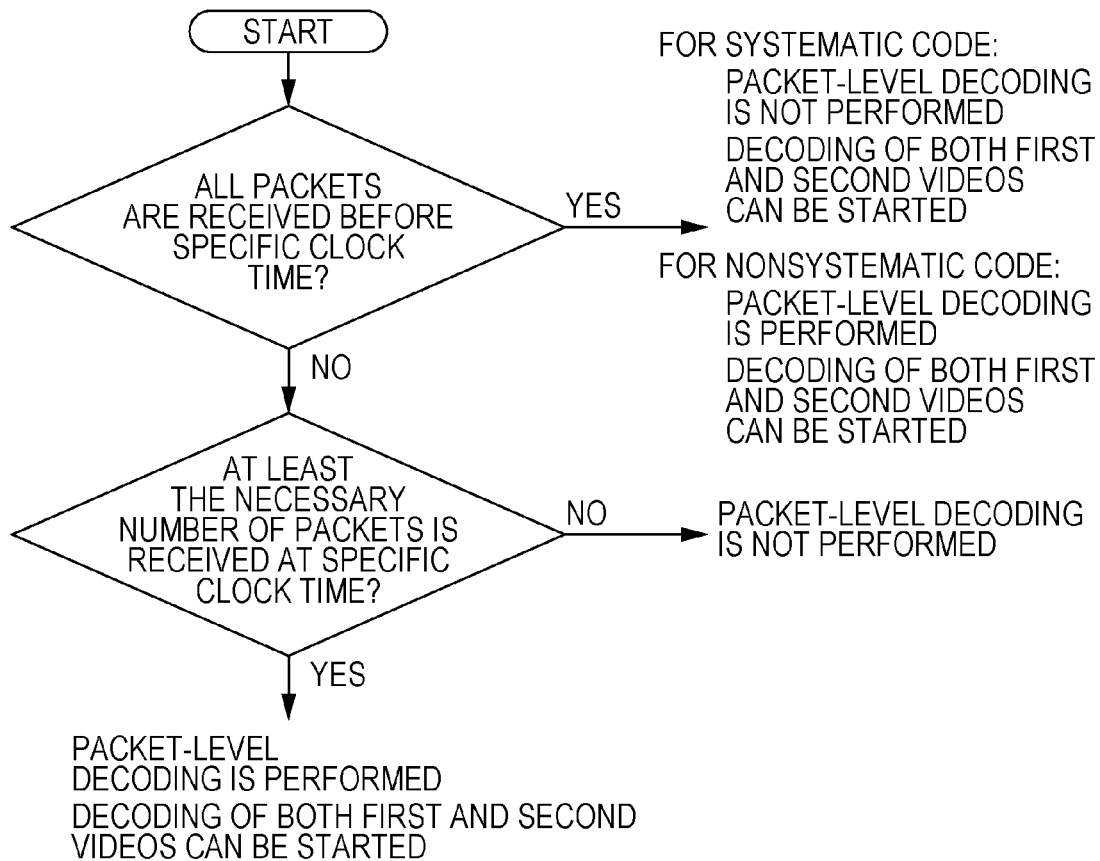
FIG. 14 is a view illustrating an example of the processing flow of the packet (or frame) processor in the terminal device.

The operation of packet (or frame) processor 358 of the terminal device in FIG. 3 will be described below. FIG. 14 is a flowchart illustrating an example of the processing of packet (or frame) processor 358 in the terminal device.

For example, time point $R_c$ in FIG. 13 is set to the specific clock time. The terminal device checks the following item.

(1) "Whether the terminal device completes the reception for all the packets (used to perform the video decoding) (or the packets necessary for the performance of the video decoding) (in the packets transmitted from the telecommunications line provider) before the specific clock time (time point $R_c$)?"

For an affirmative determination, the terminal device does not perform the packet-level decoding on the packet transmitted from the telecommunications line provider in the case that the systematic code is used in the packet-level coding. The terminal device may start the decoding because the decoding of the first video and the decoding of the second video can be started.

For the affirmative determination, the terminal device performs the packet-level decoding on the packet transmitted from the telecommunications line provider in the case that the nonsystematic code is used in the packet-level coding (the packet-level decoding may be started at time point $R_c$ or before time point $R_c$). The terminal device may start the decoding because the decoding of the first video and the decoding of the second video can be started.

For a negative determination, the flow goes as follows.

(2) "Whether the terminal device receives at least the necessary number of packets (in this case, 5 packets) (in the packets transmitted from the telecommunications line provider) at the specific clock time (time point $R_c$)?"

For the negative determination, the terminal device does not perform the packet-level decoding because it is difficult to restore the lost packet in the packets transmitted from the telecommunications line provider even if the packet-level decoding is performed.

For the affirmative determination, the terminal device performs the packet-level decoding because the lost packet in the packets transmitted from the telecommunications line provider can be restored when the packet-level decoding is performed. The terminal device starts the decoding because the decoding of the first video and the decoding of the second video can be started.

Figure 15:
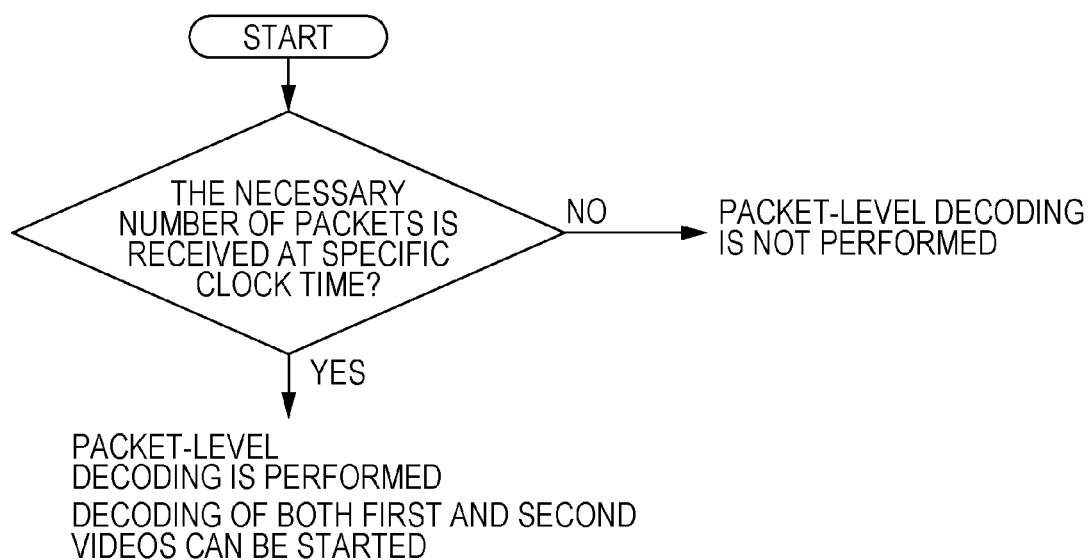
FIG. 15 is a view illustrating an example of the processing flow of the packet (or frame) processor in the terminal device.

The flowchart in FIG. 15 in which the flowchart in FIG. 14 is simplified may be performed (FIG. 15 has a characteristic that determination is not made before the specific clock time (time point $R_c$)).

"Whether the terminal device receives at least the necessary number of packets (in this case, 5 packets) (in the packets transmitted from the telecommunications line provider) at the specific clock time (time point $R_c$)?"

For the negative determination, the terminal device does not perform the packet-level decoding because it is difficult to restore the lost packet in the packets transmitted from the telecommunications line provider even if the packet-level decoding is performed.

For the affirmative determination, the terminal device performs the packet-level decoding because the lost packet in the packets transmitted from the telecommunications line provider can be restored when the packet-level decoding is performed. The terminal device starts the decoding because the decoding of the first video and the decoding of the second video can be started.

Although the introduction of the error correction code restoring the packet or frame loss in the broadcasting station is not described above, the similar processing can be performed even if the error correction code is introduced in the broadcasting station.

The case that the above description is adapted to a frame unit of the modulated signal transmitted from the broadcasting station will be described below.

Figure 16:
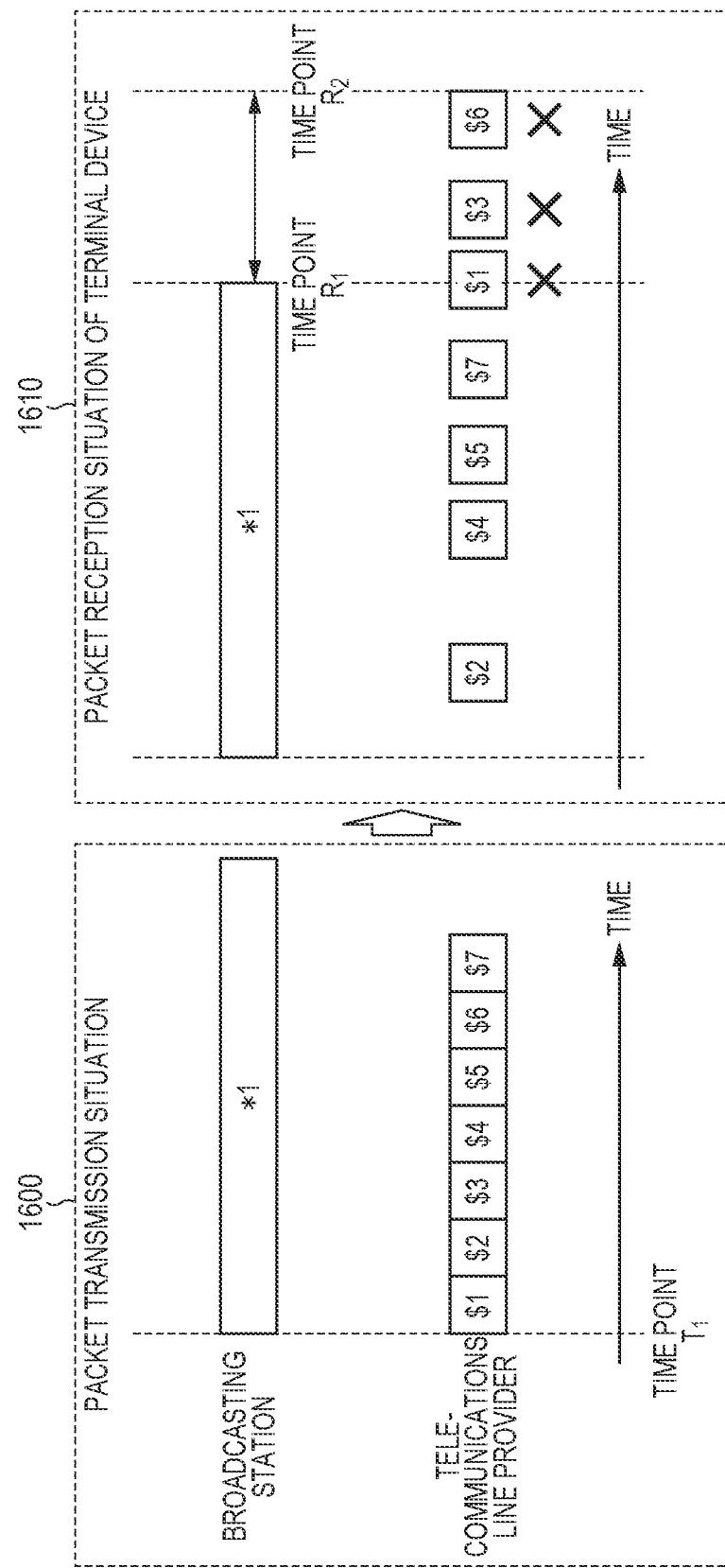
FIG. 16 is a view illustrating examples of the packet transmission situation and the packet reception situation.

FIG. 16A illustrates an example of transmission situation 1600 of the packets in which the broadcasting station and the telecommunications line provider transmit the pieces of information about the two videos at the identical clock time from different angles. In FIG. 16, the horizontal axis indicates the time. The broadcasting station transmits the data of the first video and that the telecommunications line provider transmits the data of the second video (for example, the first video and the second video are the videos at the identical clock time from the different angles).

Transmission situation 1600 in FIG. 16A differs from transmission situation 900 in FIG. 9A in that the first video transmitted from the broadcasting station is considered in the frame unit of the modulated signal when the broadcasting station adopts the wireless transmission method or the wired transmission method.

In FIG. 16A, the first video includes frame "*1", and the second video includes packet "$1", packet "$2", packet "$3", packet "$4", packet "$5", packet "$6", and packet "$7".

Similarly, the broadcasting station transmits the frame with respect to the first video in addition to frame "*1" from then on ((although not illustrated in FIG. 16). The 30 second video includes packets except for packet "#1", packet "#2", packet "#3", packet "#4", packet "#5", packet "#6", and packet "#7", and the telecommunications line provider similarly transmits the packet from then on (although not illustrated in FIG. 9).

Frame "*1" and packet "$1" transmitted from clock time $T_1$ in FIG. 16 include the video at the identical clock time, and the broadcasting station and the telecommunications line provider currently transmit the frame and packet.

FIG. 16B illustrates packet reception situation 1610 of the terminal device that receives the frame and packet. The terminal device completes the reception of frame "*1", which is transmitted from the broadcasting station, at clock time $R_1$.

As described above, the telecommunications line provider transmits the packet to the terminal device using TCP (TCP/IP) or UDP. Accordingly, even if the broadcasting station and the telecommunications line provider transmit the pieces of information about the two videos at the identical clock time from the different angle as illustrated in FIG. 16B, an arrival delay of the packet and a rearrangement of the packets are generated in the packets transmitted from the telecommunications line provider. The terminal device can easily predict the method in which the packet transmitted from the broadcasting station arrives at the terminal device, but it is difficult for the terminal device to predict the method in which the packet transmitted from the telecommunications line provider arrives at the terminal device.

For example, in FIG. 16B, assuming that $R_1$ is a clock time at which the terminal device completes the reception of the last packet of the broadcasting station, and that $R_2$ is a clock time at which the terminal device completes the reception of the last packet of the telecommunications line provider, frequently $R_1 < R_2$ holds.

Because the first video and the second video are the two videos at the identical clock time from the different angles, unless the first video and the second video are synchronously displayed on display 384 included in the terminal device of FIG. 3, there is a high possibility of providing an uncomfortable feeling to the viewer. For example, in the case that the first video is a general angle of soccer while the second video is an angle of an individual player, there is a high possibility of dissatisfying the viewer when the first video is a moment at which player A shoots a goal at the general angle of the soccer while the second video is a moment at which the player A already makes the goal.

In the case that the decoding of the first video and the decoding of the second video at clock time $R_1$, the first video is displayed on the terminal device, and the second video is hardly displayed with little disturbance on the terminal device because packet "$1", packet "$3", and packet "$6" of the second video do not arrive.

In the case that the decoding of the first video and the decoding of the second video are performed at clock time $R_2$, the terminal device delays the clock time at which the first video is displayed in order to synchronize the first video display and the second video display. Accordingly, in the terminal device, it is necessary to provide a storage (buffer) for the delay of the first video data. For a small delay amount (or within a permissible range), the terminal device may use the method for delaying the start clock time of the decoding. However, the delay amount is not kept constant in the TCP (TCP/IP) or UDP, and possibly the delay amount is further increased in the case that the terminal device obtains the packet through a wireless LAN. Therefore, in the method for delaying the start clock time of the decoding, it is necessary to enlarge the scale of the storage in the terminal device in order to synchronously display the first video and the second video. In consideration of this point, for the adaption of the method for delaying the decoding start clock time in the terminal device, there is a demand for introduction of a technique of decreasing the disturbance of the video even if a delay time is shortened.

Figure 17:
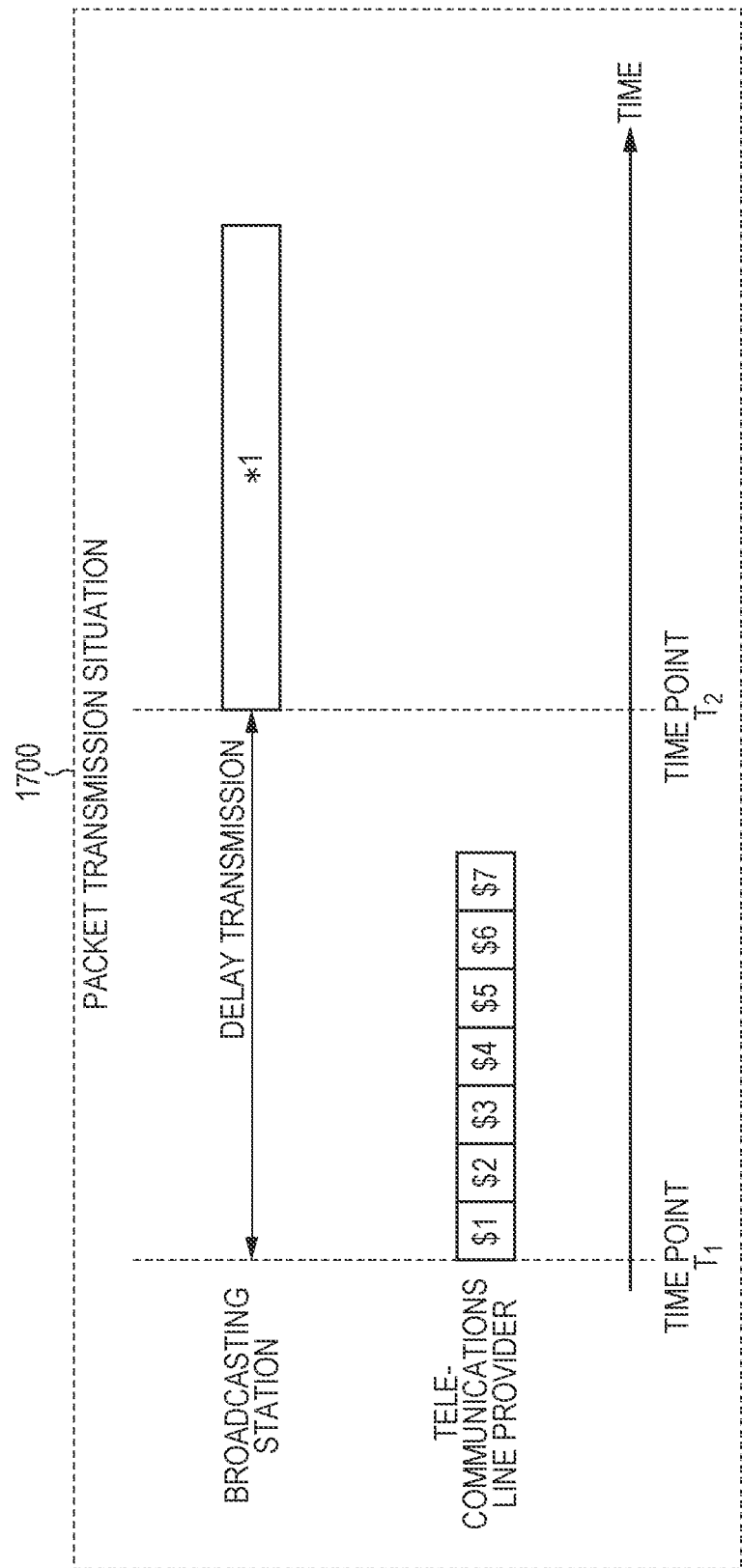
FIG. 17 is a view illustrating an example of the packet transmission situation.

A transmission method in FIG. 17 is proposed as a method for shortening the delay time to reduce the disturbance of the video. FIG. 17 illustrates an example of transmission situation 1700 of the packets in which the broadcasting station and the telecommunications line provider transmit the pieces of information about the two videos at the identical clock time from different angles. In FIG. 17, the horizontal axis indicates the time. Transmission situation 1700 in FIG. 17 differs from transmission situation 1600 in FIG. 16A in that the packet transmitted from the broadcasting station is delayed in consideration of the arrival delay of the packet transmitted from the telecommunications line provider at the terminal device. In FIG. 17, the telecommunications line provider starts the transmission of the packet from clock time point $T_1$ to sequentially transmit packet "#1", packet "#2", packet "#3", packet "#4", packet "#5", packet "#6", and packet "#7".

Therefore, packet (or frame) processors 202 and 222 in FIG. 2 have a packet (or frame) accumulating function in order to delay and transmit the generated packet, and transmit the packet or frame with the packet or frame delayed for an accumulated amount.

The broadcasting station starts the transmission of the frame from clock time $T_2$ ($T_1 \neq T_2$: although $T_1 < T_2$ in this case, $T_1 > T_2$ is also considered) to transmit frame "*1".

Figure 18:
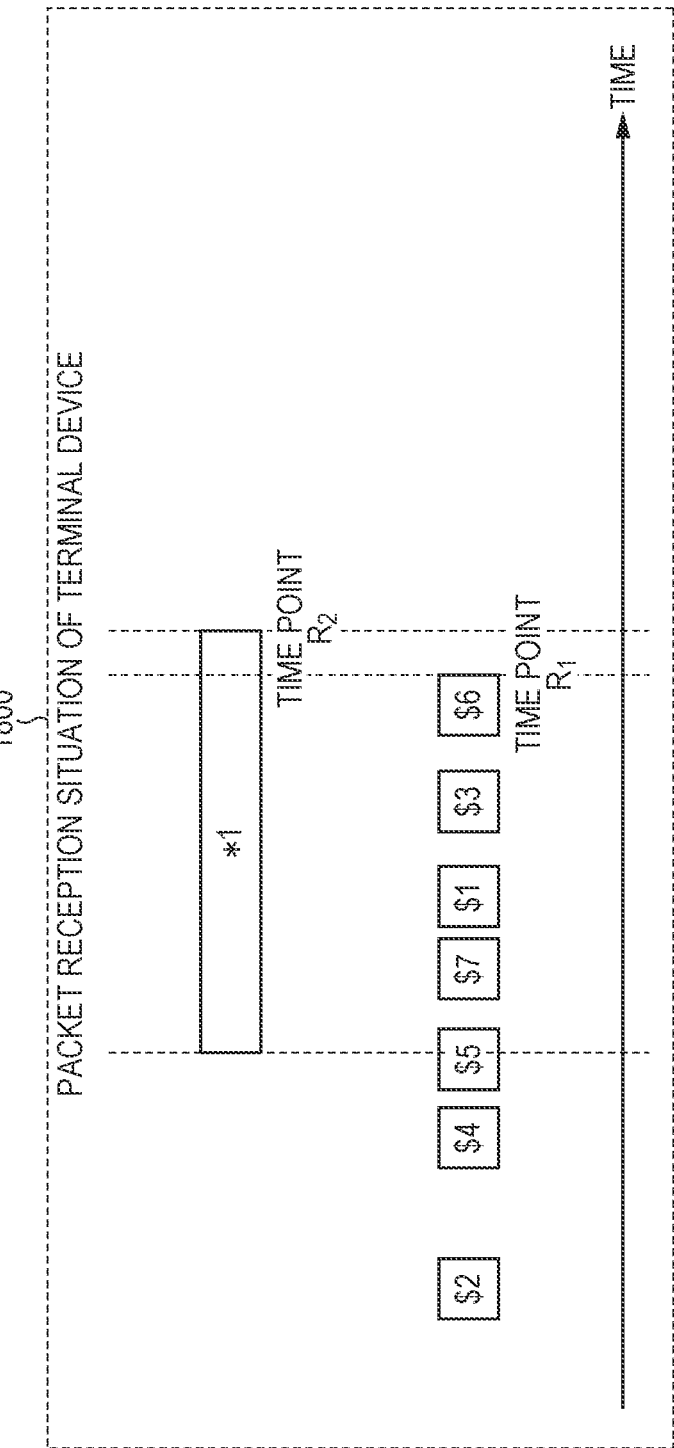
FIG. 18 is a view illustrating an example of the packet reception situation.

FIG. 18 illustrates an example of reception situation 1800 of the packet that is received with the terminal device when the broadcasting station and the telecommunications line provider transmit the packets in FIG. 17.

Referring to FIG. 18, similarly to the example in FIG. 16, the terminal device receives frame "*1" transmitted from the broadcasting station, and completes the reception at clock time $R_2$.

Figure 19:
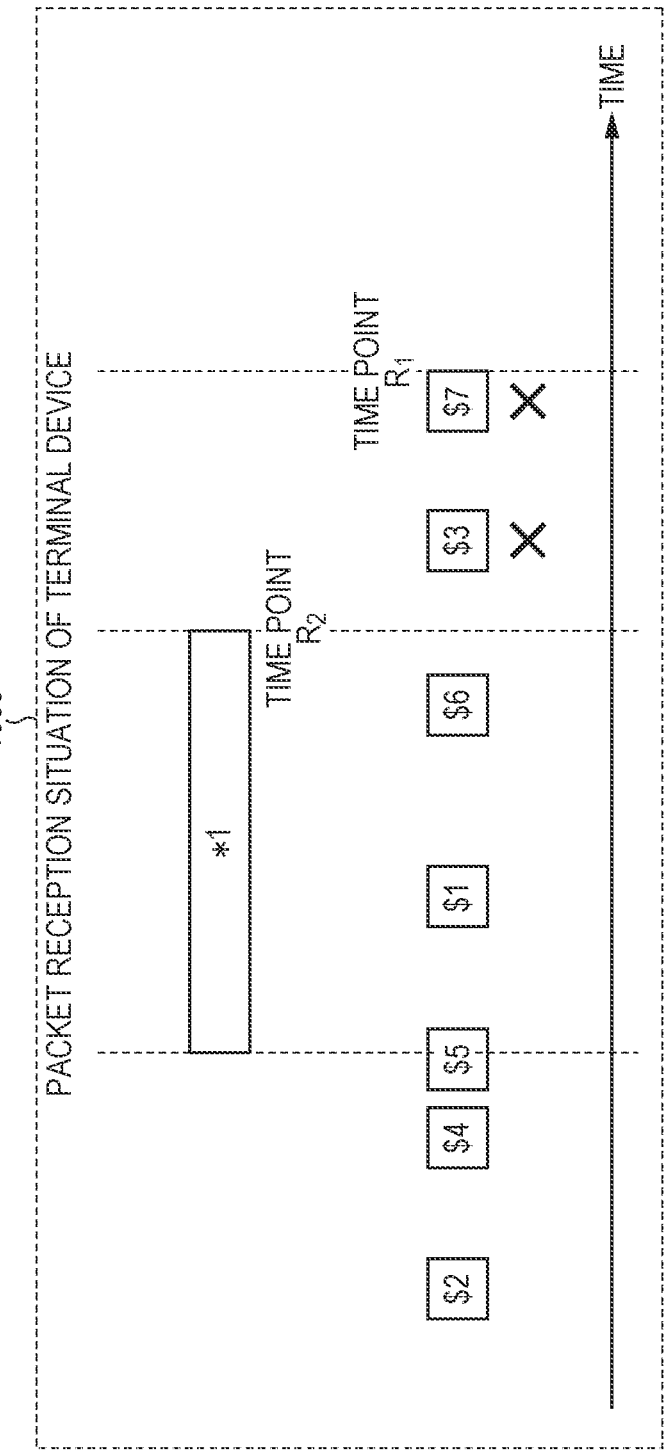
FIG. 19 is a view illustrating an example of the packet reception situation.

The terminal device receives the packet transmitted from the telecommunications line provider, and completes the reception of all the packets transmitted from the telecommunications line provider at clock time $R_1$. Because the packet in FIG. 17 is transmitted, $R_1 < R_2$ holds in FIG. 19. Compared with the case that the packet in FIG. 16 is transmitted, there is a possibility of being able to decrease a difference between "the time point at which the terminal device completes the reception for all the packets transmitted from the broadcasting station" and "the time point at which the terminal device completes the reception for all the packets transmitted from the telecommunications line provider". Accordingly, the circuit scale used to accumulate and store the packet can be reduced in the terminal device. In FIG. 19, the decoding of the first video and the decoding of the second video may be started at clock time $R_2$. However, it is necessary for the broadcasting station and the telecommunications line provider to provide a packet accumulator that delays and transmits the packet, which leads to the enlargement of the circuit scale.

Because actually the plurality (a large number) of terminal devices exist, compared with the enlargement of the circuit scale in the broadcasting station or telecommunications line provider, the enlargement of the circuit scale in the terminal device becomes troublesome from the viewpoint of the enlargement of the total circuit scale. Accordingly, the method is effective in suppressing the disturbance of the video while suppressing the enlargement of the circuit scale.

However, the disturbance of the video is not always generated. For example, the terminal device receives the packet as illustrated in FIG. 19, namely, the terminal device receives the packet transmitted from the telecommunications line provider with a delay as illustrated in FIG. 16B. The difference between "the time point at which the terminal device completes the reception for all the packets transmitted from the broadcasting station" and "the time point at which the terminal device completes the reception for all the packets transmitted from the telecommunications line provider" is decreased compared with the case in FIG. 16B. However, because the terminal device synchronously displays the first and second videos at clock time $R_1$ at which packet "$3" and packet "$7" are lost, the disturbance of the second video is generated in the case that the decoding of the second video is started.

The broadcasting station and the transmission device of the telecommunications line provider control the delay amount, which allows the reduction of the disturbance of the second video.

Signal processor 380 of the terminal device in FIG. 3 obtains the information about the difference in arrival time between the frame transmitted from the broadcasting station and the packet transmitted from the telecommunications line provider at the identical clock time (or its statistical information), and output the time difference information 399. Time difference information 399 is transmitted from the transmission device of the terminal device to the telecommunications line provider.

Transmission device 250 of the telecommunications line provider in FIG. 2 includes a receiver (not illustrated) to acquire time difference information 299 transmitted from the terminal device. Time difference information 299 is input to packet (or frame) processors 202 and 222, and packet (or frame) processors 202 and 222 changes the amount of packet or frame storage to control transmission timing, and outputs the packet or frame in which the delay amount is controlled.

In FIG. 2, it is difficult for broadcasting station 240 to control the delay amount in each terminal device (because of multicasting). Accordingly, packet (or frame) processor 222 of transmission device 250 of the telecommunications line provider controls the delay amount for each terminal device. In the case that transmission device 250 of telecommunications line provider does not individually transmit the packet to the terminal device, namely, in the case that transmission device 250 performs the multicasting, broadcasting station 240 may control the delay time (packet transmission timing), or the telecommunications line provider may control the delay time (packet transmission timing).

The case that "the transmission device of the telecommunications line provider uses the error correction code restoring the packet or frame loss (the packet-level error correction coding)" will be described below.

The telecommunications line provider transfers the information about the second video including 16384×4=65536 bits. At this point, because the number of bits of the information constituting one packet is set to 16384 bits (additionally, as described above, the control information is separately transferred), the information about the second video is the information bits that can obtain 65536/16384=4 packets. The telecommunications line provider performs the error correction code (the packet-level error correction coding) restoring the packet or frame loss as illustrated in FIGS. 4 and 5. The error correction code used at that time has the code length of 114688 bits and the code rate of 4/7.

For example, the packet in FIG. 4 is generated in the error correction code of the systematic code. For example, the packet in FIG. 5 is generated in the error correction code of the nonsystematic code. The telecommunications line provider performs the coding in FIG. 4 or 5 on the information about the second video including 65536 bits to generate 7 packets (because the number of bits of the information constituting one packet is 16384 bits).

The 7 packets are packet "$1", packet "$2", packet "$3", packet "$4", packet "$5", packet "$6", and packet "$7". When the number of bits larger than that of the pre-coding information is received, namely, when at least 5 packets are received, the terminal device can restore all the packets. Therefore, for example, the broadcasting station and the telecommunications line provider transmit the frame and packet as illustrated in FIG. 16A (the detailed description is already made).

Figure 20:
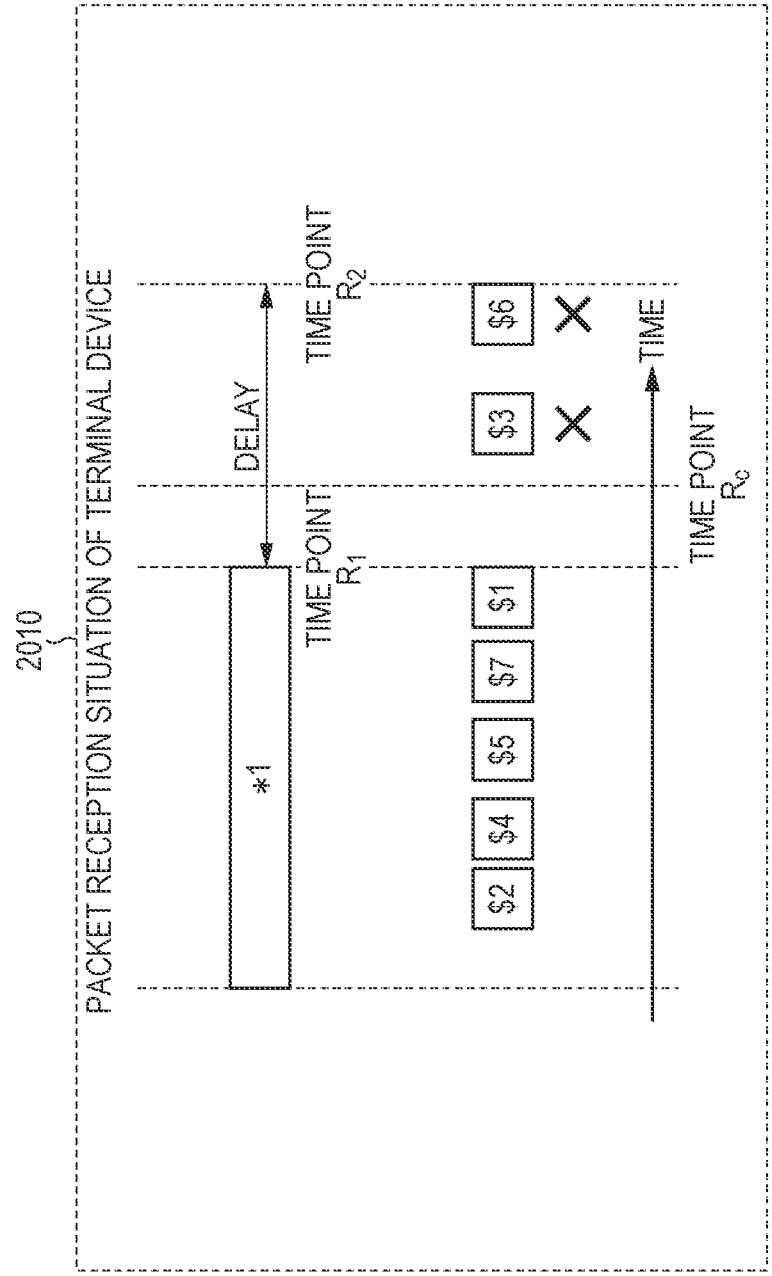
FIG. 20 is a view illustrating an example of the packet reception situation.

In the case that the terminal device in FIG. 3 is in the packet reception situation in FIG. 20, the terminal device decodes the packet-level error correction code at clock time $R_c$ in FIG. 20. That is, each of packet (or frame) processors 315 and 358 of the terminal device in FIG. 3 includes a storage (buffer), and packet (or frame) processor 315 sequentially stores the frame data and delays the data processing in the case that the terminal device receives the frame of the broadcasting station. The terminal device performs the packet-level error correction decoding on the packet transmitted from the telecommunications line provider after a certain period elapses since the reception of all the frames is completed.

At clock time $R_c$ in FIG. 20, the terminal device loses packet "$3" and packet "$6" (however, packet "$3" and packet "$6" are illustrated in FIG. 20 for convenience). Because the terminal device obtains at least 5 packets as described above, all the packets, namely, packet "$1", packet "$2", packet "$3", packet "$4", packet "$5", packet "$6", and packet "$7" can be obtained.

Accordingly, the terminal device can obtain the first video and the second video by performing the decoding of the first video and the decoding of the second video after time point $R_c$, and can synchronously display the first video and the second video. Accordingly, the terminal device can synchronously display the first video and the second video on the display. Because the terminal device can obtain all the packets of the second videos at clock time $R_c$ even if not losing packet "$3" and packet "$6", it is not necessary for the terminal device to wait for the packet until clock time $R_2$ in FIG. 20.

Accordingly, the circuit scale of the storage in which the frame data of the first video is stored can largely be reduced because waiting time necessary for obtaining all the packets of the second video is shortened in the terminal device. Conventionally, the disturbance of the video is generated in the terminal device due to the packet loss of the second video. On the other hand, in the first exemplary embodiment, the disturbance of the video is not generated even if the packet loss of a specific amount or less is generated.

In the above description, "the broadcasting station and the telecommunications line provider transmit the frame and packet as illustrated in FIG. 16A". For example, the broadcasting station and the telecommunications line provider may transmit the frame of the first video at the identical clock time and the packets of the second video at the identical clock time with a time difference as illustrated in FIG. 17. In the case that the terminal device receives the packets (or frames) transmitted from the broadcasting station and the telecommunications line provider as illustrated in FIG. 20, the terminal device loses packet "$3" and packet "$6" at time point $R_c$. However, because the terminal device obtains at least 5 packets as described above, all the packets, namely, packet "$1", packet "$2", packet "$3", packet "$4", packet "$5", packet "$6", and packet "$7" can be obtained.

Accordingly, the terminal device can obtain the first video and the second video by performing the decoding of the first video and the decoding of the second video after time point $R_c$, and can synchronously display the first video and the second video. Therefore, it is not necessary for the terminal device to wait for the synchronous display until time point $R_2$ in FIG. 13 at which all the packets of the second video are obtained.

The operation of packet (or frame) processor 358 of the terminal device in FIG. 3 will be described below. FIG. 14 is a flowchart illustrating an example of the processing of packet (or frame) processor 358 in the terminal device.

For example, time point $R_c$ in FIG. 20 is set to the specific clock time. The terminal device checks the following item.

(1) "Whether the terminal device completes the reception for all the packets (used to perform the video decoding) (or the packets necessary for the performance of the video decoding) (in the packets transmitted from the telecommunications line provider) before the specific clock time (time point $R_c$)?"

For an affirmative determination, the terminal device does not perform the packet-level decoding on the packet transmitted from the telecommunications line provider in the case that the systematic code is used in the packet-level coding. The terminal device may start the decoding because the decoding of the first video and the decoding of the second video can be started.

For the affirmative determination, the terminal device performs the packet-level decoding on the packet transmitted from the telecommunications line provider in the case that the nonsystematic code is used in the packet-level coding (the packet-level decoding may be started at time point $R_c$ or before time point $R_c$). The terminal device may start the decoding because the decoding of the first video and the decoding of the second video can be started.

For a negative determination, the flow goes as follows.

(2) "Whether the terminal device receives at least the necessary number of packets (in this case, 5 packets) (in the packets transmitted from the telecommunications line provider) at the specific clock time (time point $R_c$)?"

For the negative determination, the terminal device does not perform the packet-level decoding because it is difficult to restore the lost packet in the packets transmitted from the telecommunications line provider even if the packet-level decoding is performed.

For the affirmative determination, the terminal device performs the packet-level decoding because the lost packet in the packets transmitted from the telecommunications line provider can be restored when the packet-level decoding is performed. The terminal device starts the decoding because the decoding of the first video and the decoding of the second video can be started.

The flowchart in FIG. 15 in which the flowchart in FIG. 14 is simplified may be performed (FIG. 15 has a characteristic that determination is not made before the specific clock time (time point $R_c$)).

"Whether the terminal device receives at least the necessary number of packets (in this case, 5 packets) (in the packets transmitted from the telecommunications line provider) at the specific clock time (time point $R_c$)?"

For the negative determination, the terminal device does not perform the packet-level decoding because it is difficult to restore the lost packet in the packets transmitted from the telecommunications line provider even if the packet-level decoding is performed.

For the affirmative determination, the terminal device performs the packet-level decoding because the lost packet in the packets transmitted from the telecommunications line provider can be restored when the packet-level decoding is performed. The terminal device starts the decoding because the decoding of the first video and the decoding of the second video can be started.

Although the introduction of the error correction code restoring the packet or frame loss in the broadcasting station is not described above, the similar processing can be performed even if the error correction code is introduced in the broadcasting station.

Although the processing unit is described as the packet or frame unit in the first exemplary embodiment, the processing unit is not limited to the packet or frame unit. The delay in the storage is not necessarily generated in the frame or packet unit. The delay time may be generated at time intervals of a plurality of frame units or a plurality of packet units.

Configuration examples of packet (or frame) processors 202 and 222 in the broadcasting station and the transmission device owned by the telecommunications line provider in FIG. 2 will be described below.

Figure 21:
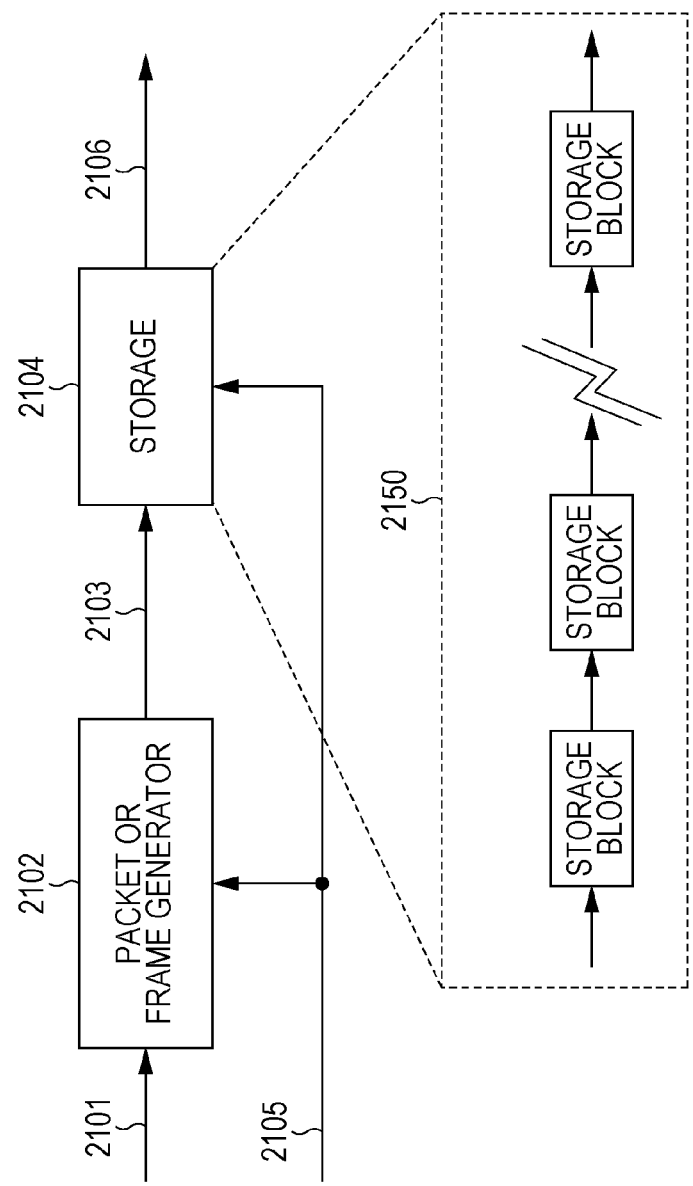
FIG. 21 is a view illustrating configuration examples of the packet (or frame) processors in the broadcasting station and the transmission device owned by the telecommunications line provider.

FIG. 21 illustrates configuration examples of packet (or frame) processors 202 and 222 in the broadcasting station and the transmission device owned by the telecommunications line provider in FIG. 2.

Video and/or audio information 2101 and control signal 2105 are input to packet or frame generator 2102. Packet or frame generator 2102 performs processing based on control signal 2105. For example, in the case that the error correction coding of the packet layer is performed, packet or frame generator 2102 performs the processing in FIGS. 4 and 5 on video and/or audio information 2101 to output packetized or framed data 2103. In the case that packetization or framing is performed, packet or frame generator 2102 packetizes or frames video and/or audio information 2101 to output packetized or framed data 2103.

Packetized or framed data 2103 and control signal 2105 are input to storage 2104, packetized or framed data 2103 is stored and delayed in storage 2104 based on control signal 2105, and storage 2104 outputs the delayed packetized or framed data 2106.

FIG. 21 illustrates a configuration example of storage 2104. In the operation of storage 2104, storage blocks are connected in series, an input data group is stored in the storage block, and the stored data group is output.

The operation of packet (or frame) processors 315 and 358 of the terminal device in FIG. 3 will be described below.

Figure 22:
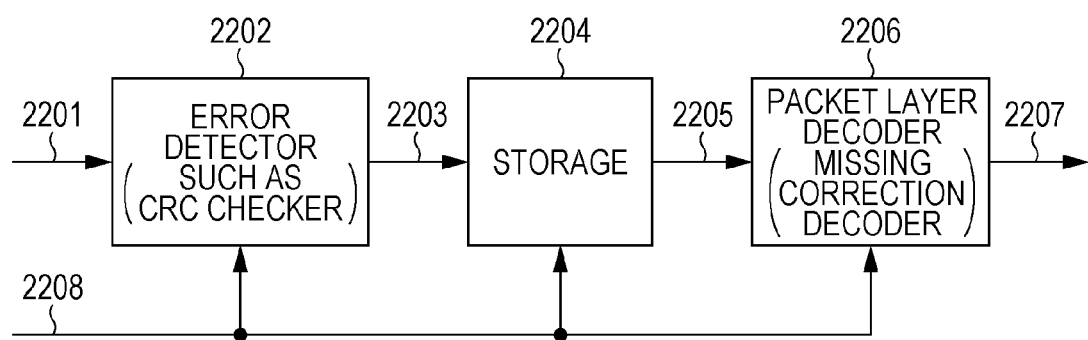
FIG. 22 is a view illustrating a configuration example of the case that the packet (or frame) processor in the terminal device performs error correction decoding on a packet layer.

FIG. 22 illustrates a configuration example in which packet (or frame) processors 315 and 358 of the terminal device in FIG. 3 perform the error correction decoding on the packet layer. The operation is described with reference to FIG. 20.

Received data 2201 and control signal 2208 are input to error detector (for example, CRC checker) 2202.

For example, the packet is received as illustrated in FIG. 20, and error detector (for example, CRC checker) 2202 performs the error detection on packet "$2". Because no error is detected in packet "$2", error detector 2202 outputs packet "$2" as packet information 2203

Similarly, error detector (for example, CRC checker) 2202 performs the error detection on packet "$4". Because no error is detected in packet "$4", error detector 2202 outputs packet "$4" as packet information 2203

Error detector (for example, CRC checker) 2202 performs the error detection on packet "$5". Because no error is detected in packet "$5", error detector 2202 outputs packet "$5" as packet information 2203

Error detector (for example, CRC checker) 2202 performs the error detection on packet "$7". Because no error is detected in packet "$7", error detector 2202 outputs packet "$7" as packet information 2203

Error detector (for example, CRC checker) 2202 performs the error detection on packet "$1". Because no error is detected in packet "$1", error detector 2202 outputs packet "$1" as packet information 2203

Because the packet layer is decoded at time point $R_c$ as described above, error detector (for example, CRC checker) 2202 discards packet "$3" and packet "$6" even if receiving packet "$3" and packet "$6".

Packet information 2203 and control signal 2208 are input to storage 2204, and storage 2204 controls the storage and output of the packet based on control signal 2208.

For example, referring to FIG. 20, packet "$2", packet "$4", packet "$5", packet "$7", and packet "$1" are input to storage 2204. Accordingly, packet "$2", packet "$4", packet "$5", packet "$7", and packet "$1" are stored in storage 2204. When control signal 2208 indicates time point $R_c$, an instruction to output stored packet "$2", packet "$4", packet "$5", packet "$7", and packet "$1" is issued to storage 2204. Accordingly, storage 2204 outputs packet "$2", packet "$4", packet "$5", packet "$7", and packet "$1" as stored packet 2205.

Stored packet 2205 and control signal 2208 are input to packet layer decoder (missing correction decoder) 2206. When control signal 2208 indicates time point $R_c$, using packet "$2", packet "$4", packet "$5", packet "$7", and packet "$1", which are output from storage 2204, packet layer decoder (missing correction decoder) 2206 performs missing correction decoding (for example, belief propagation decoding such as sum-product decoding in the case that an LDPC (Low-Density Parity-Check) code is used as the error correction code). At this point, because packet layer decoder (missing correction decoder) 2206 can restore all the pieces of information, packet layer decoder (missing correction decoder) 2206 outputs reception video and/or audio information 2207.

The operation in FIG. 22 varies slightly in the case that the error correction coding of the packet layer is performed in the transmission of the broadcasting station in FIG. 2. This point will be described below.

The broadcasting station transmits the packet or frame to the terminal device using the wireless transfer scheme or wired transfer scheme. At this point, depending on a variation of the propagation path, sometimes all the packets cannot be correctly received even if the terminal device in FIG. 3 performs the error correction decoding on the physical layer. For example, packet "#1" can be received with no error, packet "#2" has the error, packet "#3" can be received with no error, . . . .

Error detector (for example, CRC checker) 2202 in FIG. 22 determines whether the error exists in the packet unit using the error detection code. Therefore, error detector (for example, CRC checker) 2202 determines that packet "#1" is correct, that packet "#2" has the error, namely, the packet loss, that packet "#3" is correct, . . . .

Packet layer decoder 2206 in FIG. 22 performs the error correction decoding (missing correction decoding) using the correct packets, restores the packet in which the packet loss is generated, and outputs reception video and/or audio information 2207.

Figure 23:
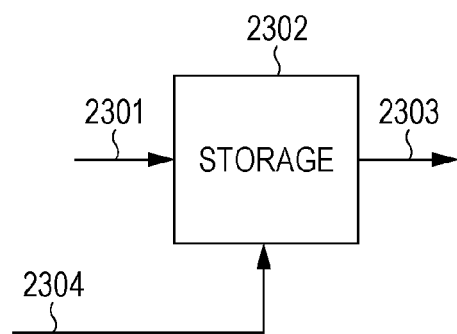
FIG. 23 is a view illustrating a configuration example of the case that the packet (or frame) processor in the terminal device does not perform the error correction decoding on a packet layer.

FIG. 23 illustrates a configuration of packet (or frame) processor 315 in FIG. 3 in the case that the error correction decoding is not performed on the packet layer in the transmission of the broadcasting station in FIG. 2. The operation is described with reference to FIG. 20.

Received data 2301 and control signal 2304 are input to storage 2302.

For example, in the case that the terminal device receives frame "*1" as illustrated in FIG. 20, the received data of frame "*1" is input to and stored in storage 2302. When control signal 2304 indicates time point $R_c$, storage 2302 outputs stored data (the received data of frame "*1") 2303.

The transmission method, in which the error correction coding at the packet level is performed during the transfer of the second video when the broadcasting station transmits the first video of the multiangle first and second videos while the telecommunications line provider transmits the second video, is described in the first exemplary embodiment. Therefore, the terminal device can synchronously display the first video and the second video, and the videos has little disturbance.

In the first exemplary embodiment, the reception device and antenna of the terminal device may be separated from each other. For example, the reception device includes an interface to which the signal received from the antenna or the signal, in which the frequency conversion is performed on the signal received from the antenna, is input through a cable, and the reception device performs the subsequent processing.

The data and information obtained with the reception device are converted into the video and video, displayed on the monitor, or output from the speaker. The data and information obtained with the reception device may be subjected to signal processing associated with the video and audio (or need not to be subjected to the signal processing), and output from an RCA terminal (video terminal and audio terminal), a USB (Universal Serial Bus), an HDMI (registered trademark) (High-Definition Multimedia Interface), and a digital terminal, which are included in the reception device.

Second Exemplary Embodiment

In the description of a second exemplary embodiment, the first exemplary embodiment is applied to a condition in the case that a plurality of broadcasting stations transfer information or the broadcasting station transfers information through a plurality of mediums (such as satellite broadcasting, terrestrial broadcasting, and cable broadcasting).

Figure 24:
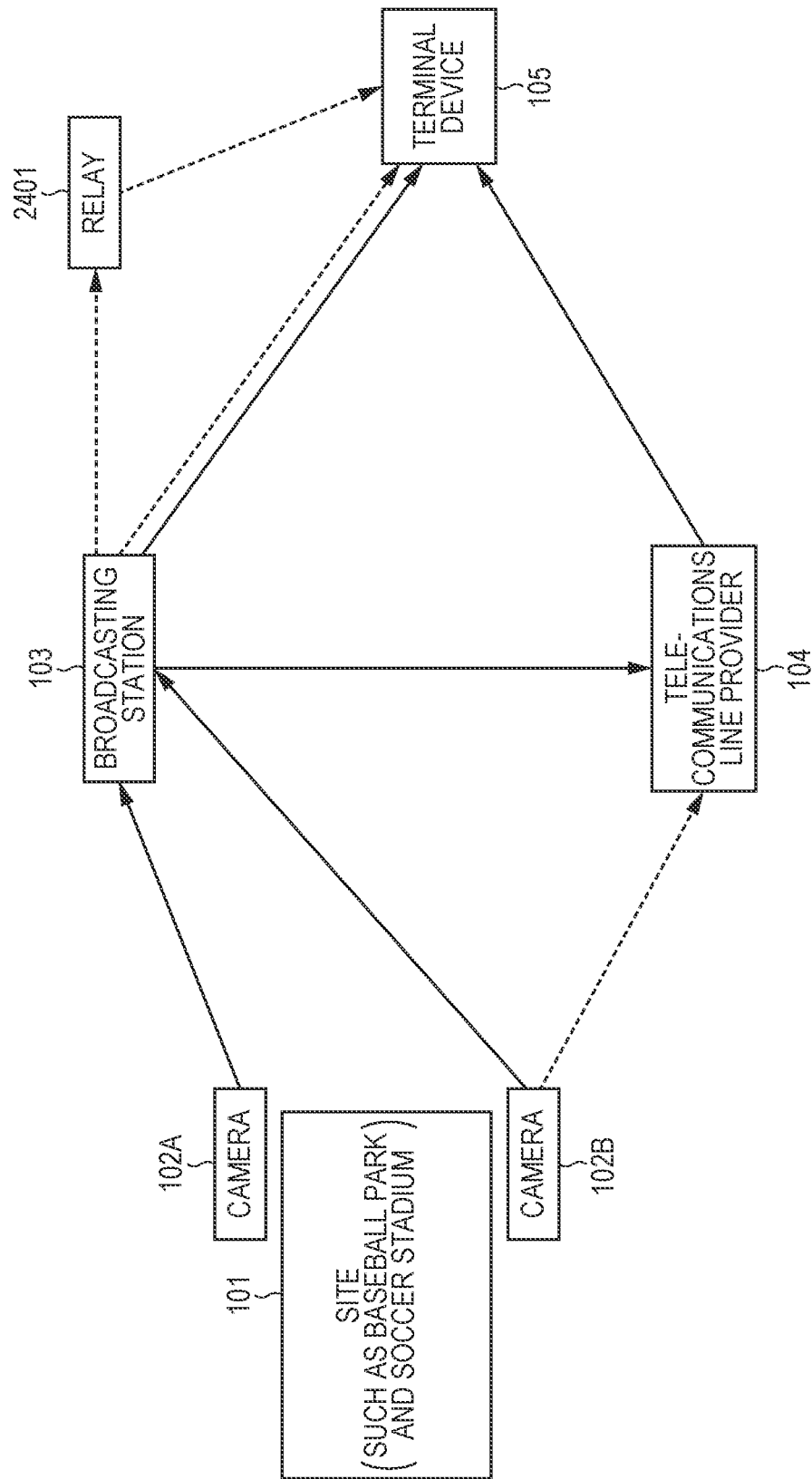
FIG. 24 is a view illustrating an example of the relationship among the broadcasting station, the telecommunications line provider, and the terminal device.

FIG. 24 illustrates an example of a relationship among the broadcasting station, the telecommunications line provider, and the terminal device. The relationship in FIG. 24 differs from that in FIG. 1. In FIG. 24, the component similar to that in FIG. 1 is designated by the identical reference mark.

Referring to FIG. 24, a method (a dotted-line arrow from broadcasting station 103 toward terminal device 105) in which broadcasting station 103 transmits the angle (first video) photographed with camera 102A to terminal device 105 through a path different from that in FIG. 1 and a method in which broadcasting station 103 transmits the angle (first video) to terminal device 105 through relay 2401 exist in addition to the method (a solid-line arrow from broadcasting station 103 toward terminal device 105) in which broadcasting station 103 transmits the information to terminal device 105 through the path similar to that in FIG. 1. Although the three paths exist in FIG. 24, the number of paths is not limited to three.

Figure 25:
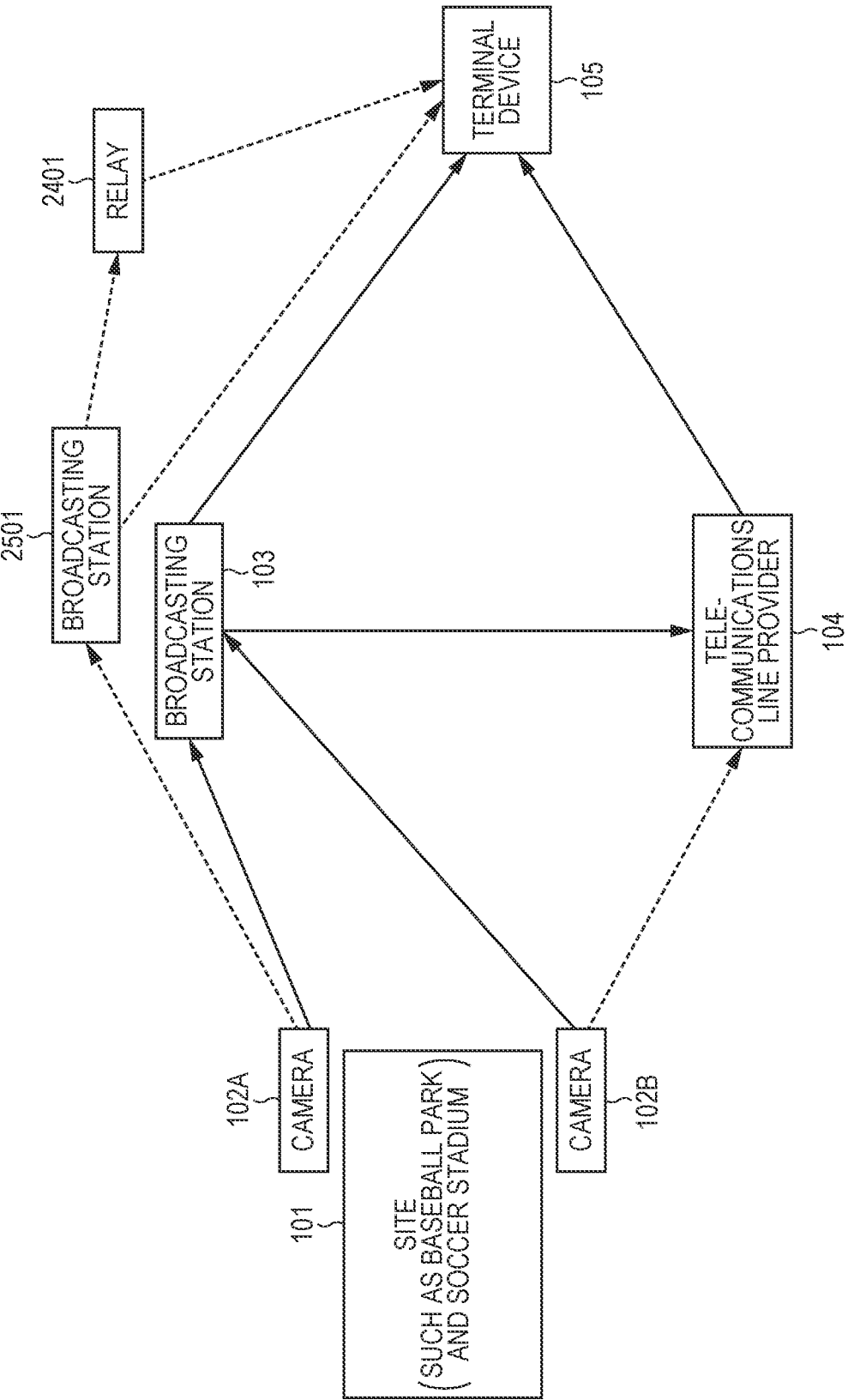
FIG. 25 is a view illustrating an example of the relationship among the broadcasting station, the telecommunications line provider, and the terminal device.

FIG. 25 illustrates a method for transmitting the angle (first video) photographed with camera 102A terminal device 105 through the three paths similarly to FIG. 24, and broadcasting station 2501 is newly disposed. In FIG. 25, the component similar to that in FIGS. 1 and 24 is designated by the identical reference mark.

In FIG. 25, a method (a dotted-line arrow from broadcasting station 2501 toward terminal device 105) in which broadcasting station 2501 transmits the angle (first video) photographed with camera 102A to terminal device 105 through a path different from that in FIG. 1 and a method in which broadcasting station 2501 transmits the angle (first video) to terminal device 105 through relay 2401 exist in addition to the method (a solid-line arrow from broadcasting station 103 toward terminal device 105) in which broadcasting station 103 transmits the information to terminal device 105 through the path similar to that in FIG. 1. Although the three paths exist in FIG. 25, the number of paths is not limited to three.

Figure 26:
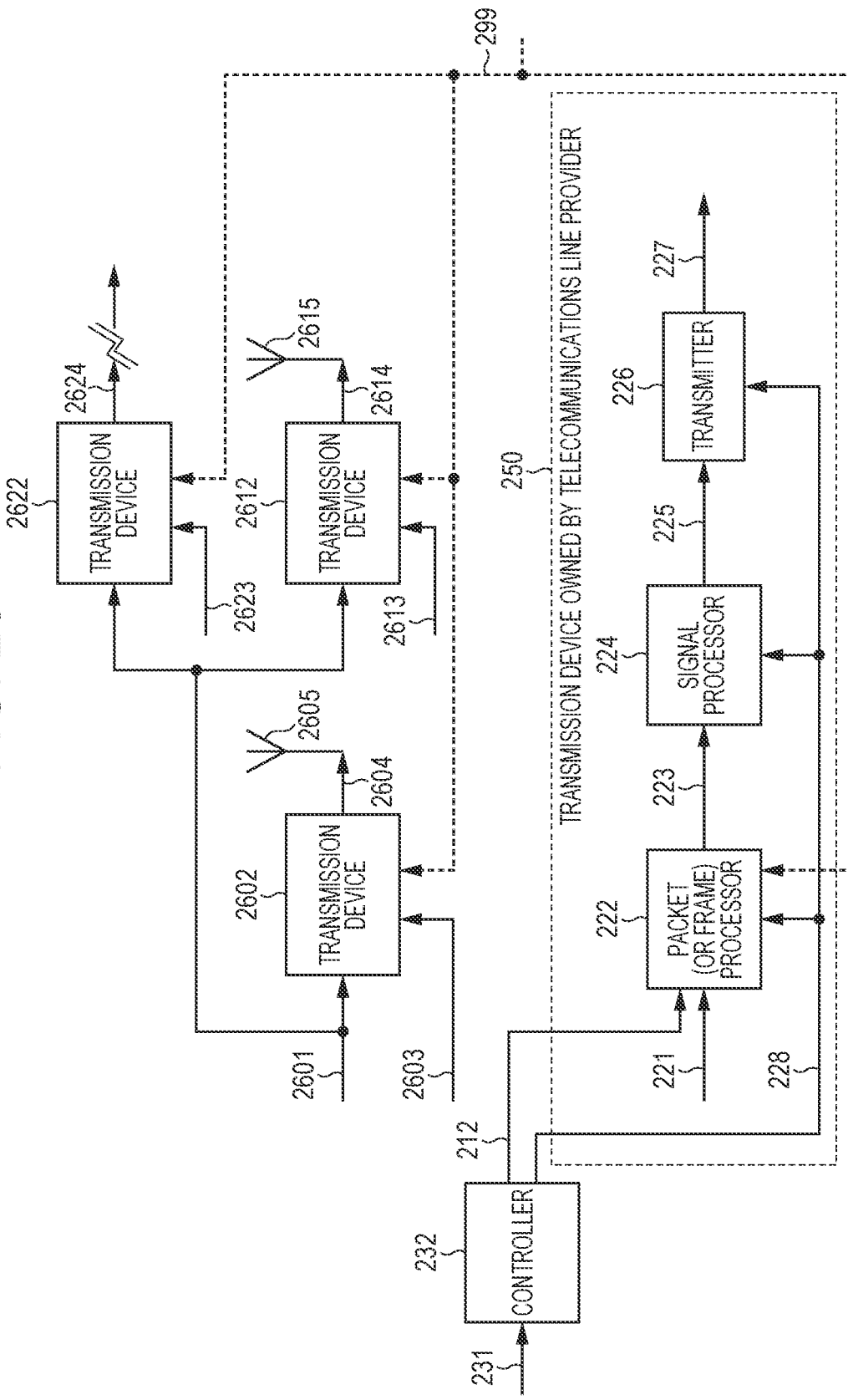
FIG. 26 is a view illustrating configuration examples of the broadcasting station and the transmission device owned by the telecommunications line provider.

FIG. 26 illustrates configuration examples of the broadcasting station and the transmission device owned by the telecommunications line provider in FIGS. 24 and 25. In FIG. 26, the component operated similarly to FIG. 2 is designated by the identical reference mark. Accordingly, transmission device 250 owned by the telecommunications line provider performs all the operations (such as the packet-level coding and the delay transmission).

First video and/or audio information 2601 and control signal 2603 are input to transmission device 2602, and transmission device 2602 decides the transmission method based on control signal 2603, and outputs modulated signal 2604 from antenna 2605. Similarly, first video and/or audio information 2601 and control signal 2613 are input to transmission device 2612, and transmission device 2612 decides the transmission method based on control signal 2613, and outputs modulated signal 2614 from antenna 2615.

First video and/or audio information 2601 and control signal 2623 are input to transmission device 2622, and transmission device 2622 decides the transmission method based on the control signal 2613, and outputs modulated signal 2624. Modulated signal 2624 is transferred to the terminal device in the wired manner.

At this point, transmission devices 2602, 2612, and 2622 are transmission devices associated with the broadcasting station. The operation of each transmission device is described later.

Figure 27:
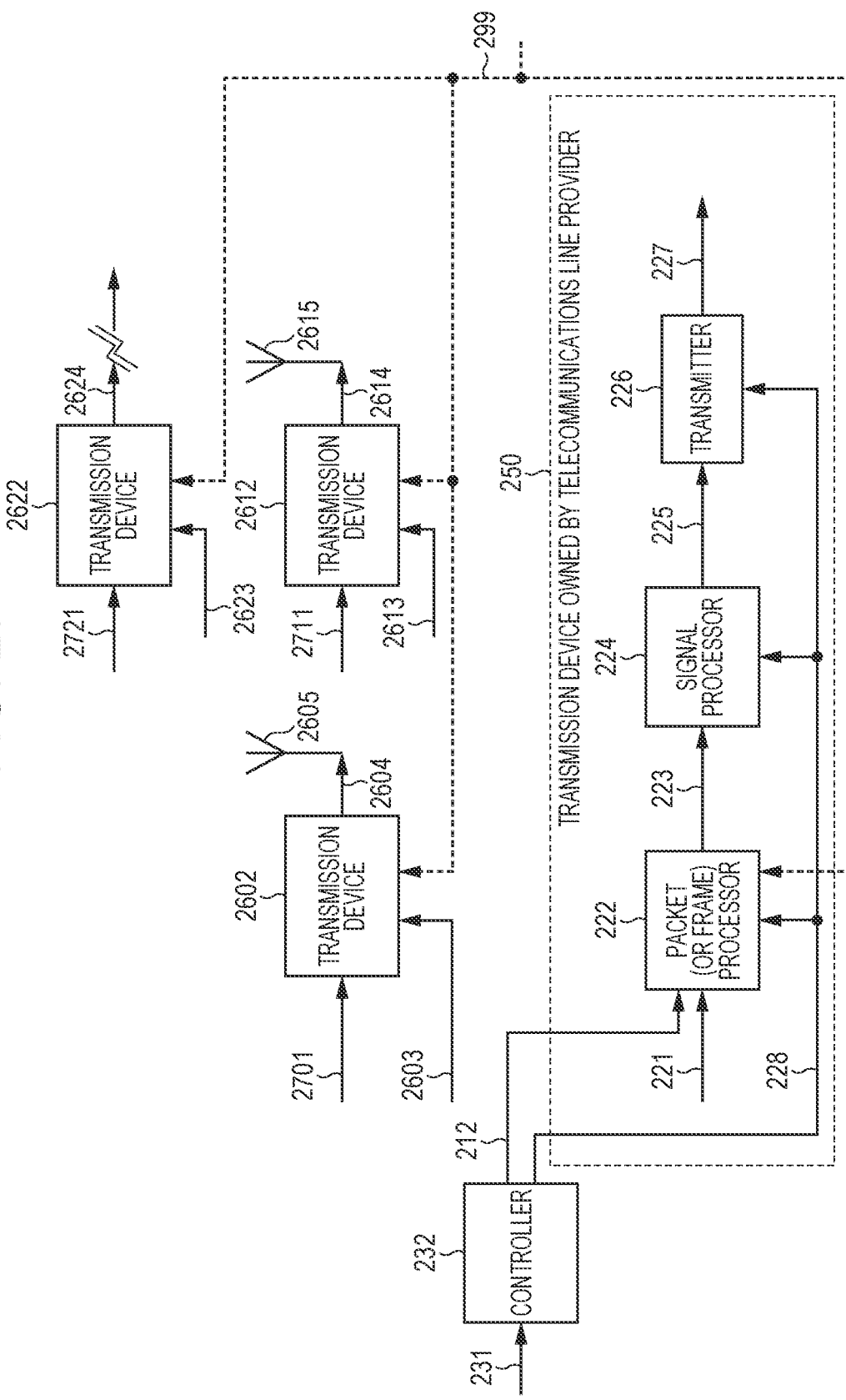
FIG. 27 is a view illustrating configuration examples of the broadcasting station and the transmission device owned by the telecommunications line provider.

FIG. 27 illustrates different configuration examples of the broadcasting station and the transmission device owned by the telecommunications line provider in FIGS. 24 and 25. In FIG. 27, the component operated similarly to FIGS. 2 and 26 is designated by the identical reference mark.

The configuration examples in FIG. 27 differs from the configuration examples in FIG. 26 in that first video and/or audio information is individually transferred from the camera side to transmission devices 2602, 2612, and 2622. Accordingly, each of reference marks 2701, 2712, and 2721 in FIG. 27 designates the first video and/or audio information, and the operations of transmission devices 2602, 2612, and 2622 are similar to those in FIG. 26.

At this point, transmission devices 2602, 2612, and 2622 are transmission devices associated with the broadcasting station.

The characteristic operation of each transmission device is described later.

Figure 28:
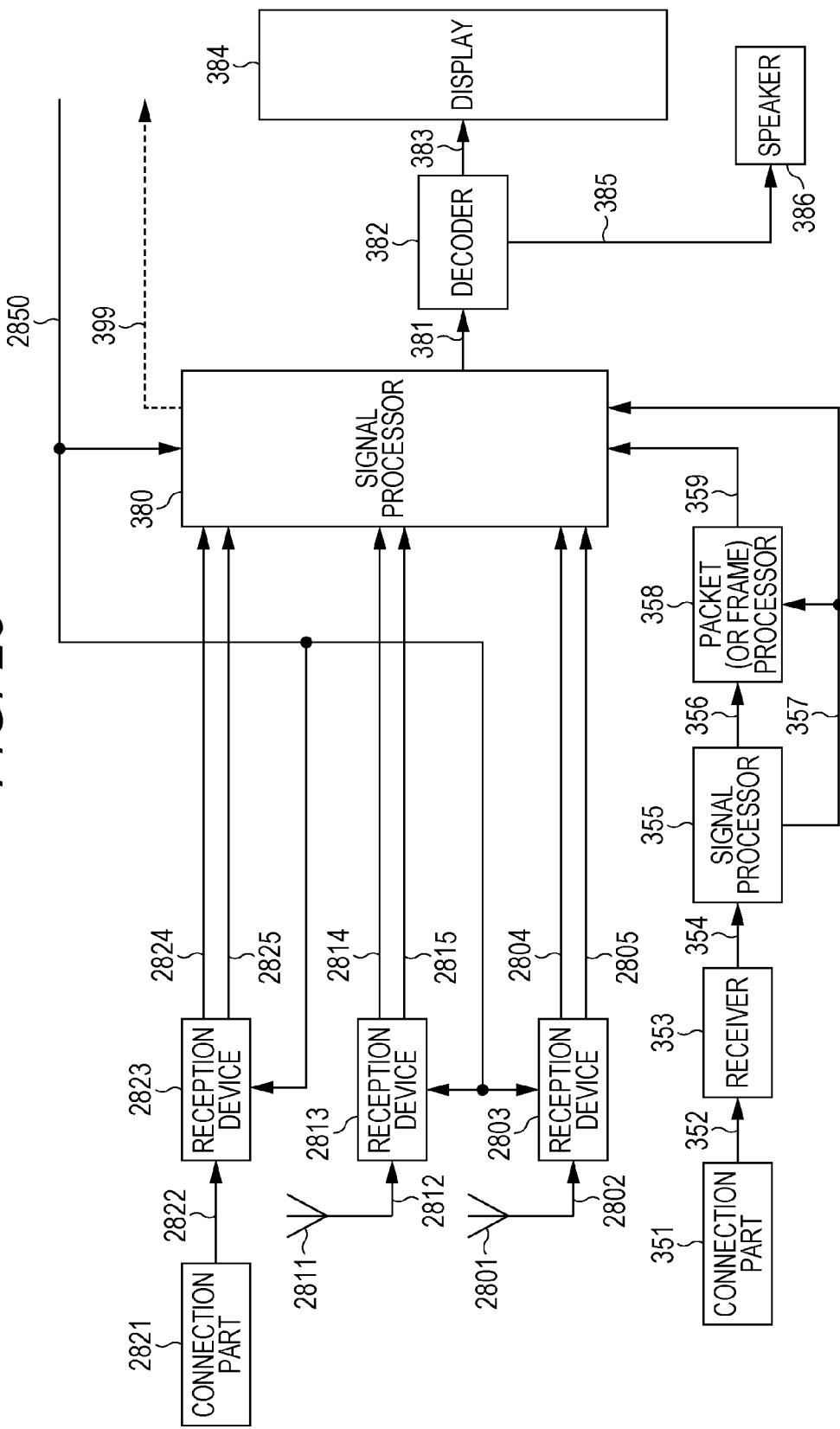
FIG. 28 is a view illustrating a configuration example of the terminal device.

FIG. 28 illustrates a configuration example of the terminal device. In FIG. 28, the component similar to that in FIG. 3 is designated by the identical reference mark. Similarly to FIG. 3, connection parts 351 to 358 in FIG. 28 designate configurations that receive the packet (or frame) transmitted from the telecommunications line provider. The terminal device performs the operations (such as the packet-level decoding and the data storage) of the first exemplary embodiment.

Reception device 2803 in FIG. 28 receives the modulated signal transmitted from transmission device 2602 in FIGS. 26 and 27. Reception device 2813 receives the modulated signal transmitted from transmission device 2612 in FIGS. 26 and 27. Reception device 2823 receives the modulated signal transmitted from transmission device 2622 in FIGS. 26 and 27.

Reception signal 2802 (that is of the modulated signal transmitted from transmission device 2602 in FIGS. 26 and 27) received with antenna 2801 is input to reception device 2803, and reception device 2803 extracts the control information included in the reception signal, performs the pieces of processing such as the demodulation and the error correction decoding of the physical layer (and the packet-level decoding when the packet-level error correction coding is performed), and outputs data 2704 after packet (or frame) processing and control information signal 2705.

Similarly, reception signal 2812 (that is of the modulated signal transmitted from transmission device 2612 in FIGS. 26 and 27) received with antenna 2811 is input to reception device 2813, and reception device 2803 extracts the control information included in the reception signal, performs the pieces of processing such as the demodulation and the error correction decoding of the physical layer (and the packet-level decoding when the packet-level error correction coding is performed), and outputs data 2714 after packet (or frame) processing and control information signal 2715.

Reception signal 2822 (that is of the modulated signal transmitted from transmission device 2622 in FIGS. 26 and 27) received through a cable connected to connection part 2821 is input to reception device 2823, and reception device 2823 extracts the control information included in the reception signal, performs the pieces of processing (including the packet-level decoding when the packet-level error correction coding is performed) such as the demodulation and the error correction decoding of the physical layer, and outputs data 2724 after packet (or frame) processing and control information signal 2725.

All reception devices 2803, 2813, and 2823 are not simultaneously operated. For example, when a broadcasting channel selector is provided as an interface of the terminal device, the reception device associated with the channel set by a user using the selector is operated. Selection signal 2850 is used to select the reception device, and each of reception devices 2803, 2813, and 2823 decides the operation based on selection signal 2850.

Pieces of data 2804, 2814, and 2824, control information signals 2805, 2815, and 2825, and selection signal 2850 are input to signal processor 380, and signal processor 380 selects the valid data after packet (or frame) processing based on selection signal 2850.

Data 359 after the packet (or frame) processing and control information signal 357 are input to signal processor 380, and signal processor 380 generates the data in order to display two videos on display 384 from the valid data after packet (or frame) processing and data 359 after the packet (or frame) processing, and outputs data 381.

The characteristic operation of each reception device is described later.

Some situations dealt with in transmitting the first video information (and/or audio information) from transmission devices 2602, 2612, and 2622 in FIGS. 26 and 27 will be described below. In the following description, it is assumed that transmission devices 2602, 2612, and 2622 transfer the identical packet. Alternatively, transmission devices 2602, 2612, and 2622 may transmit not the identical packet but different packets. The pieces of first video data transmitted from transmission devices 2602, 2612, and 2622 may differ from one another in the video (audio) coding method, frame rate, and video size (resolution).

Figure 29:
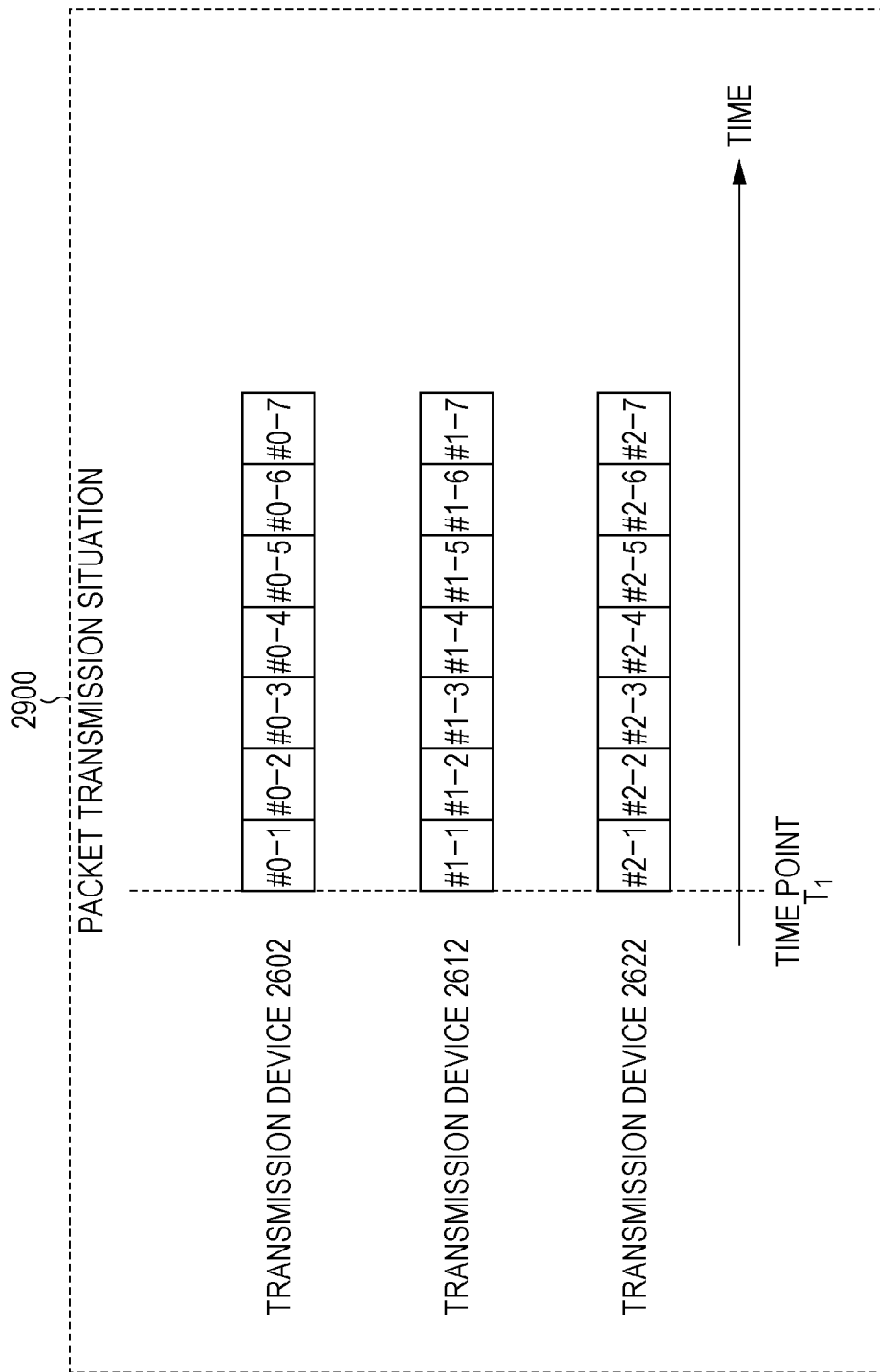
FIG. 29 is a view illustrating an example of the packet transmission situation.

FIG. 29 illustrates an example of situation 2900 in which transmission devices 2602, 2612, and 2622 in FIGS. 26 and 27 transmit the packets associated with the first video information. In FIG. 29, the horizontal axis indicates the time.

Transmission device 2602 in FIGS. 26 and 27 transmits packet "#0-1", packet "#0-2", packet "#0-3", packet "#0-4", packet "#0-5", packet "#0-6", and packet "#0-7", transmission device 2612 in FIGS. 26 and 27 transmits packet "#1-1", packet "#1-2", packet "#1-3", packet "#1-4", packet "#1-5", packet "#1-6", and packet "#1-7", and transmission device 2622 in FIGS. 26 and 27 transmits packet "#2-1", packet "#2-2", packet "#2-3", packet "#2-4", packet "#2-5", packet "#2-6", and packet "#2-7".

Transmission devices 2602, 2612, and 2622 in FIGS. 26 and 27 transmit the packets at the identical clock time from time point $T_1$.

Figure 30:
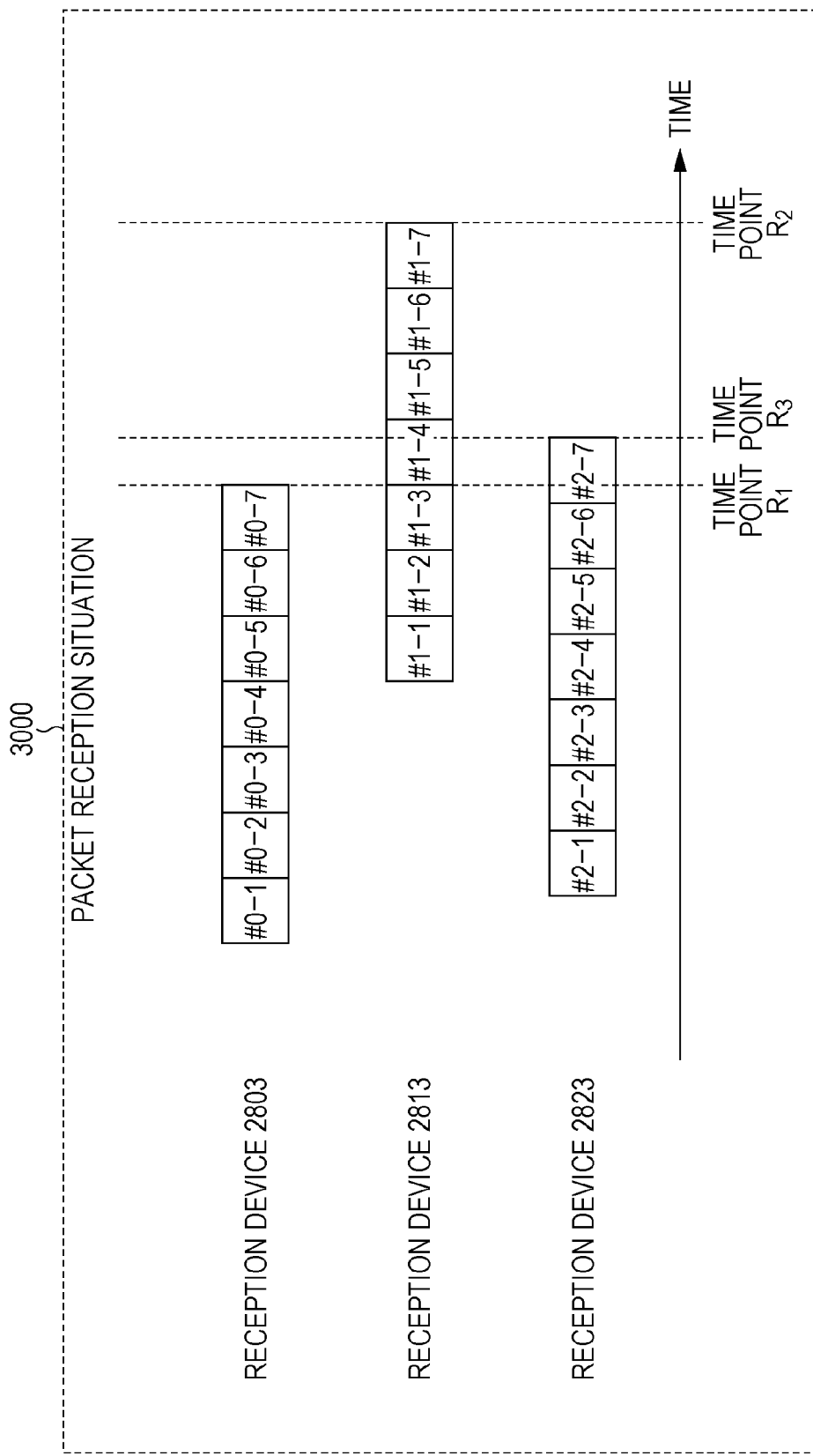
FIG. 30 is a view illustrating an example of the packet reception situation.

FIG. 30 illustrates a state in which the terminal device in FIG. 28 receives the packets when transmission devices 2602, 2612, and 2622 in FIGS. 26 and 27 transmit the packets in FIG. 29 (packet reception situation 3000).

In FIG. 30, time point $R_1$ at which reception device 2803 in FIG. 28 completes the reception of packet "#0-7", time point $R_2$ at which reception device 2813 in FIG. 28 completes the reception of packet "#1-7", and time point $R_3$ at which reception device 2823 in FIG. 28 completes the reception of packet "#2-7" differ from one another. Sometimes clock time $R_1$, clock time $R_2$, and clock time $R_3$ largely differ from one another. Although reception devices 2803, 2813, and 2823 are simultaneously operated in FIG. 30, actually reception devices 2803, 2813, and 2823 need not to be simultaneously operated. That is, in the case that the user selects the channel (or a transmission medium (terrestrial broadcasting, cable broadcasting, and satellite broadcasting)), the corresponding reception device is operated.

There is no problem in the case that the terminal device displays only the first video (and/or audio information); however, there is a problem in that the circuit scale of the terminal device is increased when the first video and the second video are synchronously displayed as described in the first exemplary embodiment.

As described in the first exemplary embodiment, the terminal device temporally synchronizes the second video (and/or audio information) transferred through the telecommunications line provider and the first video (and/or audio information) to display the video on the display such that the user does not feel discomfort.

In the terminal device, the user selects the channel (or a transmission medium (terrestrial broadcasting, cable broadcasting, and satellite broadcasting)), and the corresponding reception device is operated. However, as described above (see FIG. 30), the arrival time of the packet of the first video (and/or audio information) largely depends on the channel selected by the user (terminal device). For this reason, in the case that the user (terminal device) selects the channel (the channel through which the first video is transferred) largely different from the arrival time of the packet of the second video, the circuit scale of the storage in the terminal device is enlarged in order to adjust the synchronization of the first video and the second video.

Figure 31:
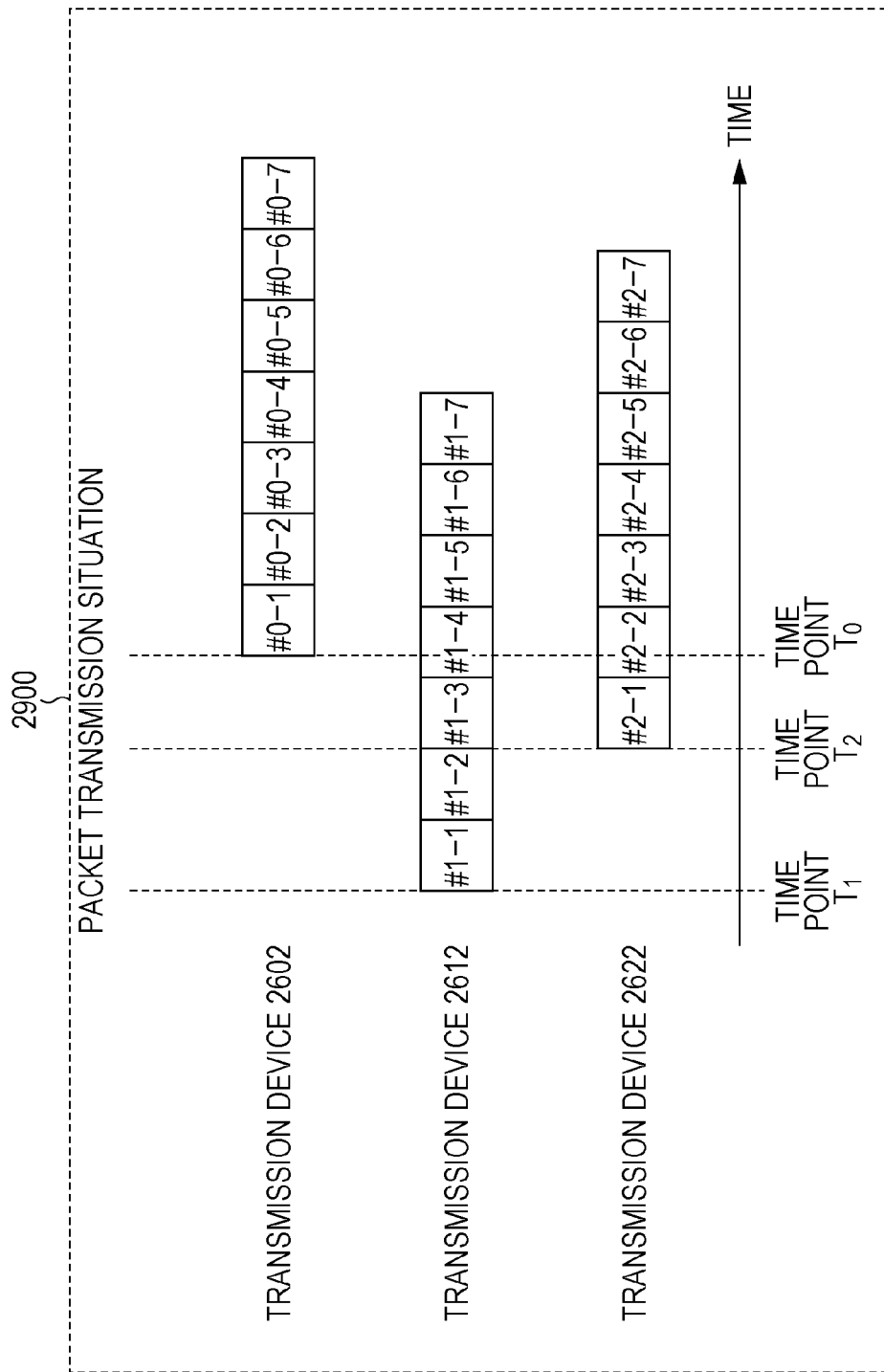
FIG. 31 is a view illustrating an example of the packet transmission situation.

At this point, in consideration of the arrival time difference among the packets in FIG. 30, transmission devices 2602, 2612, and 2622 in FIGS. 26 and 27 that transfer the first video (and/or audio information) perform the adjustment so as to vary the timing of transmitting the information about the first video (and/or audio information) as illustrated in FIG. 31.

In FIG. 31, transmission device 2602 in FIGS. 26 and 27 starts the transmission of the packet of the first video (and/or audio information) at time point $T_0$. Transmission device 2612 in FIGS. 26 and 27 starts the transmission of the packet of the first video (and/or audio information) at time point $T_1$. Transmission device 2622 in FIGS. 26 and 27 starts the transmission of the packet of the first video (and/or audio information) at time point $T_2$.

Figure 32:
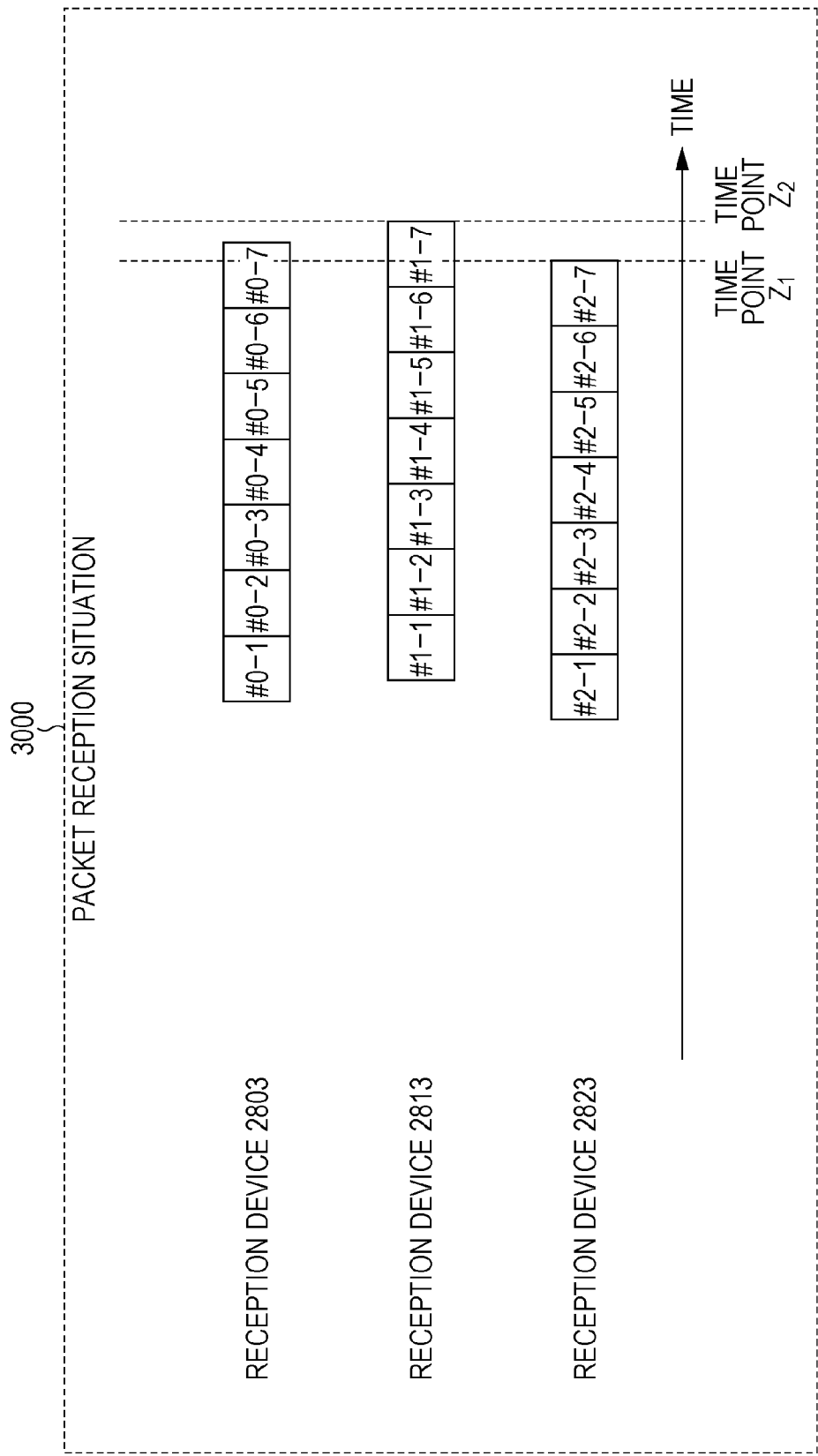
FIG. 32 is a view illustrating an example of the packet reception situation.

FIG. 32 illustrates a state (packet reception situation 3000) in which the packets arrive at the reception devices of the terminal device in FIG. 28, when transmission devices 2602, 2612, and 2622 in FIGS. 26 and 27 transmit the packets as illustrated in FIG. 31 (packet transmission situation 2900).

In FIG. 32, reception device 2823 in FIG. 28 completes the reception of packet "#2-7" at clock time $Z_1$, and reception device 2823 in FIG. 28 completes the reception of packet "#1-7" at clock time $Z_2$. Reception device 2803 in FIG. 28 receives packet "#0-7" between time points $Z_1$ and $Z_2$.

As can be seen from comparison between FIGS. 30 and 32, because the timing of transmitting the packet of the first video (and/or audio information) is adjusted by transmission devices 2602, 2612, and 2622 in FIGS. 26 and 27 as illustrated in FIG. 31, the arrival time difference of the packet of the first video (and/or audio information) that arrives at each of reception devices 2803, 2813, and 2823 of the terminal device is decreased compared with the case in FIG. 30. Therefore, the circuit scale of the storage in the terminal device can be reduced.

That is, in the reception device of the terminal device, the circuit scale of the storage can be reduced when transmission device 2602 in FIGS. 26 and 27 temporally synchronizes the first video (and/or audio information) and second video to be transmitted, the circuit scale of the storage can be reduced when transmission device 2612 in FIGS. 26 and 27 temporally synchronizes the first video (and/or audio information) and second video to be transmitted, and the circuit scale of the storage can be reduced when transmission device 2622 in FIGS. 26 and 27 temporally synchronizes the first video (and/or audio information) and second video to be transmitted.

Although reception devices 2803, 2813, and 2823 are simultaneously operated in FIG. 32, actually reception devices 2803, 2813, and 2823 need not to be simultaneously operated. That is, in the case that the user selects the channel (or a transmission medium (terrestrial broadcasting, cable broadcasting, and satellite broadcasting)), the corresponding reception device is operated.

Similarly to the method of the first exemplary embodiment, the packet processing, signal processing, and decoding processing can be performed in order to temporally synchronize the first video (and/or audio information) transmitted from transmission device 2602 in FIGS. 26 and 27 and the packet of the second video transmitted from the telecommunications line provider. The packet-level decoding is performed on the packet of the second video, and the processing method is already described in the first exemplary embodiment.

Similarly to the method of the first exemplary embodiment, the packet processing, signal processing, and decoding processing can be performed in order to temporally synchronize the first video (and/or audio information) transmitted from transmission device 2612 in FIGS. 26 and 27 and the packet of the second video transmitted from the telecommunications line provider. The packet-level decoding is performed on the packet of the second video, and the processing method is already described in the first exemplary embodiment.

Similarly to the method of the first exemplary embodiment, the packet processing, signal processing, and decoding processing can be performed in order to temporally synchronize the first video (and/or audio information) transmitted from transmission device 2622 in FIGS. 26 and 27 and the packet of the second video transmitted from the telecommunications line provider. The packet-level decoding is performed on the packet of the second video, and the processing method is already described in the first exemplary embodiment.

Alternatively, as described in the first exemplary embodiment, the broadcasting station and the telecommunications line provider may control the delay amount in order to reduce the disturbance problem of the second video.

Signal processor 380 of the terminal device in FIG. 28 obtains information about the difference in arrival time between the frame transmitted from each broadcasting station (transmission devices 2602, 2612, and 2622 in FIGS. 26 and 27) and the packet transmitted from the telecommunications line provider at the identical clock time (or its statistical information), and outputs time difference information 399. Time difference information 399 is transmitted from the transmission device of the terminal device to the telecommunications line provider.

Transmission device 250 of the telecommunications line provider in FIGS. 26 and 27 includes a receiver (not illustrated) to acquire time difference information 299 transmitted from the terminal device. Time difference information 299 is input to packet (or frame) processors 202 and 222, and each of packet (or frame) processors 202 and 222 changes the amount of packet or frame storage to control transmission timing, and outputs the packet or frame in which the delay amount is controlled.

In FIGS. 26 and 27, it is difficult for the broadcasting station (transmission devices 2602, 2612, and 2622 in FIGS. 26 and 27) to control the delay amount in each terminal device (because of the multicasting. Accordingly, packet (or frame) processor 222 of transmission device 250 of the telecommunications line provider controls the delay amount for each terminal device. In the case that transmission device 250 of telecommunications line provider does not individually transmit the packet to the terminal device, namely, for the multicasting, each broadcasting station (transmission devices 2602, 2612, and 2622 in FIGS. 26 and 27) may control the delay time (packet transmission timing), or the telecommunications line provider may control the delay time (packet transmission timing).

Figure 33:
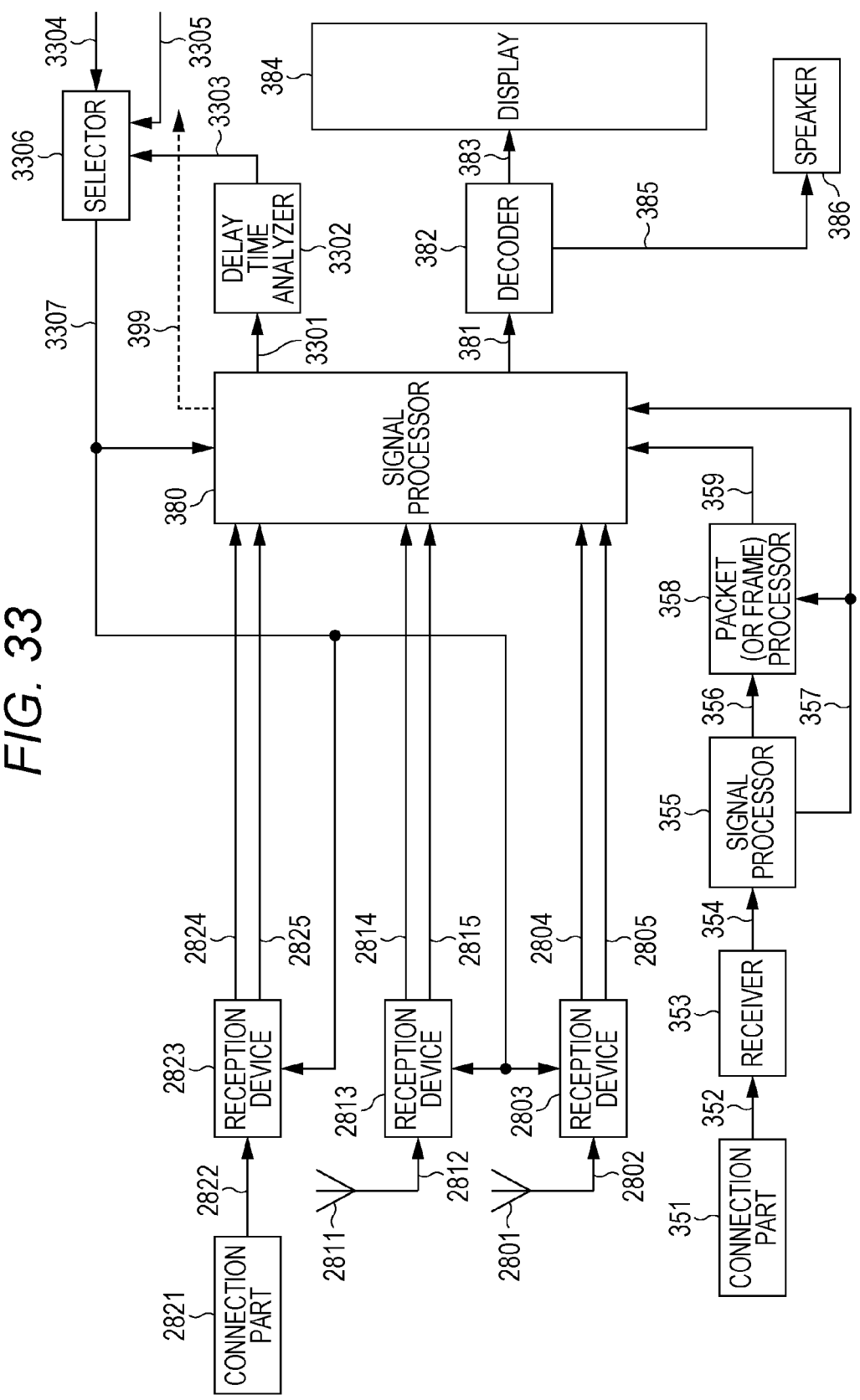
FIG. 33 is a view illustrating a configuration example of the terminal device.

Alternatively, the terminal device may automatically select the channel used in the broadcasting station. For example, as illustrated in FIGS. 26 and 27, transmission devices 2602, 2612, and 2622 transmit the first video information (and/or audio information). FIG. 33 illustrates a configuration of the terminal device that performs the automatic selection. In FIG. 33, the component similar to that in FIGS. 3 and 28 is designated by the identical reference mark, and the detailed description is omitted.

In FIG. 33, signal processor 380 outputs signal 3301 including the pieces of information about the delay times of the packet (or frame) of the first video (and/or audio information) and the packet of the second video, which are output from reception device 2803, the delay times of the packet (or frame) of the first video (and/or audio information) and the packet of the second video, which are output from reception device 2813, and the delay times of the packet (or frame) of the first video (and/or audio information) and the packet of the second video, which are output from reception device 2823.

Signal 3301 is input to delay time analyzer 3302, and delay time analyzer 3302 outputs information 3303 about the packet (2804, 2814, and 2824) suitable for the display of the first video and second video in the temporal synchronization.

Information 3303 about the packet (2804, 2814, and 2824) suitable for the display of the first video and second video in the temporal synchronization, information 3304 about the channel set by the user, and control signal 3305 are input to selector 3306, and selector 3306 selects one of information 3303 about the packet (2804, 2814, and 2824) suitable for the display of the first video and second video in the temporal synchronization and information 3304 about the channel set by the user using control signal 3305, and output the selected information as selection signal 3307. When information 3303 about the packet (2804, 2814, and 2824) suitable for the display of the first video and second video in the temporal synchronization is selected using control signal 3305, a result analyzed with delay time analyzer 3302 is reflected.

Reception devices 2803, 2813, and 2823 perform whether reception devices 2803, 2813, and 2823 are operated based on selection signal 3307.

Therefore, the terminal device can automatically select the channel used in the broadcasting station.

As described above, in the second exemplary embodiment, when the broadcasting station transmits the first video of the multiangle first and second videos while the telecommunications line provider transmits the second video, the error correction coding at the packet level is performed during the transfer of the second video, the terminal device can synchronously display the first video and the second video, and each broadcasting station controls the timing of transmitting the first video information. Additionally, the terminal device has the function of being able to select the broadcasting station from which the first video is obtained. Therefore, the terminal device can display the synchronized first video and second video, and the disturbance of the video is decreased.

Third Exemplary Embodiment

The transmission method, in which the error correction coding at the packet level is performed during the transfer of the second video when the broadcasting station transmits the first video of the multiangle first and second videos while the telecommunications line provider transmits the second video, is described in the first and second exemplary embodiments. The telecommunications line provider transmits the packet of the second video using the TCP (TCP/IP) or UDP, and the error correction code at the packet level is introduced in order to reduce the influence of the packet delay or packet missing.

However, even if the error correction code at the packet level is introduced, the disturbance of the video is generated at that time because small influence of the packet delay or packet missing remains. For example, in the case that terminal device receives the packet of the second video through a wireless LAN or a cellular communication system, there is a possibility of increasing the disturbance of the video, and there is a high possibility that a viewer feels discomfort due to the disturbance of the video.

A method for reducing the discomfort given to the user with respect to the disturbance of the video is described in a third exemplary embodiment.

Figure 34:
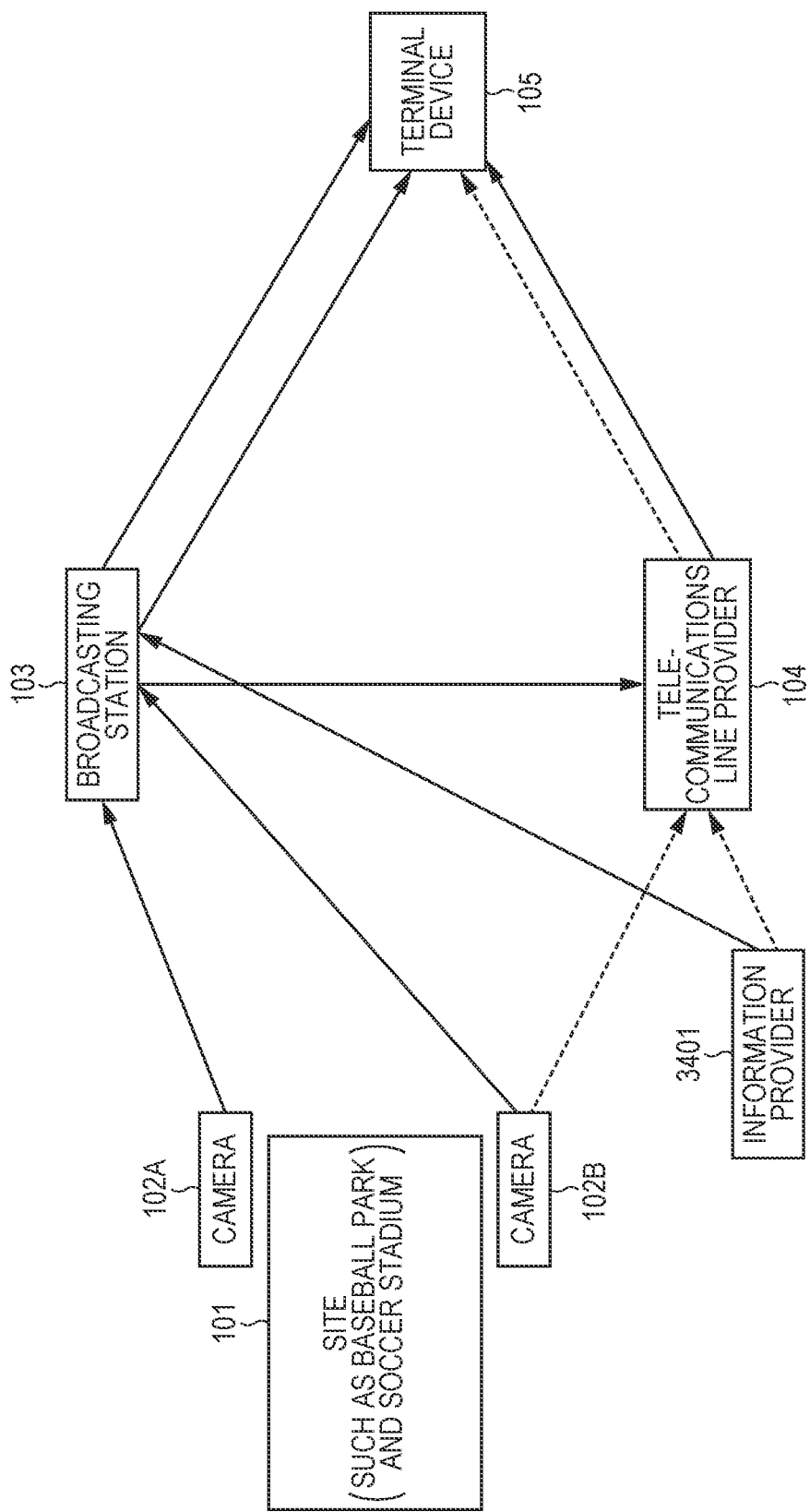
FIG. 34 is a view illustrating an example of the relationship among the broadcasting station, the telecommunications line provider, and the terminal device.

FIG. 34 illustrates an example of the relationship among the broadcasting station, the telecommunications line provider, and the terminal device in the third exemplary embodiment. In FIG. 34, the component similar to that in FIG. 1 is designated by the identical reference mark. Referring to FIG. 34, cameras 102A and 102B perform photographing at different angles in site 101 such as a baseball park and a soccer stadium.

Broadcasting station 103 receives "first video and/or audio information" photographed with camera 102A, and transfers "first video and/or audio information" to terminal device 105 in a wired manner such as a cable or a wireless manner.

Broadcasting station 103 receives "second video and/or audio information" photographed with camera 102B, and transmits "second video and/or audio information" to terminal device 105 through telecommunications line provider 104.

Alternatively, "second video and/or audio information" may directly be transferred to telecommunications line provider 104 with no use of broadcasting station 103, and then transferred to terminal device 105.

Information provider 3401 provides information to the broadcasting station. The broadcasting station transmits information based on the information to the terminal device together with "first video and/or audio information".

Figure 35:
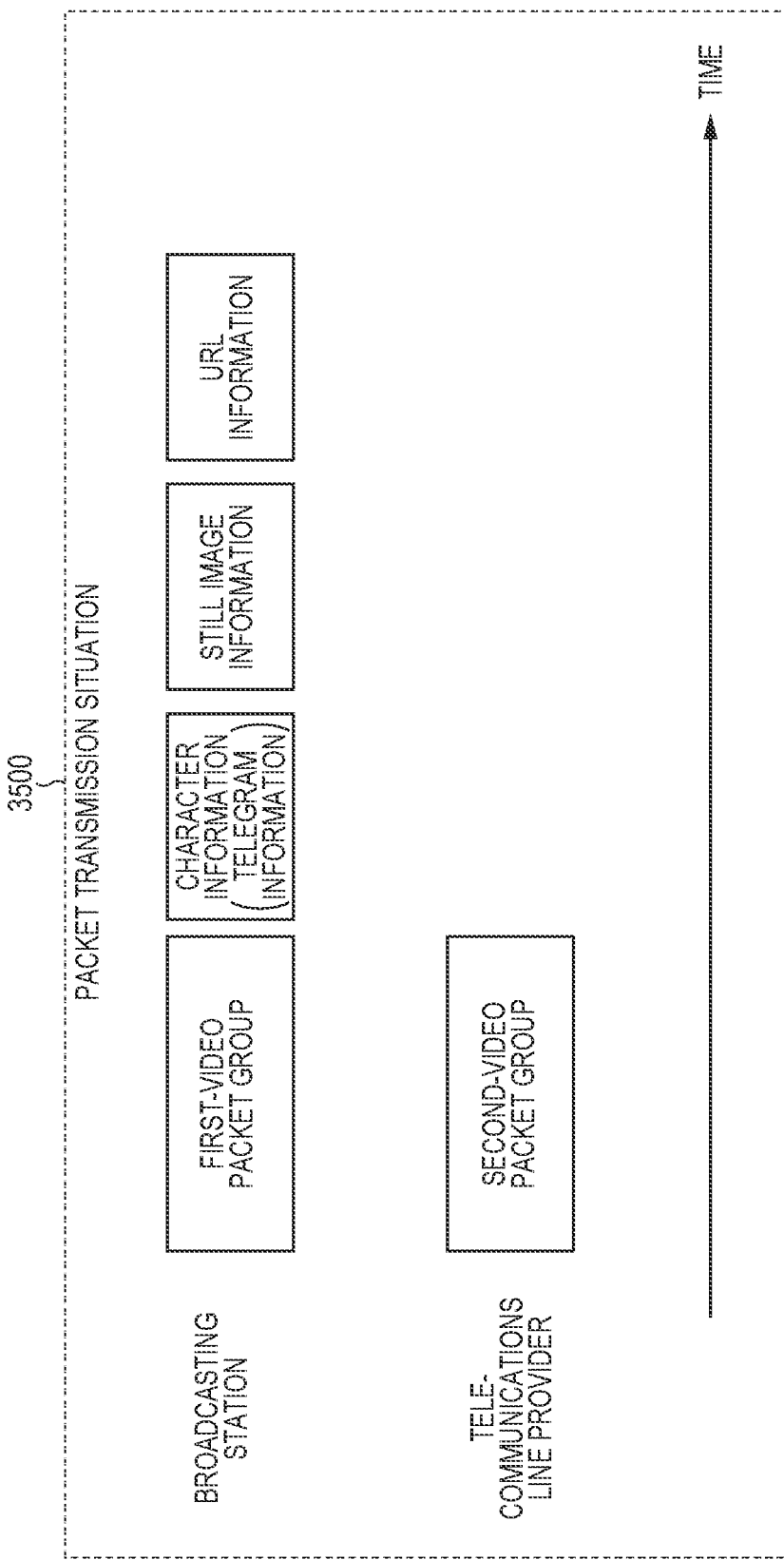
FIG. 35 is a view illustrating an example of the packet transmission situation.

FIG. 35 illustrates an example of transmission situation 3500 of the packets transmitted from the broadcasting station and the telecommunications line provider in the third exemplary embodiment. The plurality of broadcasting stations can transmit the packet of the first video as described in the second exemplary embodiment. Although the transmission packet (frame) of one broadcasting station is illustrated in FIG. 35, the following content can be performed in the case that the plurality of broadcasting stations can transmit the packet of the first video similarly to the second exemplary embodiment.

Similarly to the first and second exemplary embodiments, the broadcasting station transmits "first video and/or audio information", and that the telecommunications line provider transmits "second video and/or audio information".

In FIG. 35, a packet group of the first video transmitted from the broadcasting station and a packet group of the second video transmitted from the telecommunications line provider are the video at the identical time, and the terminal device displays the first video and the second video while temporally time synchronizing the first video and the second video as described in the first and second exemplary embodiments.

In addition to the first-video packet group, the broadcasting station transmits "character information (telegram information)", "still image information", and "URL (Uniform Resource Locator) information" as illustrated in FIG. 35. The pieces of information are used when it is difficult for the terminal device to restore the information about the first video and display the first video on the display. The terminal device displays a screen on the display instead of the first video. Similarly, the pieces of information are used when it is difficult for the terminal device to restore the information about the second video and display the second video on the display. The terminal device displays a screen on the display instead of the second video.

In FIG. 35, the broadcasting station transmits "character information (telegram information)", "still image information", and "URL (Uniform Resource Locator) information". However, the broadcasting station needs not to transmit all the pieces of information, but the broadcasting station may transmit one or two of "character information (telegram information)", "still image information", and "URL (Uniform Resource Locator) information".

The pieces of information are not always included in each frame unit of the transmission frame, but the pieces of information may be transmitted in, for example, each plurality of frames. Accordingly, the pieces of information may be transmitted anytime.

Figure 36:
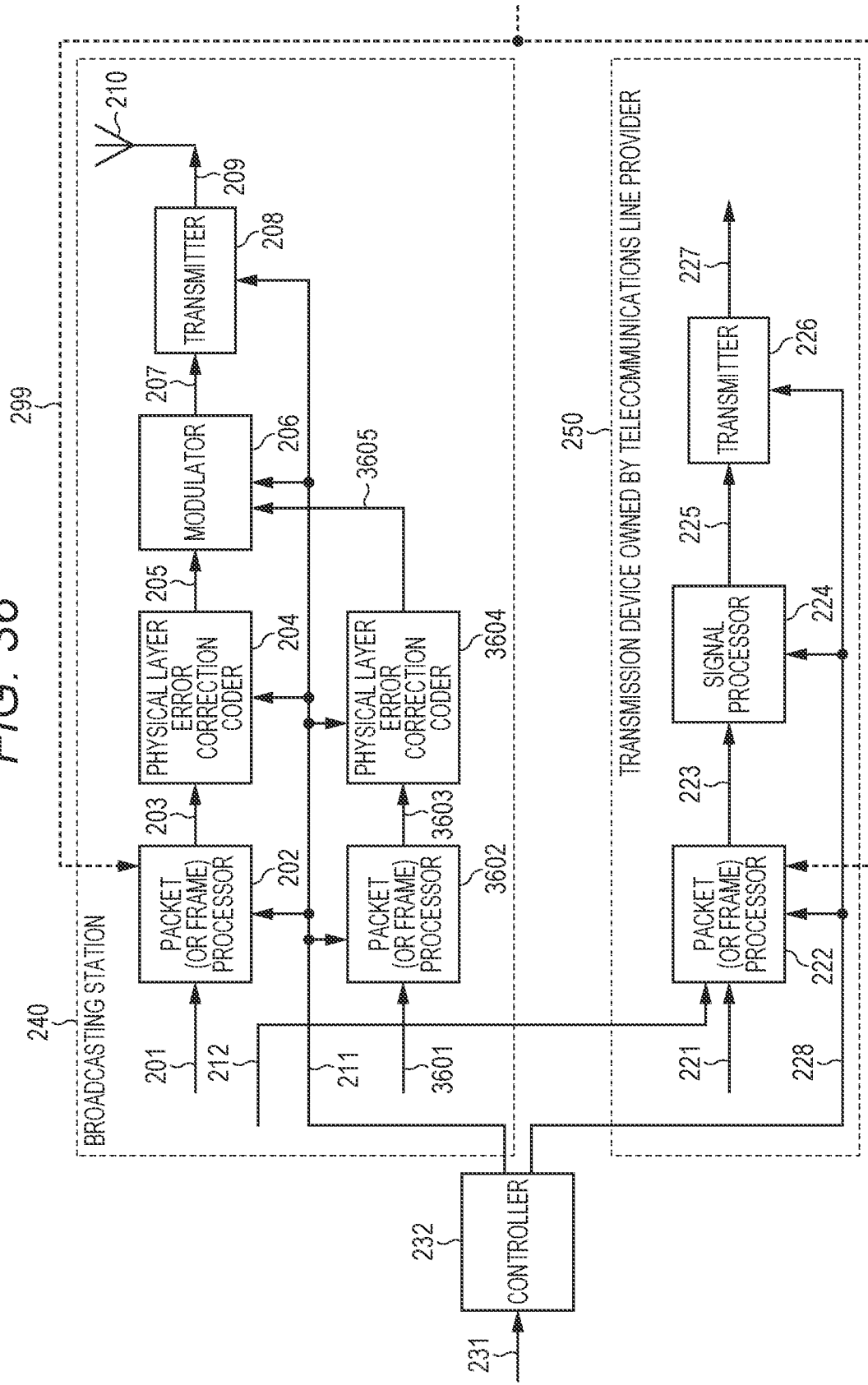
FIG. 36 is a view illustrating configuration examples of the broadcasting station and the transmission device owned by the telecommunications line provider.

FIG. 36 illustrates a configuration of the broadcasting station and the transmission device of the telecommunications line provider when the information in FIG. 35 is transmitted. In FIG. 36, the component operated similarly to FIG. 2 is designated by the identical reference mark. Because the implementation method of the third exemplary embodiment is similar to that of the first and second exemplary embodiments, the description is omitted.

At least one of the character information (telegram information), the still image information, and URL information 3601 and first control signal 211 are input to packet (or frame) processor 3602, and packet (or frame) processor 3602 performs the packetization and the framing based on first control signal 211, and outputs information 3603 after packet (or frame) processing.

Information 3603 after the packet (or frame) processing and first control signal 211 are input to physical layer error correction coder 3604, and physical layer error correction coder 3604 performs the error correction coding based on the information of the physical layer error correction coding scheme included in first control signal 211, and outputs error-correction-coded data 3605.

Error-correction-coded pieces of data 205 and 3605 and first control signal 211 are input to modulator 206, and modulator 206 maps error-correction-coded pieces of data 205 and 3605 based on the information about the frame configuration included in first control signal 211 and the pieces of information about the modulation scheme and transmission method, and outputs baseband signal 207.

Figure 37:
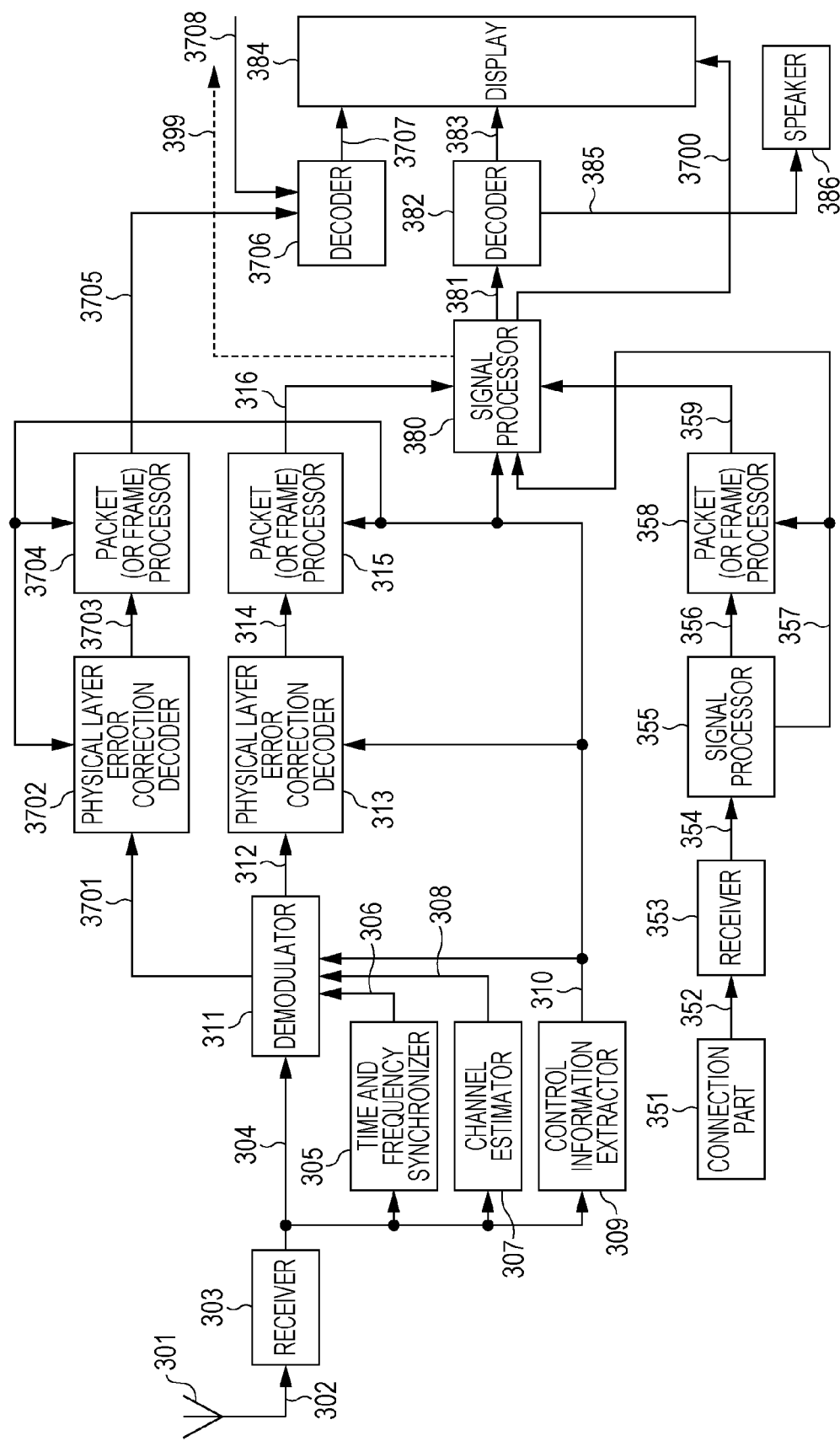
FIG. 37 is a view illustrating a configuration example of the terminal device.

FIG. 37 illustrates a configuration example of the reception device of the terminal device that receives the signal transmitted from the transmission device in FIG. 36. In FIG. 37, the component operated similarly to FIG. 3 is designated by the identical reference mark. Because the implementation method of the third exemplary embodiment is similar to that of the first and second exemplary embodiments, the description is omitted.

Baseband signal 304, synchronous signal 306, channel estimation signal 308, and control information signal 310 are input to demodulator 311, and demodulator 311 demodulates baseband signal 304 using synchronous signal 306 and channel estimation signal 308 based on the information about the frame configuration included in control information signal 310 and the pieces of information about the modulation scheme and the transmission method, and outputs logarithmic likelihood ratio signal 312 and "logarithmic likelihood ratio signal 3701 of at least one of the character information (telegram information), still image information, and the URL information".

"Logarithmic likelihood ratio signal 3701 of at least one of the character information (telegram information), still image information, and the URL information" and control information signal 310 are input to physical layer error correction decoder 3702, and physical layer error correction decoder 3702 performs the decoding based on the information about the error correction coding method included in control information signal 310, and outputs "received data 3703 of at least one of the character information (telegram information), the still image information, and the URL information".

"Received data 3703 of at least one of the character information (telegram information), the still image information, and the URL information" and control information signal 310 are input to packet (or frame) processor 3704, and packet (or frame) processor 3704 performs the packet (or frame) processing based on control information signal 310, and outputs "at least one of the character information (telegram information) after packet (or frame) processing, the still image information, and URL information 3705".

"At least one of the character information (telegram information) after packet (or frame) processing, the still image information, and URL information 3705" is input to decoder 3706, and decoder 3706 decodes at least one of the character information (telegram information), the still image information, and the URL information, and outputs display screen information 3707.

At this point, decoder 3706 is operated as follows. Display screen information 3707 becomes "the character information (telegram information) displayed on the display" in "the character information (telegram information)", becomes "the still image information displayed on the display" in "the still image information", and becomes information (3708) obtained from a URL source in "the URL information".

Signal processor 380 determines whether the video in which the first and second videos are synchronized is obtained, and outputs determination result 3700.

Video signal 383, display screen information 3707, and determination result 3700 are input to display 384, and display 384 displays video signal 383 when determination result 3700 indicates that the video in which the first and second videos are synchronized is obtained. When determination result 3700 indicates that the first video is not obtained while indicating that the video in which the first and second videos are synchronized is not obtained, display 384 displays the second video while display screen information 3707 is displayed instead of the first video. When the second video is not obtained, display 384 displays display screen information 3707 instead of the second video.

Figure 38:
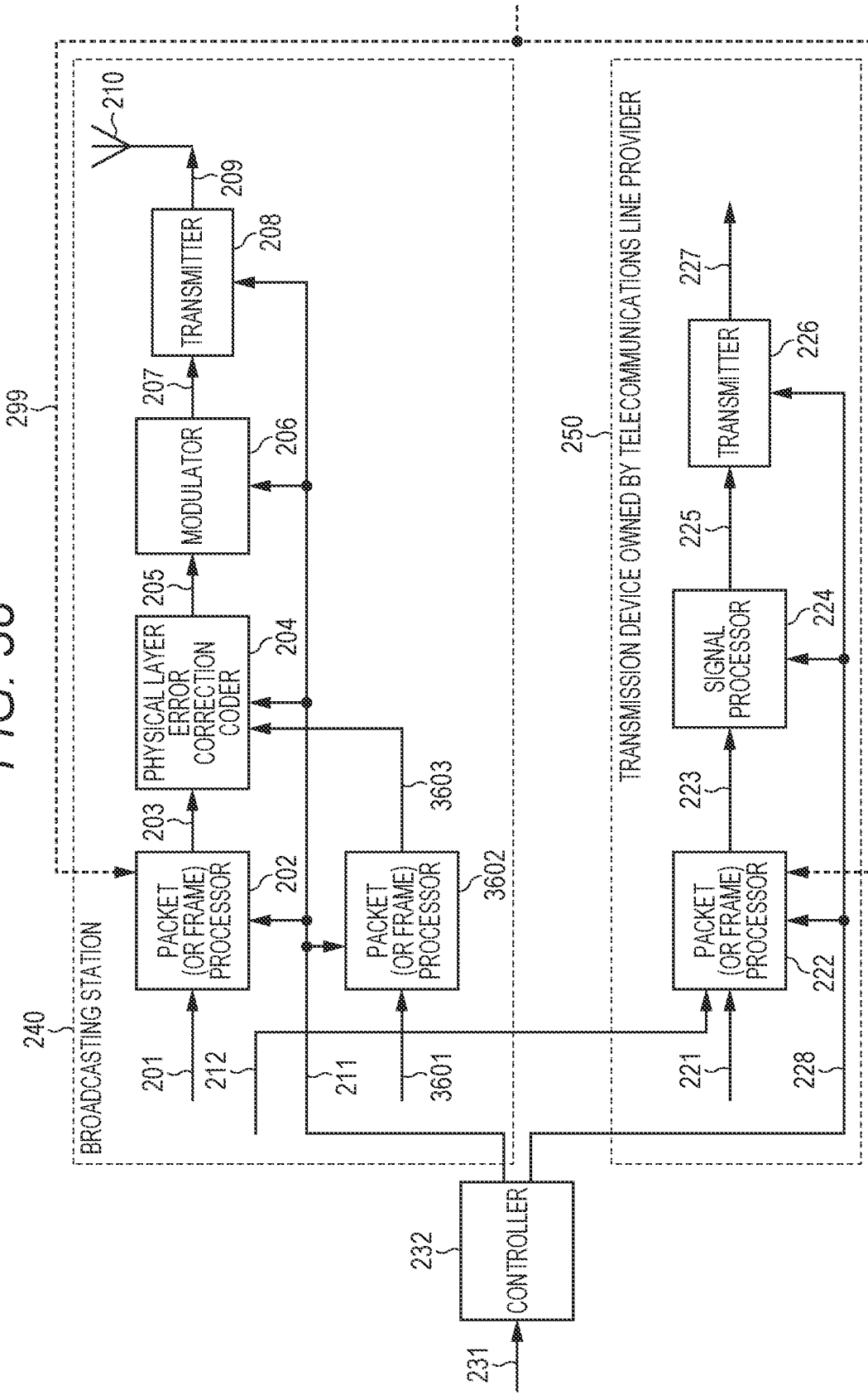
FIG. 38 is a view illustrating configuration examples of the broadcasting station and the transmission device owned by the telecommunications line provider.

FIG. 38 illustrates a configuration of the broadcasting station and the transmission device of the telecommunications line provider when the information in FIG. 35 is transmitted. In FIG. 38, the component operated similarly to FIGS. 2 and 36 is designated by the identical reference mark. Because the implementation method of the third exemplary embodiment is similar to that of the first and second exemplary embodiments and FIG. 36, the description is omitted.

The configuration in FIG. 38 differs from the configuration in FIG. 36 in that a physical layer error correction code used to transmit the first-video packet group in FIG. 35 is identical to a physical layer error correction code used to transmit at least one of the character information (telegram information), the still image information, and the URL information. Therefore, physical layer error correction coder 3604 in FIG. 36 is eliminated in the configuration in FIG. 38, physical layer error correction coder 204 also codes at least one of the character information (telegram information), the still image information, and the URL information.

Figure 39:
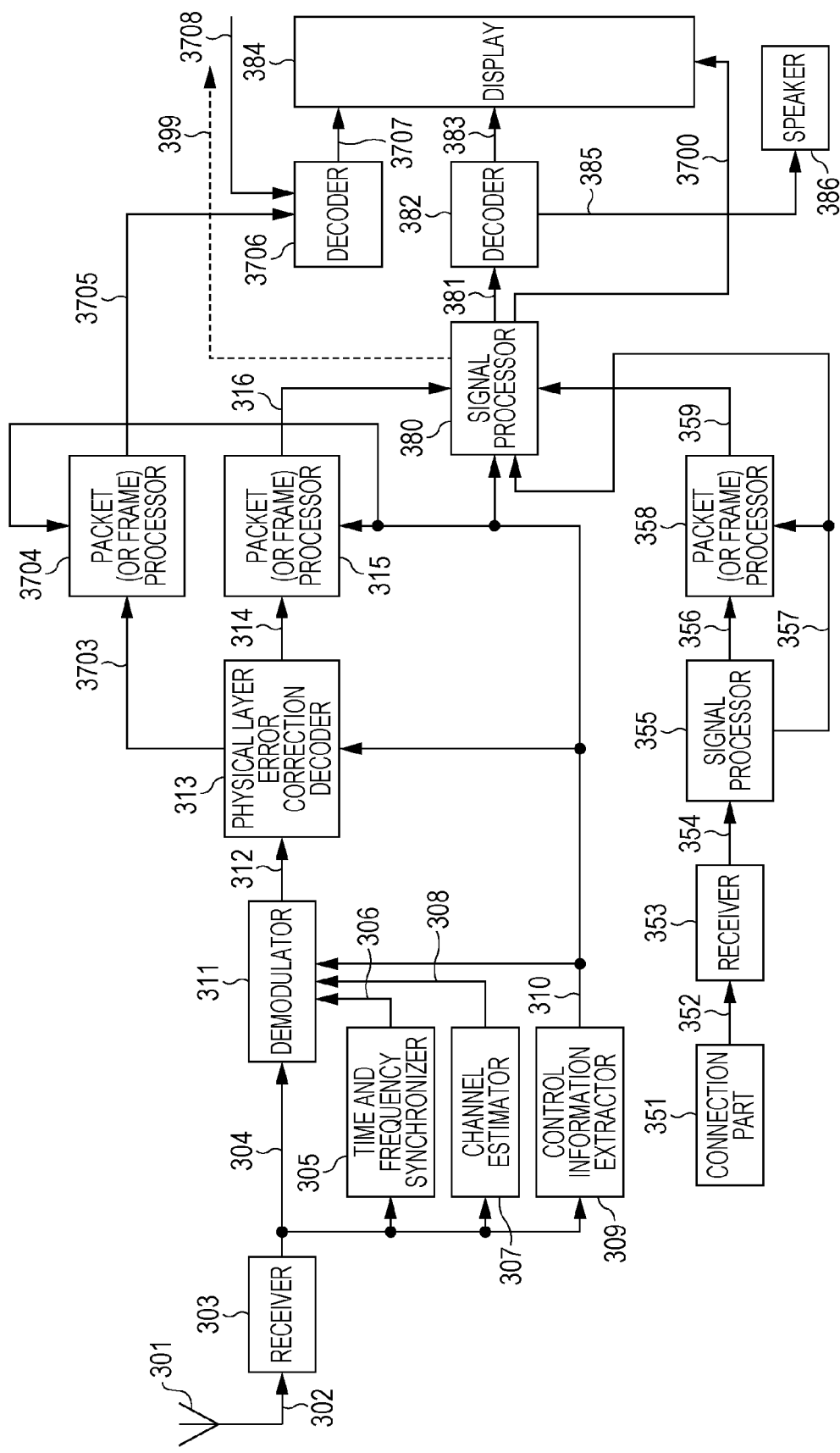
FIG. 39 is a view illustrating a configuration example of the terminal device.

FIG. 39 illustrates a configuration example of the reception device of the terminal device when the information in FIG. 35 is transmitted as illustrated in FIG. 38. In FIG. 39, the component operated similarly to FIGS. 3 and 37 is designated by the identical reference mark. Because the implementation method of the third exemplary embodiment is similar to that of the first and second exemplary embodiments and FIG. 37, the description is omitted.

The configuration in FIG. 39 differs from the configuration in FIG. 38 in that the error correction code in the physical layer used to transmit the first video packet group in FIG. 35 is identical to the error correction code in the physical layer used to transmit at least one of the character information (telegram information), the still image information, and the URL information. Therefore, physical layer error correction decoder 3702 in FIG. 37 is eliminated in FIG. 39, but physical layer error correction decoder 313 performs the decoding on at least one of the character information (telegram information), the still image information, and the URL information.

In the transmission frame of the broadcasting station in FIG. 35, the first packet group, the character information (telegram information), and the still image information are transmitted in the time division manner by way of example. Alternatively, for example, for the multi-carrier transfer scheme or the plurality of channels existing on the frequency axis, the broadcasting station may transmit the first packet group, the character information (telegram information), and the still image information in a frequency division manner, or transmit the first packet group, the character information (telegram information), and the still image information in both a time division manner and the frequency division manner.

Figure 40:
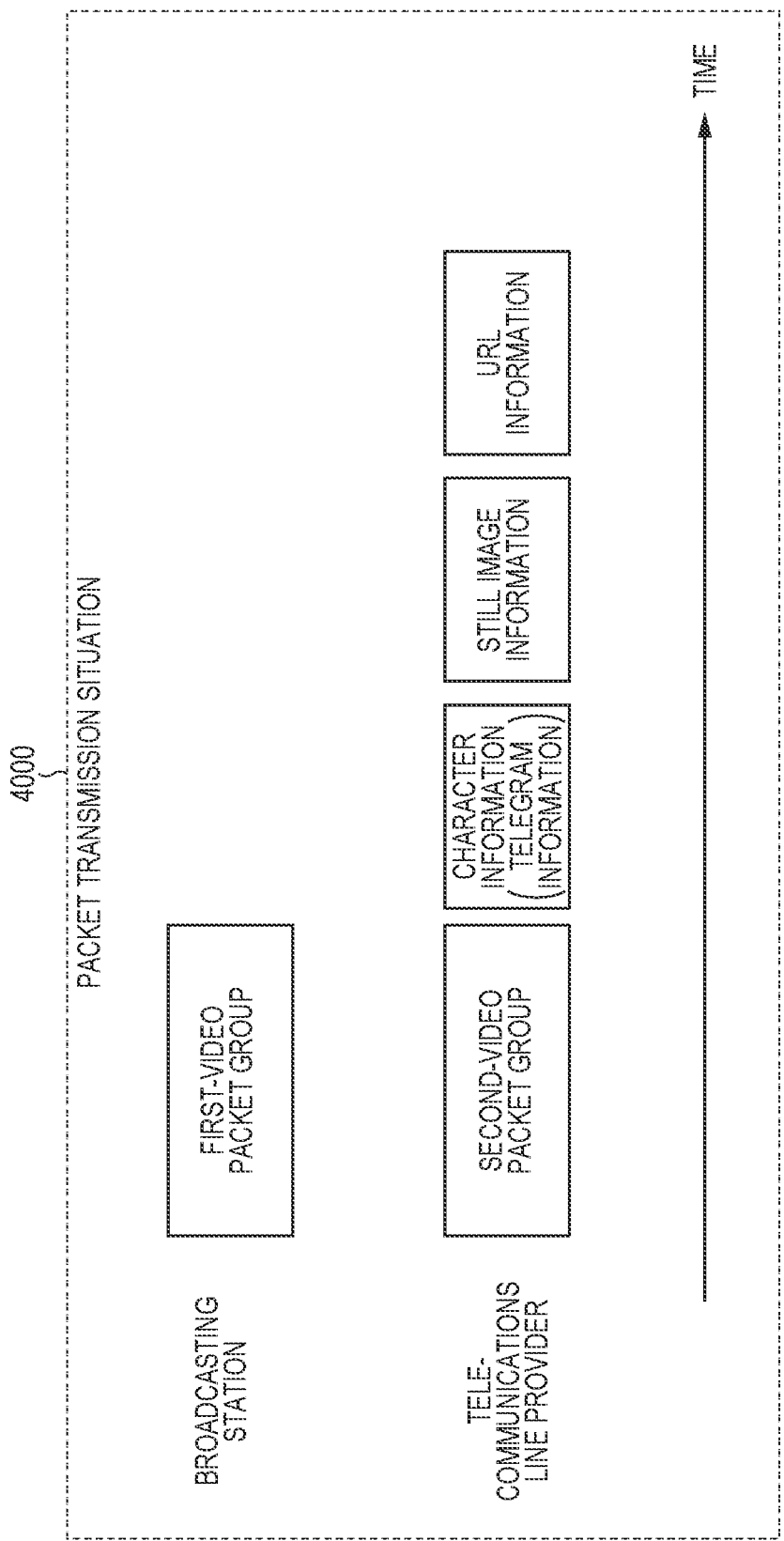
FIG. 40 is a view illustrating an example of the packet transmission situation.

FIG. 40 illustrates an example of transmission situation 4000 of the packets transmitted from the broadcasting station and the telecommunications line provider, transmission situation 4000 being different from that in FIG. 35. The plurality of broadcasting stations can transmit the packet of the first video as described in the second exemplary embodiment. Although the transmission packet (frame) of one broadcasting station is illustrated in FIG. 40, the following content can be performed in the case that the plurality of broadcasting stations can transmit the packet of the first video similarly to the second exemplary embodiment.

Similarly to the first and second exemplary embodiments, the broadcasting station transmits "first video and/or audio information", and that the telecommunications line provider transmits "second video and/or audio information".

In FIG. 40, a packet group of the first video transmitted from the broadcasting station and a packet group of the second video transmitted from the telecommunications line provider are the video at the identical time, and the terminal device displays the first video and the second video while temporally time synchronizing the first video and the second video as described in the first and second exemplary embodiments.

In addition to the second-video packet group, the telecommunications line provider transmits at least one of "character information (telegram information)", "still image information", and "URL (Uniform Resource Locator) information" in FIG. 40. The pieces of information are used when it is difficult for the terminal device to restore the information about the first video and display the first video on the display. The terminal device displays a screen on the display instead of the first video. Similarly, the pieces of information are used when it is difficult for the terminal device to restore the information about the second video and display the second video on the display. The terminal device displays a screen on the display instead of the second video.

In FIG. 40, the telecommunications line provider transmits "character information (telegram information)", "still image information", and "URL (Uniform Resource Locator) information". However, the telecommunications line provider needs not to transmit all the pieces of information, but the telecommunications line provider may transmit one or two of "character information (telegram information)", "still image information", and "URL (Uniform Resource Locator) information".

The pieces of information are not always included in each frame unit of the transmission frame, but the pieces of information may be transmitted in, for example, each plurality of frames. Accordingly, the pieces of information may be transmitted anytime.

In the case that the frame in FIG. 40 is transmitted, information provider 3401 in FIG. 34 provides the information about telecommunications line provider 104 as indicated by a dotted line, and telecommunications line provider 104 transmits the provided information to terminal device 105 as indicated by a dotted line.

Figure 41:
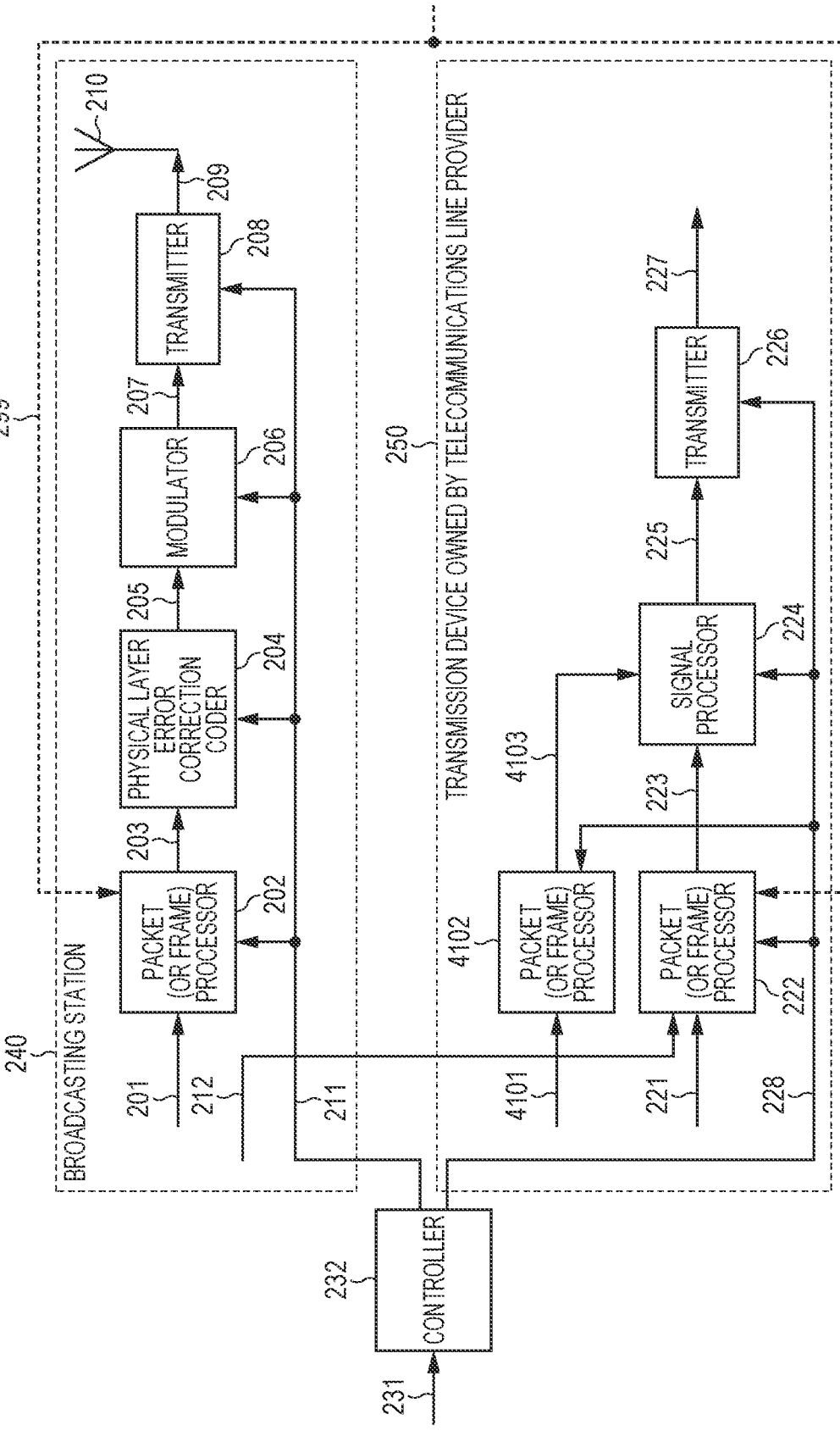
FIG. 41 is a view illustrating configuration examples of the transmission devices owned by the broadcasting station and the telecommunications line provider.

FIG. 41 illustrates a configuration of the broadcasting station and the transmission device of the telecommunications line provider when the information in FIG. 40 is transmitted. In FIG. 41, the component operated similarly to FIG. 2 is designated by the identical reference mark. Because the implementation method of the third exemplary embodiment is similar to that of the first and second exemplary embodiments, the description is omitted.

At least one of the character information (telegram information), the still image information, and URL information 4101 and second control signal 228 are input to packet (or frame) processor 4102, and packet (or frame) processor 4102 performs the packetization and the framing based on second control signal 228, and outputs information 4103 after packet (or frame) processing.

Second video and/or audio information 223 after packet (or frame) processing, information 4103 after packet (or frame) processing, and second control signal 228 are input to signal processor 224, and signal processor 224 performs the signal processing to generate the transmission signal based on the information about the transmission frame of the telecommunications line provider in FIG. 40 included in second control signal 228, and outputs signal 225 after signal processing.

Figure 42:
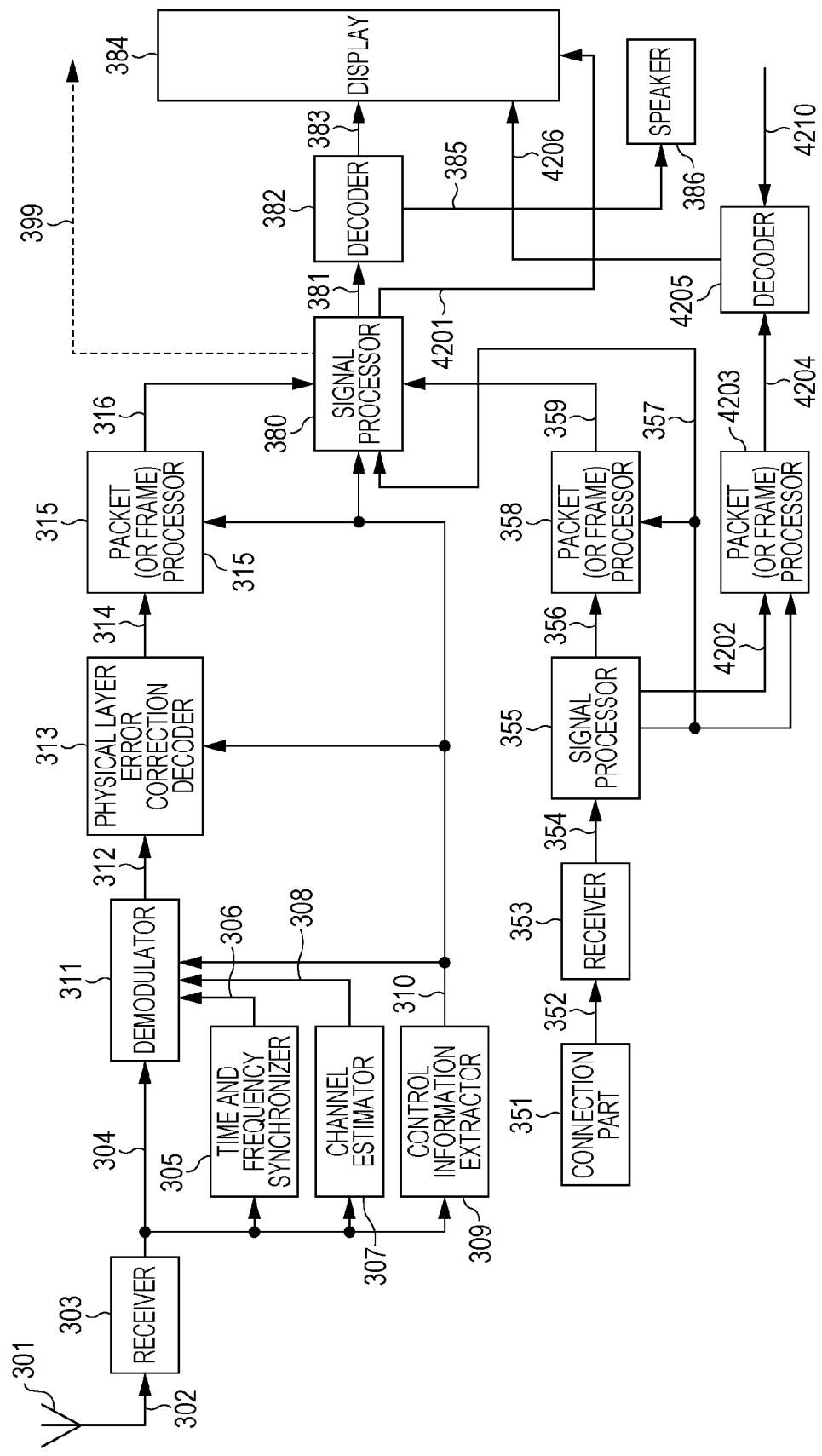
FIG. 42 is a view illustrating a configuration example of the terminal device.

FIG. 42 illustrates a configuration example of the reception device of the terminal device that receives the signal transmitted from the transmission device in FIG. 41. In FIG. 42, the component operated similarly to FIG. 3 is designated by the identical reference mark. Because the implementation method of the third exemplary embodiment is similar to that of the first and second exemplary embodiments, the description is omitted.

Reception signal 354 is input to signal processor 355, and signal processor 355 separates the second video packet group, the control information, the character information (telegram information), the still image information, and the URL information from one another, and outputs received data (second video packet group) 356, control information 357, "logarithmic likelihood ratio signal 4202 of at least one of the character information (telegram information), the still image information, and the URL information".

"Logarithmic likelihood ratio signal 4202 of at least one of the character information (telegram information), the still image information, and the URL information" and control information 357 are input to packet (or frame) processor 4203, and packet (or frame) processor 4203 performs the signal processing based on the pieces of information about the transmission method and the error correction coding method included in control information 357, and outputs "received data 4204 of at least one of the character information (telegram information), the still image information, and the URL information".

"Received data 4204 of at least one of the character information (telegram information), the still image information, and the URL information" is input to decoder 4205, and decoder 4205 decodes at least one of the character information (telegram information), the still image information, and the URL information, and outputs display screen information 4206.

At this point, decoder 4205 is operated as follows. Display screen information 4206 becomes "the character information (telegram information) displayed on the display" in "the character information (telegram information)", becomes "the still image information displayed on the display" in "the still image information", and becomes information (4210) obtained from a URL source in "the URL information".

Signal processor 380 determines whether the video in which the first and second videos are synchronized is obtained, and outputs determination result 4201.

Video signal 383, display screen information 4206, and determination result 4201 are input to display 384, and display 384 displays video signal 383 when determination result 4201 indicates that the video in which the first and second videos are synchronized is obtained. When determination result 4201 indicates that the first video is not obtained while indicating that the video in which the first and second videos are synchronized is not obtained, display 384 displays the second video while displaying display screen information 4206 instead of the first video. When the second video is not obtained, display 384 displays display screen information 4206 instead of the second video.

As described above, in the case that the display disturbance is generated in the multi-angle first video and second video, the information is displayed instead of the video that is possibly disturbed, and the discomfort given to the user can be reduced.

Fourth Exemplary Embodiment

The transmission method, in which the error correction coding at the packet level is performed during the transfer of the second video when the broadcasting station transmits the first video of the multiangle first and second videos while the telecommunications line provider transmits the second video, is described in the first and second exemplary embodiments. At this point, in the case that the telecommunications line provider transmits the packet of the second video using the TCP (TCP/IP) or UDP, the packet-level error correction code is introduced in order to reduce the influence of the packet delay or packet missing.

However, sometimes the missing correction code (the error correction coding at the packet level) needs not to be introduced in order to temporally synchronize the first video transmitted from the broadcasting station and the data transmitted from the telecommunications line provider with each other. In a fourth exemplary embodiment, this point will be described below.

Figure 43:
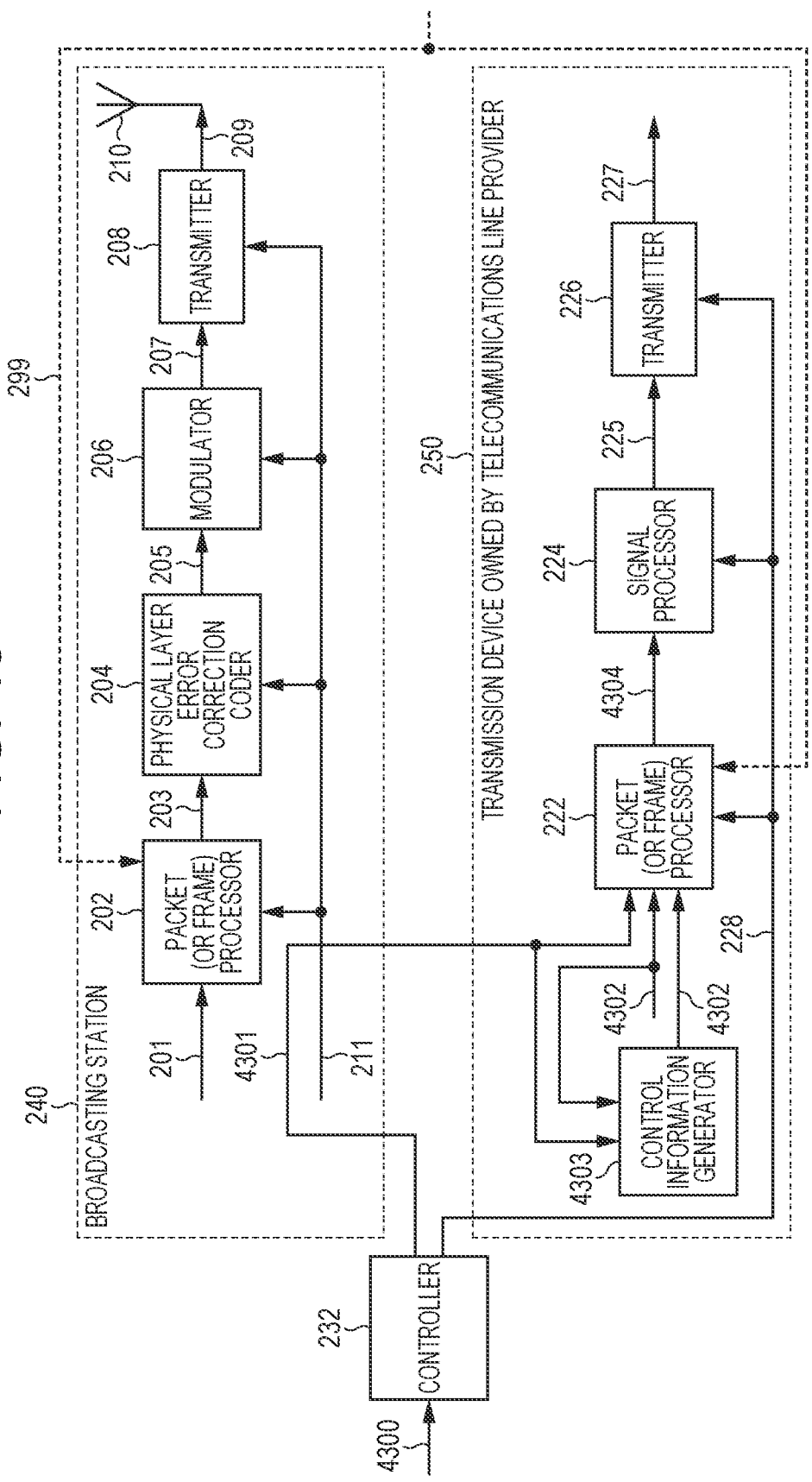
FIG. 43 is a view illustrating configuration examples of the broadcasting station and the transmission device owned by the telecommunications line provider.

FIG. 43 illustrates configuration examples of the broadcasting station and the transmission devices of the telecommunications line provider in the fourth exemplary embodiment. In FIG. 43, the component similar to that in FIG. 2 is designated by the identical reference mark. Transmitted data 4300 is input to controller 232, and controller 232 outputs transmitted data 4301 and second control signal 228. The detailed operation is described later with reference to FIG. 44.

Transmitted data 4301 and transmitted data 4302 are input to control information generator 4303, and control information generator 4303 generates and outputs control information 4302. The detailed operation is described later with reference to FIG. 44.

Transmitted data 4301, transmitted data 4302 that directly arrives at the telecommunications line provider, and second control signal 228 are input to packet (or frame) processor 222, and packet (or frame) processor 222 selects valid one of transmitted data 4301 and transmitted data 4302 using second control signal 228, performs the packet (or frame) processing, and outputs data 4304 after packet (or frame) processing. The detailed operation is described later with reference to FIG. 44.

Figure 44:
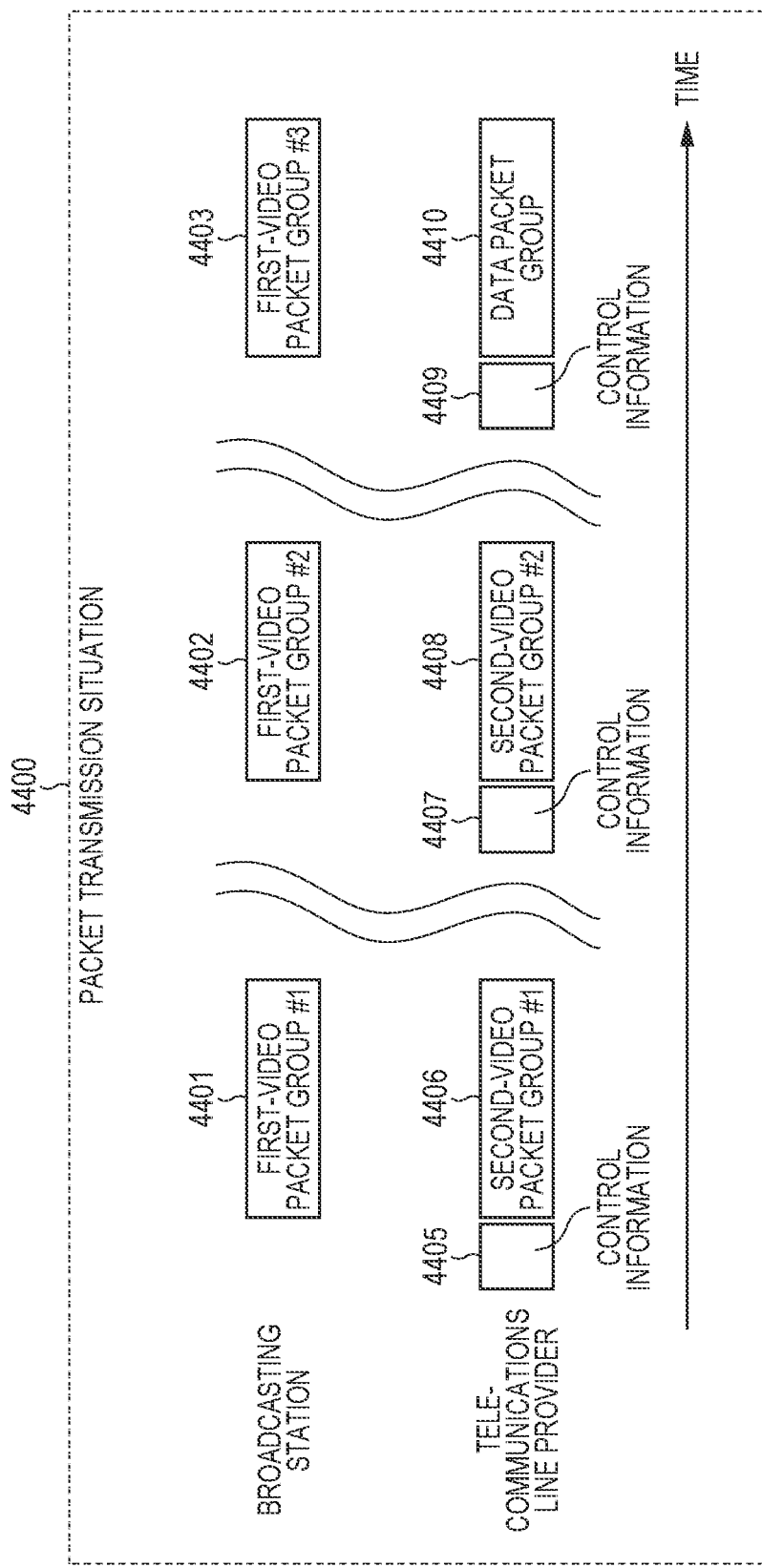
FIG. 44 is a view illustrating an example of the packet transmission situation.

FIG. 44 illustrates an example of transmission situation 4400 of the packets transmitted from the broadcasting station and the transmission device of the telecommunications line provider in the fourth exemplary embodiment. When the broadcasting station transmits "first-video packet group #1" (4401), the telecommunications line provider transmits control information 4405 and "second-video packet group #1" (4406). At this point, the transmission device of the telecommunications line provider in FIG. 43 performs missing correction coding (the error correction coding at the packet level) to generate "second-video packet group #1" (4406). Control information 4405 includes "information indicating that the missing correction coding (the error correction coding at the packet level) is performed".

Referring to FIG. 43, when the broadcasting station transmits "first-video packet group #2" (4402), the telecommunications line provider transmits control information 4407 and "second-video packet group #2" (4408). At this point, the transmission device of the telecommunications line provider in FIG. 43 does not perform the missing correction coding (the packet-level error correction coding), in order to generate "second-video packet group #2" (4408). Control information 4405 includes "information indicating that the missing correction coding (the error correction coding at the packet level) is not performed".

As described above, sometimes the missing correction coding (the error correction coding at the packet level) is performed when the packet of the second video is transmitted. For example, for a high video-coding compression ratio and/or a small number of screens (that is, the small data size), because the number of packets to be transmitted can be decreased, control information generator 4303 in FIG. 43 determines that the missing correction coding is not performed. On the other hand, for a low video-coding compression ratio and/or a large number of screens (that is, the large data size), because the number of packets to be transmitted can be increased, control information generator 4303 in FIG. 43 determines that the missing correction coding is performed.

When the broadcasting station in FIG. 43 transmits "first-video packet group #3" (4403), the telecommunications line provider transmits control information 4409 and "data packet group" (4410). The data of "data packet group" (4410) constitutes "character information", "still image information", and "URL information". The transmission device of the telecommunications line provider in FIG. 43 does not perform the missing correction coding (the packet-level error correction coding) to generate "data packet group" (4410). Control information 4409 includes "information indicating that the missing correction coding (the error correction coding at the packet level) is not performed".

In the case that the data of "data packet group" (4410) is "character information", "still image information", and "URL information", because an amount of data to be transmitted is smaller than that of the video data, control information generator 4303 in FIG. 43 determines that the missing correction coding is not performed.

Control information 4302 includes the information indicating whether the missing correction coding is performed.

Accordingly, packet (or frame) processor 222 in FIG. 43 determines whether the missing correction coding is performed on the data based on the information indicating whether the missing correction coding included in control information 4302 is performed, and performs the processing based on the determination result.

FIG. 42 illustrates a configuration example of the reception device of the terminal device that receives the signal transmitted as illustrated in FIGS. 43 and 44. The implementation method of the fourth exemplary embodiment is similar to that of the first to third exemplary embodiments.

Reception signal 354 is input to signal processor 355, and signal processor 355 determines a type (at least one of the video data, the character information (telegram information), the still image information, and the URL information) of the information transmitted from the telecommunications line provider from the control information (symbol) in FIG. 44, and outputs received data (second video packet group) 356, control information 357, and "logarithmic likelihood ratio signal 4202 of at least one of the character information (telegram information), the still image information, and the URL information".

"Logarithmic likelihood ratio signal 4202 of at least one of the character information (telegram information), the still image information, and the URL information" and control information 357 are input to packet (or frame) processor 4203, packet (or frame) processor 4203 performs the signal processing based on the pieces of information about the transmission method and the error correction coding method when the type of control information 357 is at least one of the character information (telegram information), still image information, and the URL information, and packet (or frame) processor 4203 outputs "received data 4204 of at least one of the character information (telegram information), the still image information, and the URL information".

"Received data 4204 of at least one of the character information (telegram information), the still image information, and the URL information" is input to decoder 4205, and decoder 4205 decodes at least one of the character information (telegram information), the still image information, and the URL information, and outputs display screen information 4206.

At this point, decoder 4205 is operated as follows. Display screen information 4206 becomes "the character information (telegram information) displayed on the display" in "the character information (telegram information)", becomes "the still image information displayed on the display" in "the still image information", and becomes information (4210) obtained from a URL source in "the URL information".

Received data 356 and control information 357 are input to packet (or frame) processor 358, and packet (or frame) processor 358 performs the missing correction decoding (the packet-level error correction decoding), when the type of the information included in control information 357 indicates the second video, and when the missing correction code is applied. When obtaining information that the missing correction code is not applied, packet (or frame) processor 358 does not perform the missing correction decoding (the packet-level error correction decoding).

Signal processor 380 determines whether the second video is obtained from the control information (symbol) in FIG. 44, and outputs determination result 4201.

Video signal 383, display screen information 4206, and determination result 4201 are input to display 384, and display 384 displays video signal 383 when determination result 4201 indicates that the second video is obtained. When determination result 4201 indicates that the second video is not obtained, display 384 displays display screen information 4206.

As described above, the terminal device can achieve the high reception quality of the data and the improvement of the data transfer rate (the data transfer rate is lowered when the missing correction coding is performed) by switching between the application and the non-application of the missing correction code (the error correction coding at the packet level).

Fifth Exemplary Embodiment

The application example of the missing correction code (the error correction coding at the packet level) is described in the first to fourth exemplary embodiments. Another example in which the missing correction code (the error correction coding at the packet level) is applied will be described in a fifth exemplary embodiment.

Figure 45:
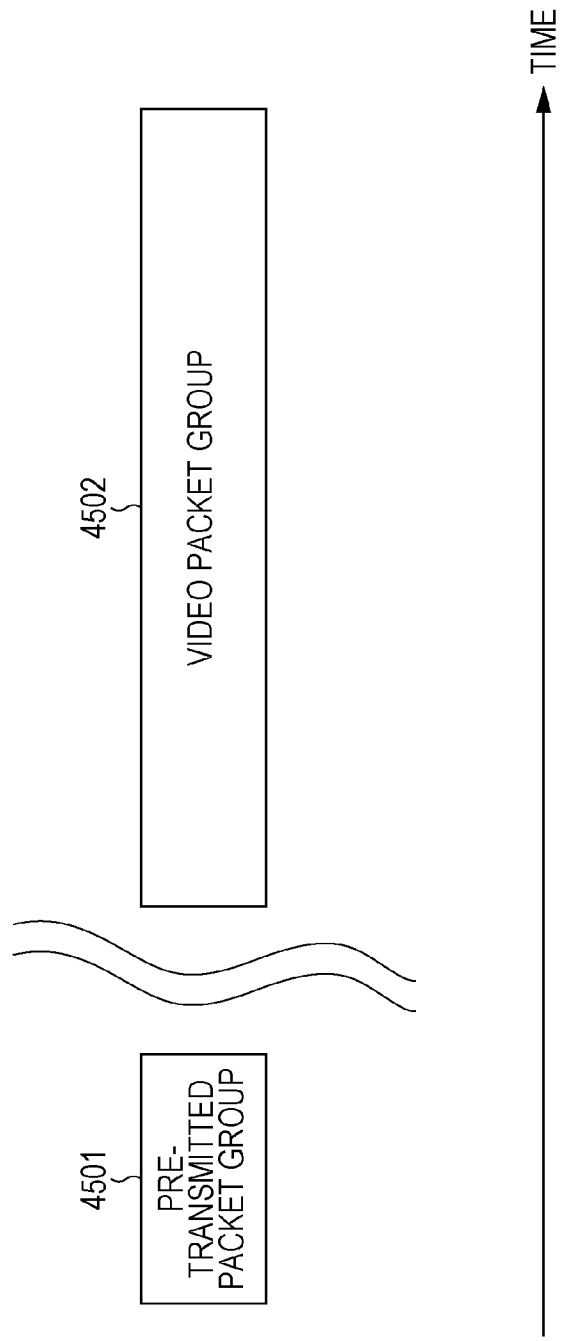
FIG. 45 is a view illustrating an example of the packet transmission situation.

FIG. 45 illustrates the packet transmitted from the broadcasting station in the fifth exemplary embodiment. In FIG. 45, the horizontal axis indicates the time. In FIG. 45, the terminal device receives and temporarily stores pre-transmitted packet group 4501. The terminal device cannot obtain the video (and audio) even if the terminal device receives pre-transmitted packet group 4501 to perform the packet-level error correction decoding (the information in which the video hardly be obtained is described in detail later). Therefore, a period of reception time of a program including the video can uniquely be set.

The terminal device can display the video (and audio) by obtaining video packet group 4502 (a characteristic is described in detail later). The terminal device can obtain the higher reception quality of the data (packet) by performing the packet-level error correction decoding using video packet group 4502 and stored pre-transmitted packet group 4501, and the video can be decoded with little disturbance.

Therefore, both the terminal device in which pre-transmitted packet group 4501 is stored and the terminal device in which pre-transmitted packet group 4501 is not stored can decode the video by obtaining video packet group 4502.

Figure 46:
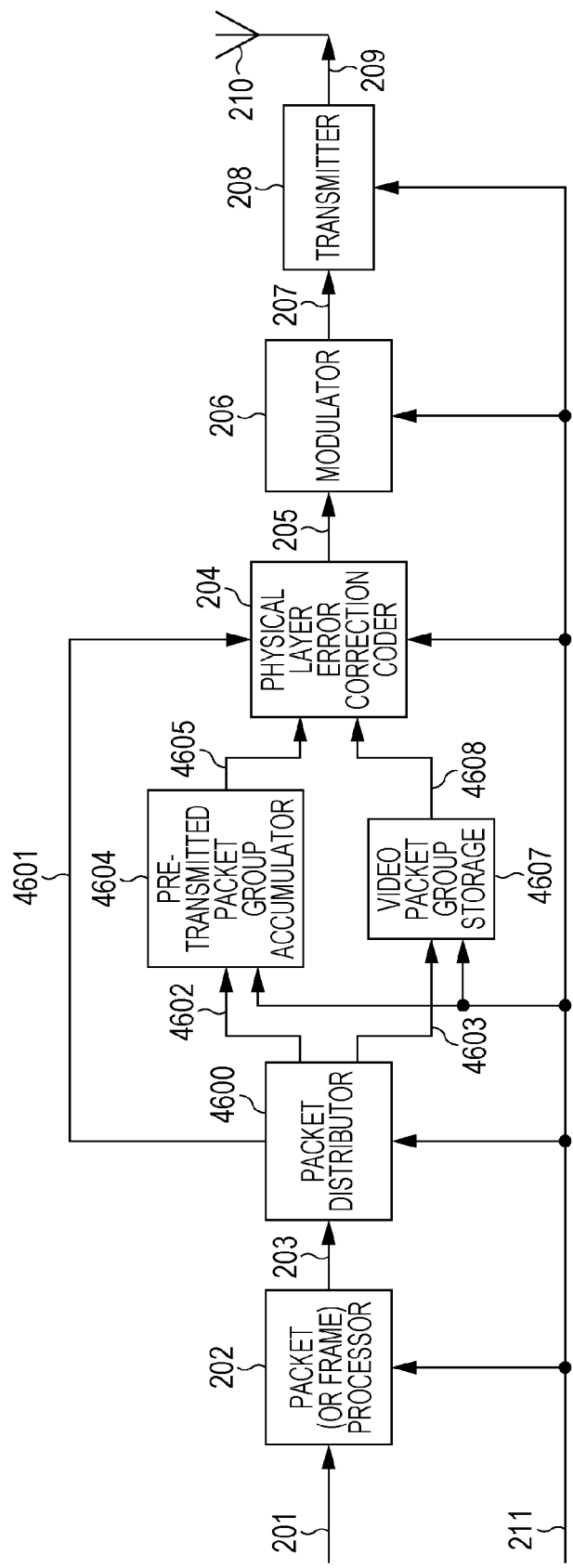
FIG. 46 is a view illustrating a configuration example of the broadcasting station.

FIG. 46 illustrates a configuration example of the broadcasting station that transmits the packet in FIG. 45. In FIG. 46, the component operated similarly to FIG. 2 is designated by the identical reference mark, and the description is omitted.

First video and/or audio information 201 and first control signal 211 are input to packet (or frame) processor 202, and packet (or frame) processor 202 performs the packet-level error correction coding based on first control signal 211, and outputs first video and/or audio information 203 after packet (or frame) processing.

In the fifth exemplary embodiment, first video and/or audio information 203 after packet (or frame) processing includes pre-transmitted packet group 4501 and video packet group 4502 in FIG. 45. The control information (the information necessary for the processing such as the demodulation, the decoding, and the signal processing, which is performed by the terminal device) is not illustrated in pre-transmitted packet group 4501 and video packet group 4502 of FIG. 45. However, the control information is also transmitted (pre-transmitted packet group 4501 includes the control information) when the broadcasting station transmits pre-transmitted packet group 4501, and the control information is also transmitted (video packet group 4502 includes the control information) when the broadcasting station transmits video packet group 4502.

First video and/or audio information 203 after packet (or frame) processing and first control signal 211 are input to packet distributor 4600, and packet distributor 4600 outputs pre-(transmitted) packet group 4602 and video packet group 4603 when first control signal 211 indicates that the transmission method in FIG. 45 is adopted. Packet distributor 4600 outputs packet group 4601 when first control signal 211 indicates that the transmission method in FIG. 45 is not adopted.

Pre-(transmitted) packet group 4602 and first control signal 211 are input to pre-(transmitted) packet accumulator 4604, and pre-(transmitted) packet accumulator 4604 temporarily stores the pre-transmitted packet group 4602 (however, pre-(transmitted) packet accumulator 4604 does not store the pre-transmitted packet group when the operation can be performed without storing the pre-transmitted packet group). Based on first control signal 211, pre-(transmitted) packet accumulator 4604 outputs the stored pre-transmitted packet group 4602 as pre-transmitted packet group 4605.

Video packet group 4603 and first control signal 211 are input to video packet storage 4607, and video packet storage 4607 temporarily stores the video packet group. Based on first control signal 211, video packet storage 4607 outputs the stored video packet group as video packet group 4608.

Packet group 4601, pre-(transmitted) packet group 4605, video packet group 4608, and first control signal 211 are input to physical layer error correction coder 204, and physical layer error correction coder 204 performs the physical layer error correction coding on the packet group 4601 to output data 205 after error correction coding when first control signal 211 indicates that the transmission method in FIG. 45 is not adopted.

When first control signal 211 indicates that the transmission method in FIG. 45 is adopted, physical layer error correction coder 204 outputs the data after error correction coding in which the physical layer error correction coding is performed on pre-(transmitted) packet group 4605 and the data after error correction coding in which the physical layer error correction coding is performed on video packet group 4608 according to the frame in FIG. 45.

A relationship among pre-(transmitted) packet group 4602 (4605) (4501), video packet group 4603 (4608)(4502), and first video and/or audio information 201 will be described below.

Figure 47:
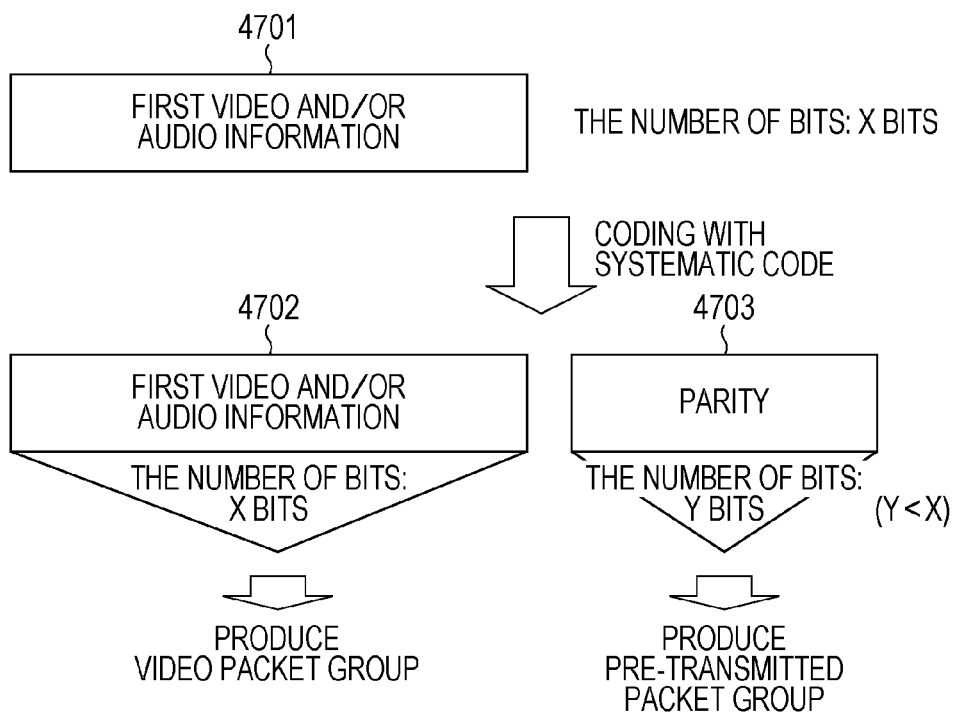
FIG. 47 is a view illustrating an example of a relationship between a video packet group and video and/or audio.
Figure 48:
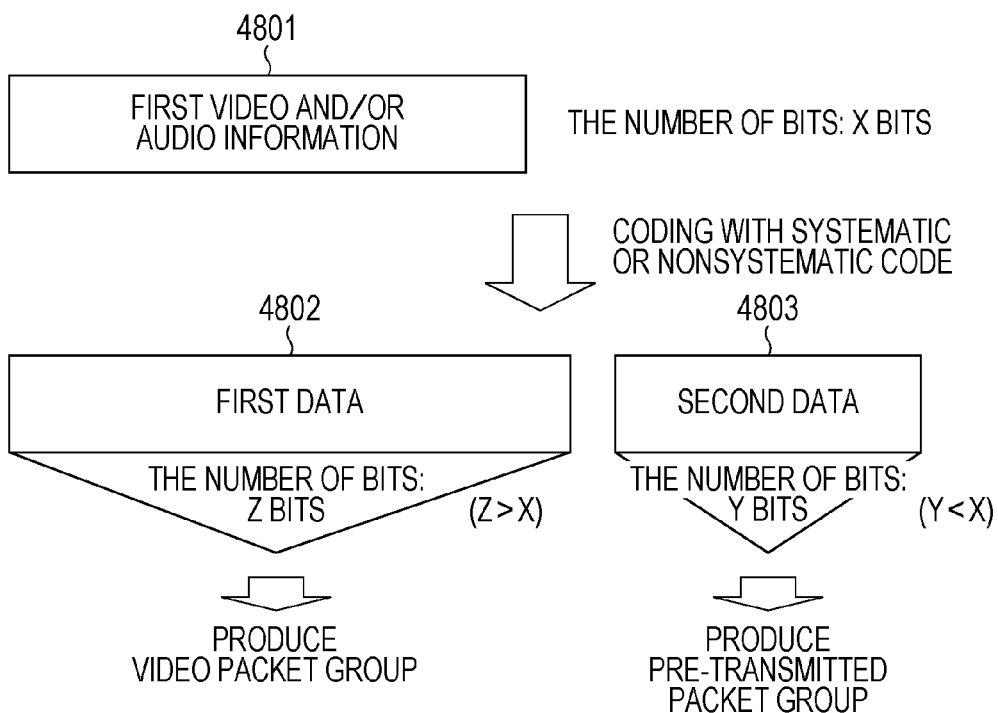
FIG. 48 is a view illustrating an example of the relationship between the video packet group and the video and/or audio.

FIG. 47 illustrates an example of the relationship among packet group 4602 (4605) (4501), video packet group 4603 (4608) (4502), and first video and/or audio information 201. FIG. 48 illustrates an example of the relationship among packet group 4602 (4605) (4501), video packet group 4603 (4608) (4502), and first video and/or audio information 201, the relationship in FIG. 48 being different from that in FIG. 47.

Therefore, FIG. 47 illustrates the number of bits of "first video and/or audio information" 4701 as X bit (X is a natural number). Physical layer error correction coder 204 codes "first video and/or audio information" 4701 using the systematic code in the packet-level error correction coding to obtain "first video and/or audio information" 4702 and parity 4703. Because "first video and/or audio information" 4701 is identical to "first video and/or audio information" 4702, the number of bits of "first video and/or audio information" 4702 is X bit (X is a natural number), the number of bits of parity 4703 is Y bit (Y is a natural number), and a relationship of Y<X holds.

Physical layer error correction coder 204 generates video packet group 4502 in FIG. 45 from "first video and/or audio information" 4702, and generates pre-(transmitted) packet group 4501 in FIG. 45 from parity 4703 (for example, the additional information such as the control information may be added to each packet).

In the case that physical layer error correction coder 204 generates the video packet group and the pre-transmitted packet group as illustrated in FIG. 47, "the terminal device cannot obtain the video (and audio) even if receiving pre-transmitted packet group 4501 to perform the packet-level error correction decoding" is satisfied because Y<X is satisfied.

"The terminal device can display the video (and audio) by obtaining video packet group 4502" is satisfied from the structure of the video packet group in FIG. 47, and "the terminal device can obtain the higher reception quality of the data (packet) to decode the video with little disturbance of the video by performing the packet-level error correction decoding using the video packet group 4502 and stored pre-transmitted packet group 4501" can be implemented.

In FIG. 48, the number of bits of "first video and/or audio information" 4801 is X bit (X is a natural number).

When the systematic code or nonsystematic code is used in the packet-level error correction coding, "first video and/or audio information" 4801 is coded to obtain "first video and/or audio information" 4802 and parity 4803.

The number of bits of "first data" 4802 is Z bit (Z is a natural number), and Z>X holds. The number of bits of "second data" 4803 is Y bit (Y is a natural number), and Y<X holds.

Video packet group 4502 in FIG. 45 is generated from "first data" 4802, and pre-(transmitted) packet group 4501 in FIG. 45 is generated from "second data" 4803 (for example, the additional information such as the control information may be added to each packet).

In the case that the video packet group and the pre-transmitted packet group are generated as illustrated in FIG. 48, "the terminal device cannot obtain the video (and audio) even if receiving pre-transmitted packet group 4501 to perform the packet-level error correction decoding" is satisfied because Y<X is satisfied.

"The terminal device can display the video (and audio) by obtaining video packet group 4502" is satisfied from the structure of the video packet group in FIG. 48, and "the terminal device can obtain the higher reception quality of the data (packet) to decode the video with little disturbance of the video by performing the packet-level error correction decoding using the video packet group 4502 and stored pre-transmitted packet group 4501" can be implemented.

Figure 49:
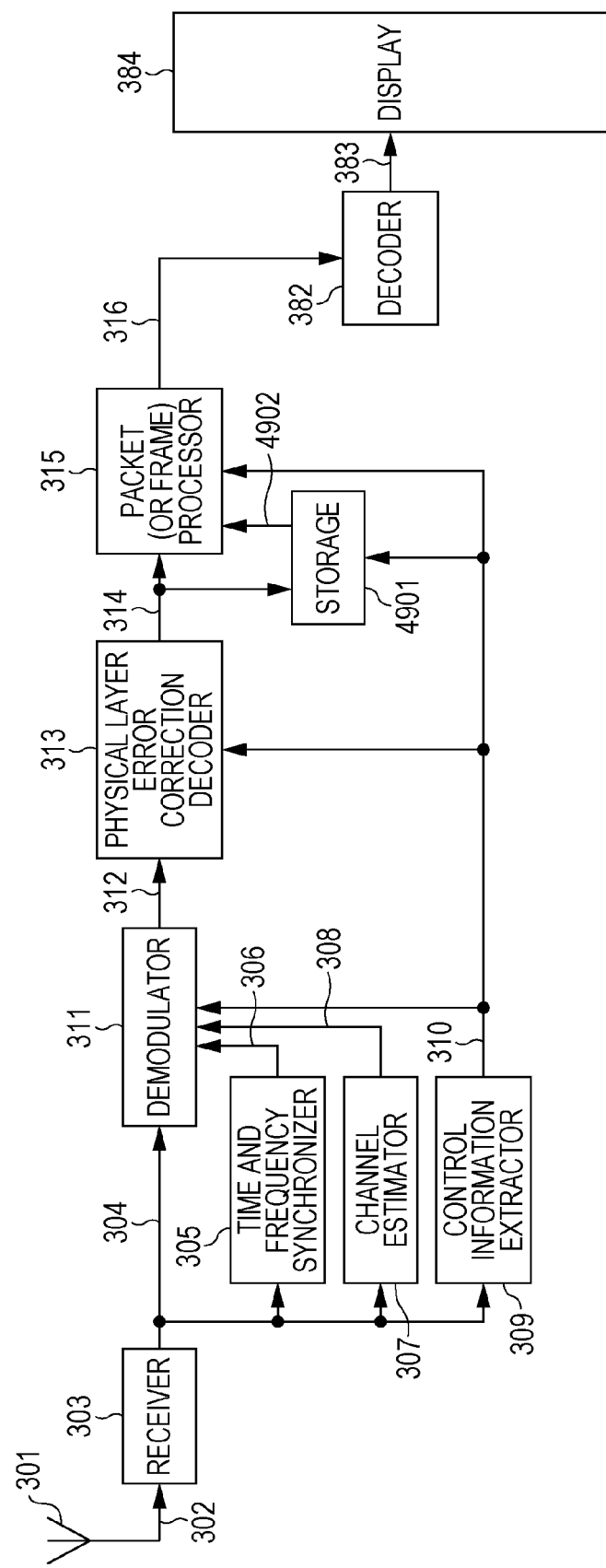
FIG. 49 is a view illustrating a configuration example of the terminal device.

FIG. 49 illustrates a configuration example of the terminal device that receives the packet group in FIG. 45. In FIG. 49, the component operated similarly to FIG. 3 is designated by the identical reference mark, and the description is omitted.

Received data 314 and control information signal 310 are input to storage 4901, and received data 314 is stored in storage 4901 when control information signal 310 indicates that "received data 314 is the data of pre-(transmitted) packet group 4501 in FIG. 45". In response to an instruction of control information signal 310, storage 4901 outputs the stored data (stored data 4902).

Received data 314, stored data 4902, and control information signal 310 are input to packet (or frame) processor 315.

Packet (or frame) processor 315 ignores received data 314 when control information signal 310 indicates that "received data 314 is the data of pre-(transmitted) packet group 4501 in FIG. 45".

The following processing is performed when control information signal 310 indicates that "received data 314 is the data of video packet group 4502 in FIG. 45".

<a> In the case that pre-transmitted packet group 4501 in FIG. 45 is stored in storage 4901, packet (or frame) processor 315 performs the packet-level error correction decoding using received data 314 and stored data 4902, and outputs data 316 after packet (or frame) processing.

<b> In the case that pre-transmitted packet group 4501 in FIG. 45 is not stored in storage 4901, packet (or frame) processor 315 performs the packet-level error correction decoding using received data 314, and outputs data 316 after packet (or frame) processing.

When control information signal 310 indicates that "it is not the transmission method in FIG. 45", packet (or frame) processor 315 performs the packet (or frame) processing based on control information signal 310, and outputs data 316 after packet (or frame) processing.

Therefore, the terminal device can obtain the data with high reception quality, and the highly flexible broadcasting system (multicast system) can be constructed.

The broadcasting station transmits the pre-(transmitted) packet by way of example. However, the transmission method is not limited to the above method. Accordingly, another transmission method will be described below.

Figure 50:
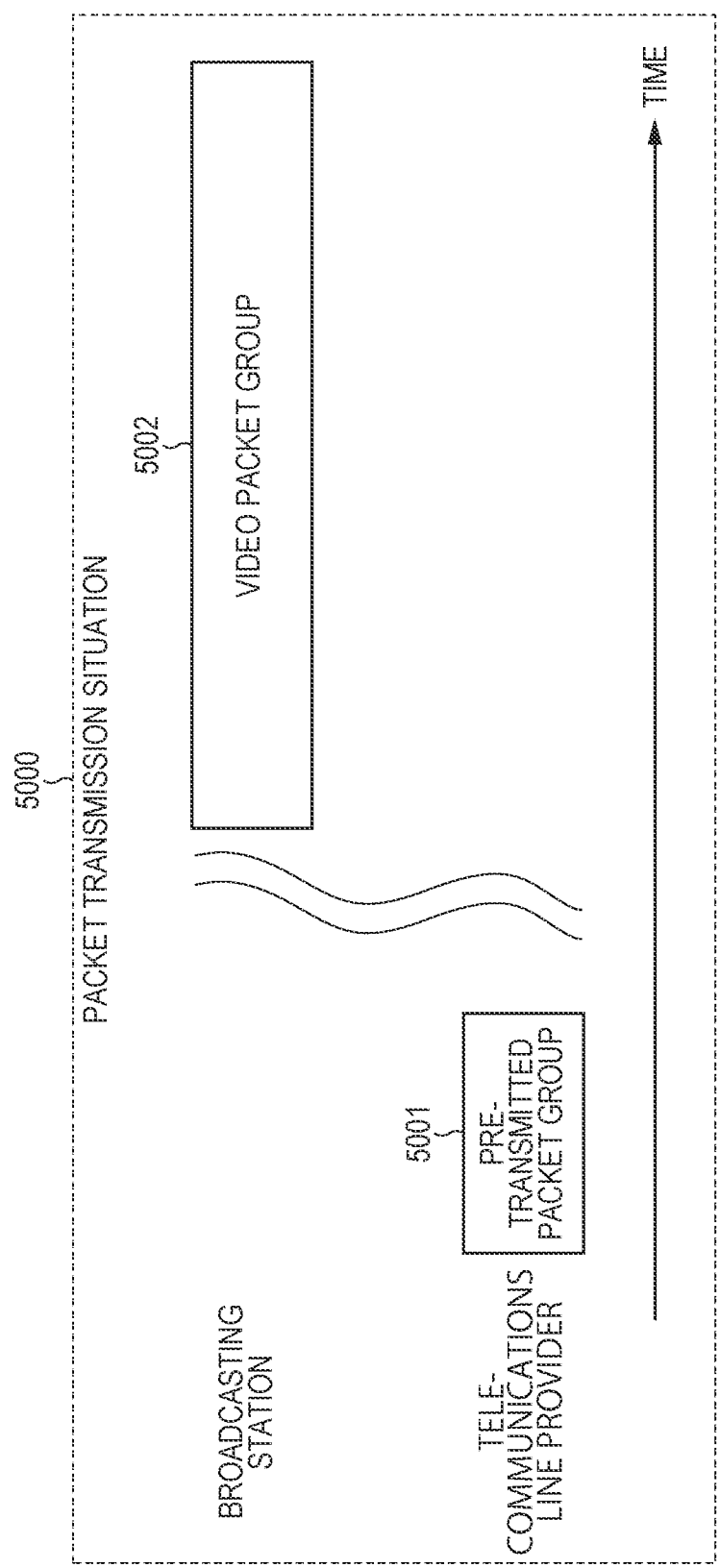
FIG. 50 is a view illustrating an example of the packet transmission situation.

FIG. 50 illustrates states of the packets transmitted from the broadcasting station and the transmission device of the telecommunications line provider in the fifth exemplary embodiment. In FIG. 50, the horizontal axis indicates the time. In FIG. 50, the transmission device of the telecommunications line provider transmits pre-transmitted packet group 5001. The terminal device receives and temporarily stores pre-transmitted packet group 5001. The terminal device cannot obtain the video (and audio) even if the terminal device receives pre-transmitted packet group 5001 to perform the packet-level error correction decoding (a characteristic is described in detail later). Therefore, a period of reception time of a program including the video can uniquely be set.

The broadcasting station transmits video packet group 5002. The terminal device can display the video (and audio) by obtaining video packet group 5002 (a characteristic is described in detail later). The terminal device can obtain the higher reception quality of the data by performing the packet-level error correction decoding using video packet group 5002 and stored pre-transmitted packet group 5001, and the video can be decoded with little disturbance.

Therefore, both the terminal device in which pre-transmitted packet group 5001 is stored and the terminal device in which pre-transmitted packet group 5001 is not stored can decode the video by obtaining video packet group 5002.

Figure 51:
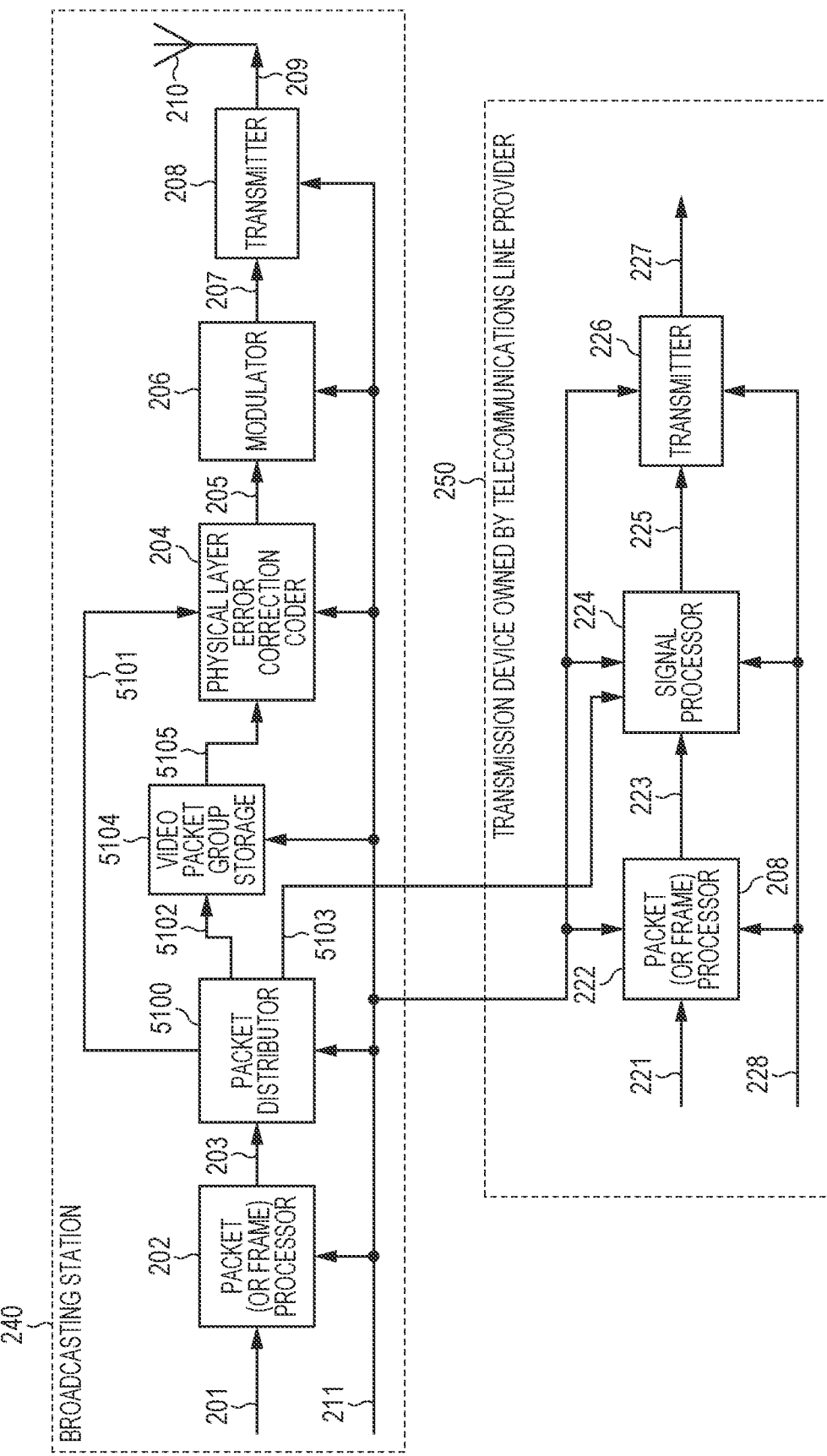
FIG. 51 is a view illustrating configuration examples of the broadcasting station and the transmission device owned by the telecommunications line provider.

FIG. 51 illustrates a configuration example of the broadcasting station and the transmission device of the telecommunications line provider, which transmit the packet as illustrated in FIG. 50. In FIG. 51, the component operated similarly to FIG. 2 is designated by the identical reference mark, and the description is omitted.

First video and/or audio information 201 and first control signal 211 are input to packet (or frame) processor 202, and packet (or frame) processor 202 performs the packet-level error correction coding based on first control signal 211, and outputs first video and/or audio information 203 after packet (or frame) processing.

In the fifth exemplary embodiment, first video and/or audio information 203 after packet (or frame) processing includes pre-transmitted packet group 5001 and video packet group 5002 in FIG. 50. At this point, the control information (the information necessary for the processing such as the demodulation, the decoding, and the signal processing, which is performed by the terminal device) is not illustrated in pre-transmitted packet group 5001 and video packet group 5002 of FIG. 50. However, the control information is also transmitted (pre-transmitted packet group 5001 includes the control information) when the transmission device of the telecommunications line provider transmits pre-transmitted packet group 5001, and the control information is also transmitted (video packet group 5002 includes the control information) when the broadcasting station transmits video packet group 5002.

First video and/or audio information 203 after packet (or frame) processing and first control signal 211 are input to packet distributor 5100, and packet distributor 5100 outputs pre-(transmitted) packet group 5103 and video packet group 5102 when first control signal 211 indicates that the transmission method in FIG. 50 is adopted. Packet distributor 5100 outputs packet group 5101 when first control signal 211 indicates that the transmission method in FIG. 50 is not adopted.

In FIG. 51, the broadcasting station includes packet (or frame) processor 202 and packet distributor 5100. Alternatively, the transmission device of the telecommunications line provider may include packet (or frame) processor 202 and packet distributor 5100, or another device may include packet (or frame) processor 202 and packet distributor 5100.

Video packet group 5102 and first control signal 211 are input to video packet storage 5104, and video packet storage 5104 temporarily stores the video packet group. Based on first control signal 211, video packet storage 5104 outputs the stored video packet group as video packet group 5105.

Packet group 5101, video packet group 5105, and first control signal 211 are input to physical layer error correction coder 204, and physical layer error correction coder 204 performs the physical layer error correction coding on the packet group 5101 to output data 205 after error correction coding when first control signal 211 indicates that the transmission method in FIG. 50 is not adopted.

When first control signal 211 indicates that the transmission method in FIG. 50 is adopted, physical layer error correction coder 204 outputs the data after error correction coding in which the physical layer error correction coding is performed on video packet group 5105 according to the frame in FIG. 50.

In the transmission device of the telecommunications line provider, information 223 after packet (or frame) processing, pre-(transmitted) packet group 5103, first control signal 211, and second control signal 228 are input to signal processor 224, and signal processor 224 performs the signal processing on pre-(transmitted) packet group 5103 according to the frame in FIG. 50 when first control signal 211 indicates that the transmission method in FIG. 50 is adopted, and second control signal 228 outputs signal 225 after signal processing.

Otherwise, based on the information about second control signal 228, signal processor 224 performs the signal processing on information 223 after packet (or frame) processing, and outputs signal 225 after signal processing.

A relationship among pre-(transmitted) packet group 5103 (5001), video packet group 5102 (5105) (5002), and first video and/or audio information 201 will be described below.

FIG. 47 illustrates an example of the relationship among packet group 5103 (5001) (4501), video packet group 5102 (5105) (5002), and first video and/or audio information 201. FIG. 48 illustrates an example of the relationship among packet group 5103 (5001) (4501), video packet group 5102 (5105) (5002), and first video and/or audio information 201, the relationship in FIG. 48 being different from that in FIG. 47.

In FIG. 47, the number of bits of "first video and/or audio information" 4701 is X bit (X is a natural number). When the systematic code is used in the packet-level error correction coding, "first video and/or audio information" 4701 is coded to obtain "first video and/or audio information" 4702 and parity 4703. "First video and/or audio information" 4701 is identical to "first video and/or audio information" 4702. Therefore, the number of bits of "first video and/or audio information" 4702 is X bit (X is a natural number). The number of bits of parity 4703 is Y bit (Y is a natural number), and Y<X holds.

The broadcasting station generates video packet group 5002 in FIG. 50 from "first video and/or audio information" 4702, and generates pre-(transmitted) packet group 5001 in FIG. 50 from parity 4703 (for example, the additional information such as the control information may be added to each packet).

In the case that the video packet group and the pre-transmitted packet group are generated as illustrated in FIG. 47, "the terminal device cannot obtain the video (and audio) even if receiving pre-transmitted packet group 5001 to perform the packet-level error correction decoding" is satisfied because Y<X is satisfied.

"The terminal device can display the video (and audio) by obtaining video packet group 5002" is satisfied from the structure of the video packet group in FIG. 47, and "the terminal device can obtain the higher reception quality of the data (packet) to decode the video with little disturbance of the video by performing the packet-level error correction decoding using the video packet group 5002 and stored pre-transmitted packet group 5001" can be implemented.

In FIG. 48, the number of bits of "first video and/or audio information" 4801 is X bit (X is a natural number).

When the systematic code or nonsystematic code is used in the packet-level error correction coding, "first video and/or audio information" 4801 is coded to obtain "first video and/or audio information" 4802 and "second data" 4803 (for example, the additional information such as the control information may be added to each packet).

The number of bits of "first data" 4802 is Z bit (Z is a natural number), and Z>X holds. The number of bits of "second data" 4803 is Y bit (Y is a natural number), and Y<X holds.

Video packet group 5002 in FIG. 50 is generated from "first data" 4802, and pre-(transmitted) packet group 5001 in FIG. 50 is generated from "second data" 4803.

In the case that the video packet group and the pre-transmitted packet group are generated as illustrated in FIG. 48, "the terminal device cannot obtain the video (and audio) even if receiving pre-transmitted packet group 5001 to perform the packet-level error correction decoding" is satisfied because Y<X is satisfied.

"The terminal device can display the video (and audio) by obtaining video packet group 5002" is satisfied from the structure of the video packet group in FIG. 48, and "the terminal device can obtain the higher reception quality of the data (packet) to decode the video with little disturbance of the video by performing the packet-level error correction decoding using the video packet group 5002 and stored pre-transmitted packet group 5001" can be implemented.

Figure 52:
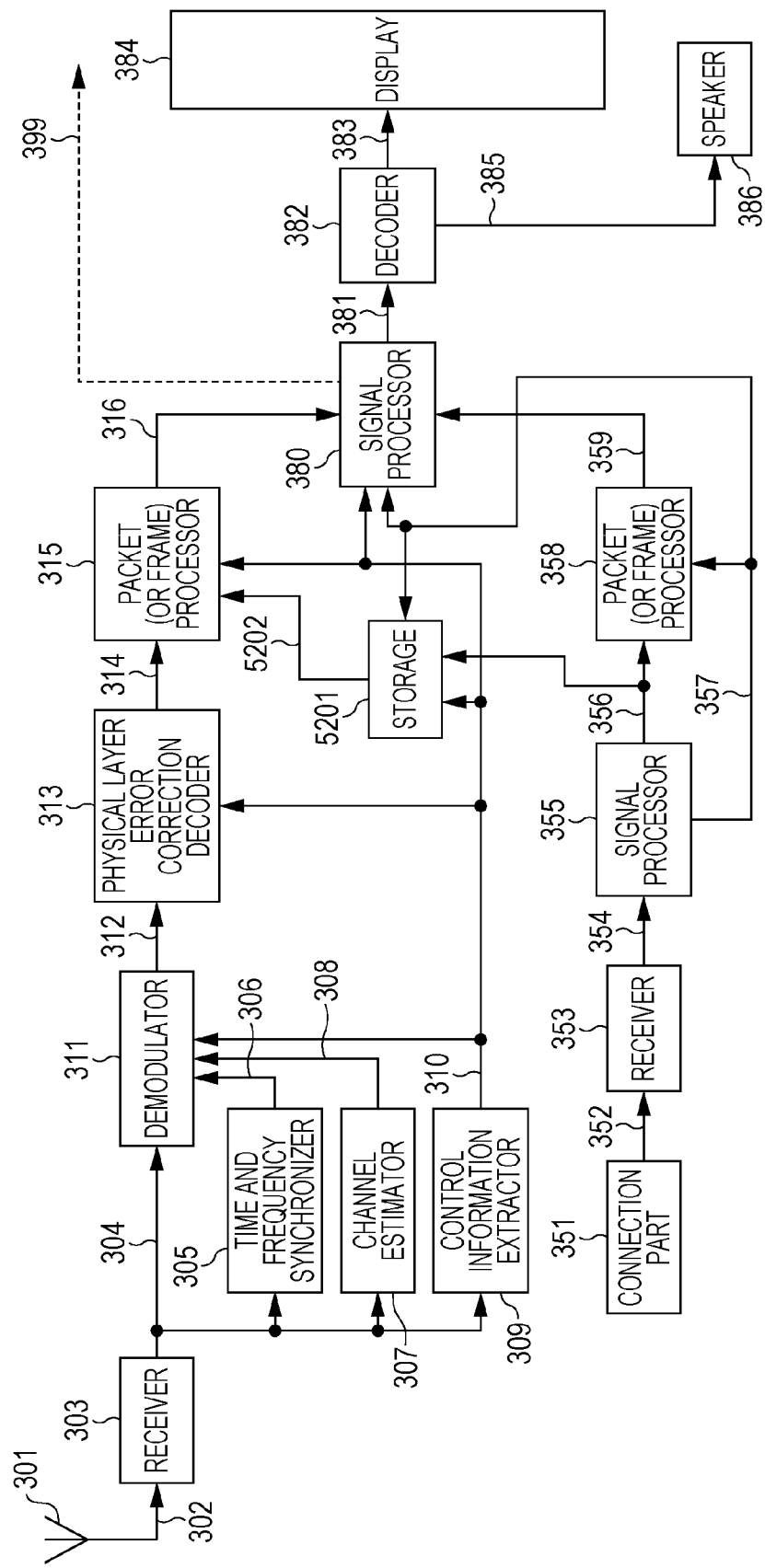
FIG. 52 is a view illustrating a configuration example of the terminal device.

FIG. 52 illustrates a configuration example of the terminal device that receives the packet group in FIG. 50. In FIG. 52, the component operated similarly to FIG. 3 is designated by the identical reference mark, and the description is omitted.

Control information signal 310, received data 356, and control information 357 are input to storage 5201, and received data 356 is stored in storage 5201 when control information 357 indicates that "received data 356 is the data of pre-(transmitted) packet group 5001 in FIG. 50". In response to an instruction of control information signal 310, storage 5201 outputs the stored data (stored data 5202).

Received data 314 and control information 357 are input to packet (or frame) processor 358, packet (or frame) processor 358 performs the packet (or frame) processing based on control information 357 when control information signal 357 indicates that "it is not the transmission method in FIG. 50", and packet (or frame) processor 358 outputs data 359 after packet (or frame) processing.

Received data 314, stored data 5202, and control information signal 310 are input to packet (or frame) processor 315.

The following processing is performed when control information signal 310 indicates that "received data 314 is the data of video packet group 5002 in FIG. 50".

<a> in the case that pre-transmitted packet group 5001 in FIG. 50 is stored in storage 5201, packet (or frame) processor 315 performs the packet-level error correction decoding using received data 314 and stored data 5202, and outputs data 316 after packet (or frame) processing.

<b> in the case that pre-transmitted packet group 5001 in FIG. 50 is not stored in storage 5201, packet (or frame) processor 315 performs the packet-level error correction decoding using received data 314, and outputs data 316 after packet (or frame) processing.

When control information signal 310 indicates that "it is not the transmission method in FIG. 50", packet (or frame) processor 315 performs the packet (or frame) processing based on control information signal 310, and outputs data 316 after packet (or frame) processing.

Therefore, the terminal device can obtain the data with high reception quality, and the highly flexible broadcasting system (multicast system) can be constructed.

A transmission method except for that of the fifth exemplary embodiment may be adopted in the broadcasting station. At this point, the broadcasting station switches between the transmission method of the fifth exemplary embodiment and the transmission method except for that of the fifth exemplary embodiment.

Sixth Exemplary Embodiment

The terminal device includes the display in the configuration of the first to fifth exemplary embodiments. However, the configuration of the terminal device is not limited to the configuration of the first to fifth exemplary embodiments. For example, the terminal device including the display may be connected to another device (referred to as a display device) including the display or the terminal device needs not to include the display.

The detailed configuration of the terminal device in the case that the first to fifth exemplary embodiments are implemented using the terminal device having such configurations will be described below.

The case that the terminal device including the display device can be connected to another device (referred to as the display device) including the display will be described.

Figure 53:
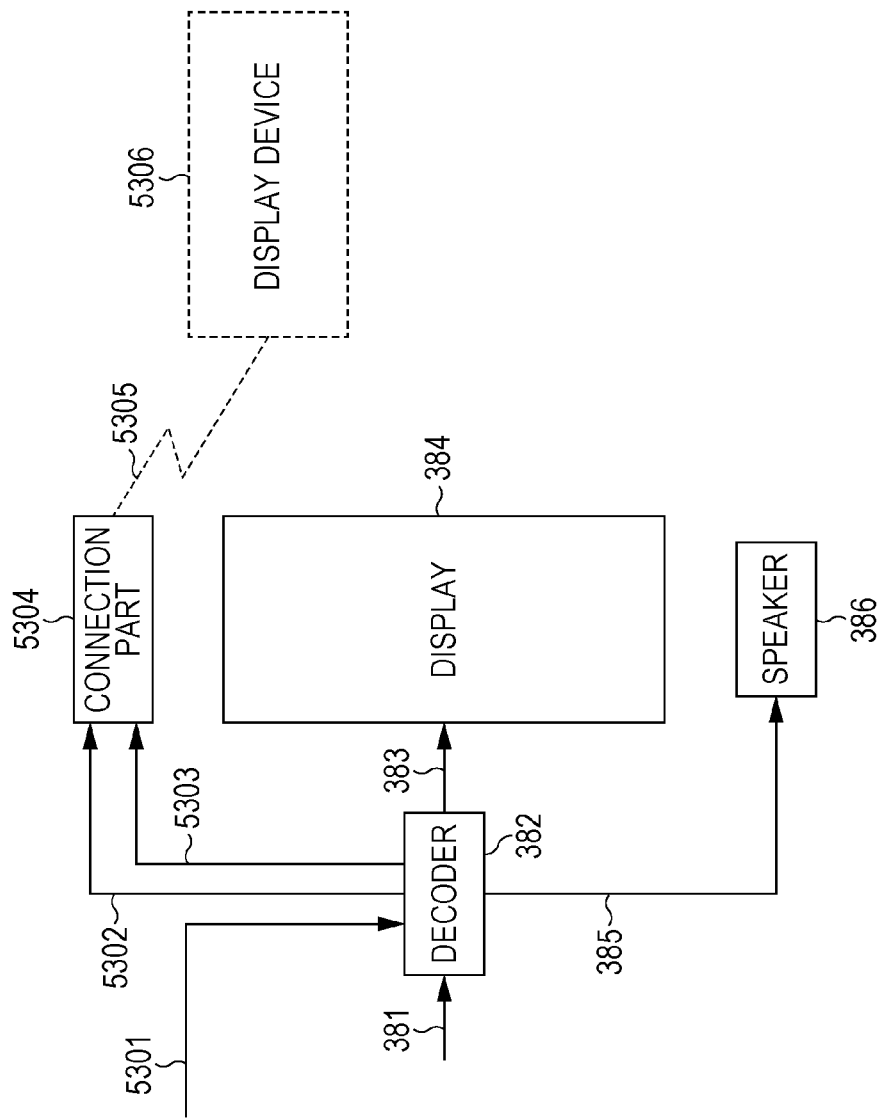
FIG. 53 is a view illustrating a configuration example of a periphery of a display.

FIG. 53 illustrates a configuration example of a periphery of the display in the terminal device of FIGS. 3, 28, 33, 37, 39, and 52. In FIG. 53, the component operated similarly to FIG. 3 is designated by the identical reference mark.

Data 381 and control signal 5301 are input to decoder 382. In the case that control signal 5301 indicates that "first video and/or audio information" and "second video and/or audio information" are displayed on the separate displays, for example, decoder 382 outputs the video data after the decoding of "first video and/or audio information" as decoded video data 383 in FIG. 53, and outputs the audio data after the decoding of "first video and/or audio information" as decoded audio data 385 in FIG. 53. At this point, display 384 displays the first video.

Additionally, because control signal 5301 indicates that "first video and/or audio information" and "second video and/or audio information" are displayed on the separate displays, decoder 382 outputs the video data after the decoding of "second video and/or audio information" as decoded video data 5302 in FIG. 53, and outputs the audio data after the decoding of "second video and/or audio information" as decoded audio data 5303 in FIG. 53.

Decoded video data 5302 in FIG. 53 that is of the video data after the decoding of "second video and/or audio information" and decoded audio data 5303 in FIG. 53 that is of the audio data after the decoding of "second video and/or audio information" are delivered to display device 5306 through connection part 5304 (connection 5305 may be either wireless or wired). Display device 5306 displays the second video (the second audio may be output from the speaker).

Another example will be described below.

Data 381 and control signal 5301 are input to decoder 382. In the case that control signal 5301 indicates that "first video and/or audio information" and "second video and/or audio information" are displayed on the separate displays, for example, decoder 382 outputs the video data after the decoding of "second video and/or audio information" as decoded video data 383 in FIG. 53, and outputs the audio data after the decoding of "second video and/or audio information" as decoded audio data 385 in FIG. 53. At this point, display 384 displays the second video.

Additionally, because control signal 5301 indicates that "first video and/or audio information" and "second video and/or audio information" are displayed on the separate displays, decoder 382 outputs the video data after the decoding of "first video and/or audio information" as decoded video data 5302 in FIG. 53, and outputs the audio data after the decoding of "first video and/or audio information" as decoded audio data 5303 in FIG. 53. Decoded video data 5302 in FIG. 53 that is of the video data after the decoding of "first video and/or audio information" and decoded audio data 5303 in FIG. 53 that is of the audio data after the decoding of "first video and/or audio information" are delivered to display device 5306 through connection part 5304 (connection 5305 may be either wireless or wired). Display device 5306 displays the first video (the first audio may be output from the speaker).

Either the first video or the second video may be displayed on display 384, or either the first video or the second video may be displayed on display device 5306. For example, the display method may be controlled by control signal 5301.

Control signal 5301 may include control information being able to switch between the case that the first video and the second video are displayed as described above and the case that the first video and the second video are displayed on display 384 as described in other exemplary embodiments. Control signal 5301 may include control information adjusting display timing of display 384 and display device 5306.

Figure 54:
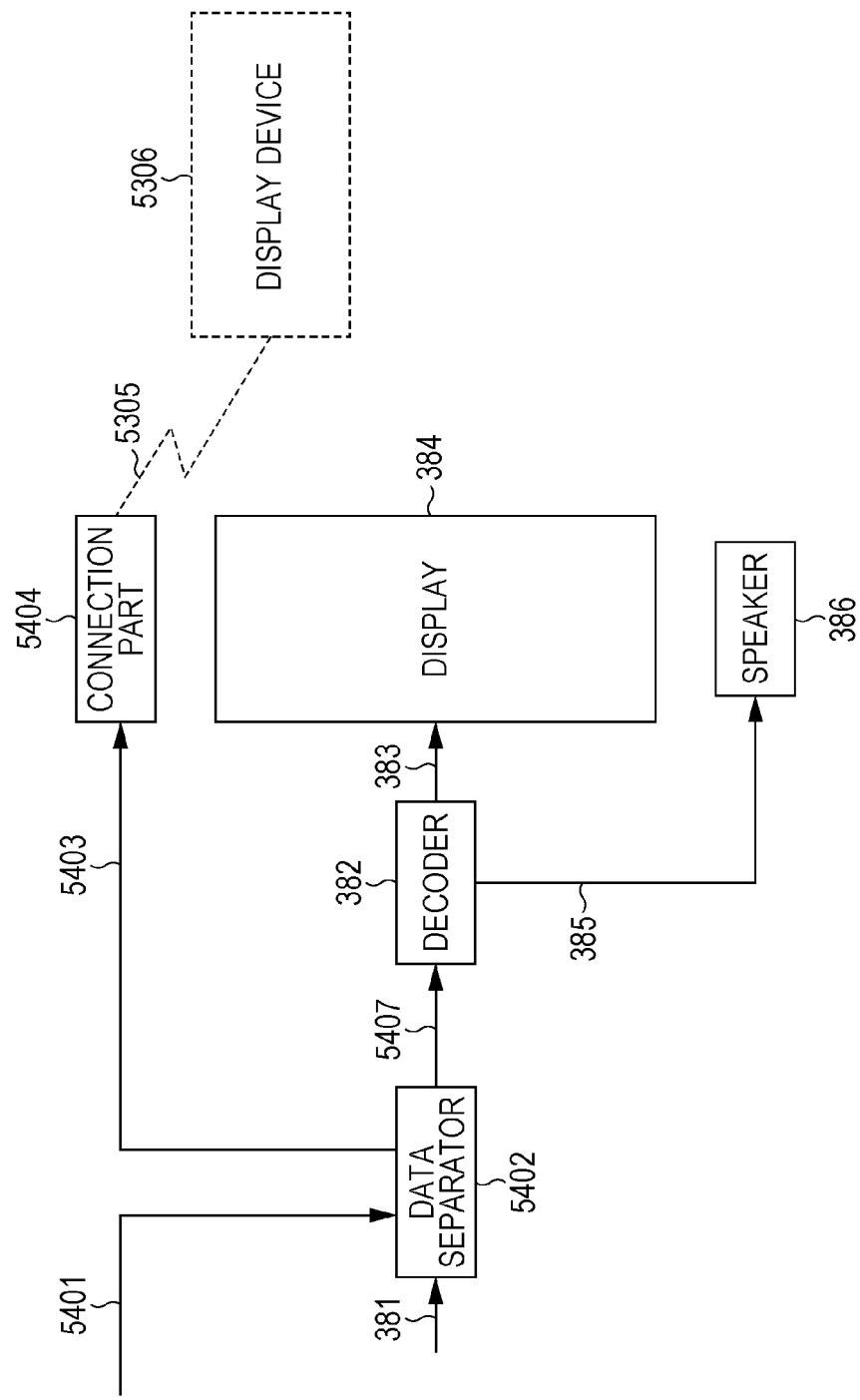
FIG. 54 is a view illustrating a configuration example of the periphery of the display.

FIG. 54 illustrates a configuration example of a periphery of the display in the terminal device of FIGS. 3, 28, 33, 37, 39, and 52. In FIG. 54, the component operated similarly to FIGS. 3 and 53 is designated by the identical reference mark.

Data 381 and control signal 5401 are input to data separator (also referred to as a "data controller") 5402. In the case that control signal 5401 indicates that "first video and/or audio information" and "second video and/or audio information" are displayed on the separate displays, for example, data separator (data controller) 5402 separates data 381 into the data associated with "first video and/or audio information" and the data associated with "second video and/or audio information", outputs the data associated with "first video and/or audio information" as data 5407, and outputs the data associated with "second video and/or audio information" as data 5403.

Data 5407 is input to decoder 382, decoder 382 decodes data 5407, and the decoded video data is displayed as the first video on display 384.

The data associated with "second video and/or audio information" is delivered to display device 5306 through connection part 5404 (connection 5305 may be either wireless or wired). Display device 5306 displays the second video (the second audio may be output from the speaker).

Another example will be described below.

Data 381 and control signal 5401 are input to data separator (also referred to as a "data controller") 5402. In the case that control signal 5401 indicates that "first video and/or audio information" and "second video and/or audio information" are displayed on the separate displays, for example, data separator (data controller) 5402 separates data 381 into the data associated with "first video and/or audio information" and the data associated with "second video and/or audio information", outputs the data associated with "second video and/or audio information" as data 5407, and outputs the data associated with "first video and/or audio information" as data 5403.

Data 5407 is input to decoder 382, decoder 382 decodes data 5407, and the second video is displayed on display 384.

The data associated with "first video and/or audio information" is delivered to display device 5306 through connection part 5404 (connection 5305 may be either wireless or wired). Display device 5306 displays the first video (the first audio may be output from the speaker).

Either the first video or the second video may be displayed on display 384, or either the first video or the second video may be displayed on display device 5306. For example, the display method may be controlled by control signal 5401.

Control signal 5401 may include control information switching between the case that the first video and the second video are displayed as described above and the case that the first video and the second video are displayed on display 384 as described in other exemplary embodiments. Control signal 5401 may include control information adjusting display timing of display 384 and display device 5306.

In FIG. 54, display device 5306 includes the video decoder.

Figure 55:
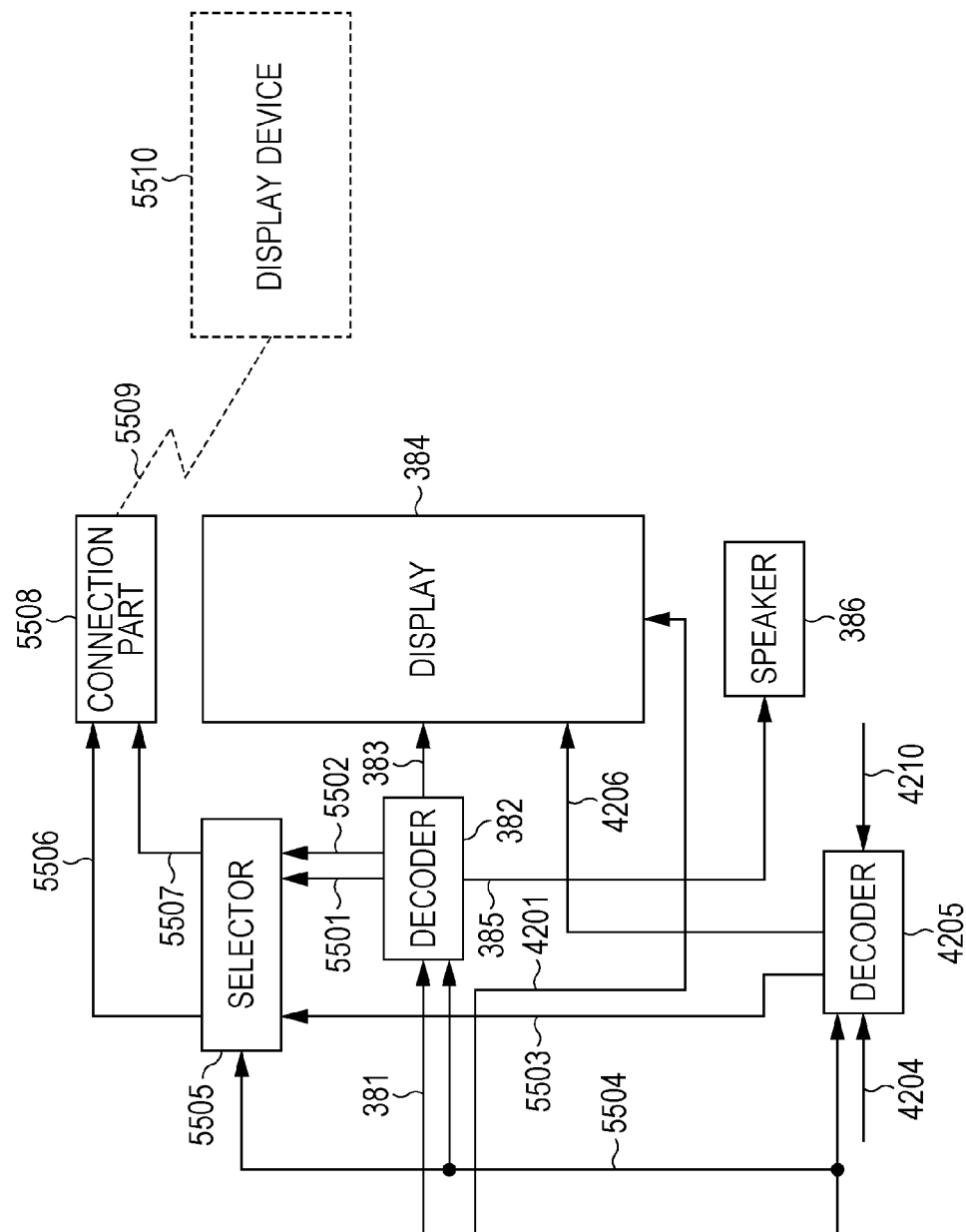
FIG. 55 is a view illustrating a configuration example of the periphery of the display.

FIG. 55 illustrates a configuration example of a periphery of the display in the terminal device of FIG. 42. In FIG. 55, the component operated similarly to FIGS. 3 and 42 is designated by the identical reference mark.

In the case that the terminal device has the configuration in FIG. 55, display 384 performs one of "first video is displayed", "second video is displayed", "first video and second video are displayed", "{first video} and {display screen based on at least one of character information (telegram information), still image information, and URL information} are displayed", "{second video} and {display screen based on at least one of character information (telegram information), still image information, and URL information} are displayed", and "{display screen based on at least one of character information (telegram information), still image information, and URL information} is displayed".

Display device 5510 performs one of "first video is displayed", "second video is displayed", "first video and second video are displayed", "{first video} and {display screen based on at least one of character information (telegram information), still image information, and URL information} are displayed", "{second video} and {display screen based on at least one of character information (telegram information), still image information, and URL information} are displayed", and "{display screen based on at least one of character information (telegram information), still image information, and URL information} is displayed".

Data 381 and control signal 5504 are input to decoder 382. In the case that control signal 5504 indicates that "first video and/or audio information" and "second video and/or audio information" are displayed on the separate displays, for example, decoder 382 outputs the video data after the decoding of "first video and/or audio information" as decoded video data 383 in FIG. 55, and outputs the audio data after the decoding of "first video and/or audio information" as decoded audio data 385 in FIG. 55. Display 384 displays the first video.

Additionally, because control signal 5504 indicates that "first video and/or audio information" and "second video and/or audio information" are displayed on the separate displays, decoder 382 outputs the video data after the decoding of "second video and/or audio information" as decoded video data 5501 in FIG. 55, and outputs the audio data after the decoding of "second video and/or audio information" as decoded audio data 5502 in FIG. 55.

Decoder 382 delivers decoded video data 5501 in FIG. 55 that is of the video data after the decoding of "second video and/or audio information" and decoded audio data 5302 in FIG. 55 that is of the audio data after the decoding of "second video and/or audio information" to display device 5510 through selector 5505 and connection part 5508 (connection 5509 may be either wireless or wired). Display device 5510 displays the second video (the second audio may be output from the speaker).

Another example will be described below.

Data 381 and control signal 5504 are input to decoder 382. In the case that control signal 5504 indicates that "first video and/or audio information" and "second video and/or audio information" are displayed on the separate displays, for example, decoder 382 outputs the video data after the decoding of "second video and/or audio information" as decoded video data 383 in FIG. 55, and outputs the audio data after the decoding of "second video and/or audio information" as decoded audio data 385 in FIG. 55. Display 384 displays the second video.

Additionally, because control signal 5504 indicates that "first video and/or audio information" and "second video and/or audio information" are displayed on the separate displays, decoder 382 outputs the video data after the decoding of "first video and/or audio information" as decoded video data 5501 in FIG. 55, and outputs the audio data after the decoding of "first video and/or audio information" as decoded audio data 5502 in FIG. 55.

Decoder 382 delivers decoded video data 5501 in FIG. 55 that is of the video data after the decoding of "first video and/or audio information" and decoded audio data 5302 in FIG. 55 that is of the audio data after the decoding of "first video and/or audio information" to display device 5510 through selector 5505 and connection part 5508 (connection 5509 may be either wireless or wired). Display device 5510 displays the first video (the first audio may be output from the speaker).

"Received data 4204 of at least one of character information (telegram information) after packet (or frame) processing, still image information, and URL information", information 4210 from URL, and control signal 5504 are input to decoder 4205.

Decoder 4205 outputs display screen information 4206 when control signal 5504 indicates that one of "received data 4204 of at least one of character information (telegram information) after packet (or frame) processing, still image information, and URL information" and "information 4210 from URL is displayed on display 384".

Decoder 4205 outputs display screen information 5503 when control signal 5504 indicates that one of "received data 4204 of at least one of character information (telegram information) after packet (or frame) processing, still image information, and URL information" and "information 4210 from URL is displayed on display device 5510".

Signals 5501, 5502, and 5505 and control signal 5504 are input to selector 5505, and selector 5505 outputs the display information displayed on display device 5510 and the information about sound output from the speaker as outputs 5506 and 5507 based on control signal 5504.

Signals 5506 and 5507 are transferred to display device 5510 through connection part 5508.

The plurality of screens may be displayed on display 384 as described in the above example. The terminal device partially transfers the display information to display device 5306, and display device 5306 may display the video (or screen). For example, the display method may be controlled by control signal 5504.

Control signal 5504 may include control information switching between the case that the first video and the second video are displayed as described above and the case that the first video and the second video are displayed on display 384 as described in other exemplary embodiments. Control signal 5504 may include control information adjusting display timing of display 384 and display device 5510.

Figure 56:
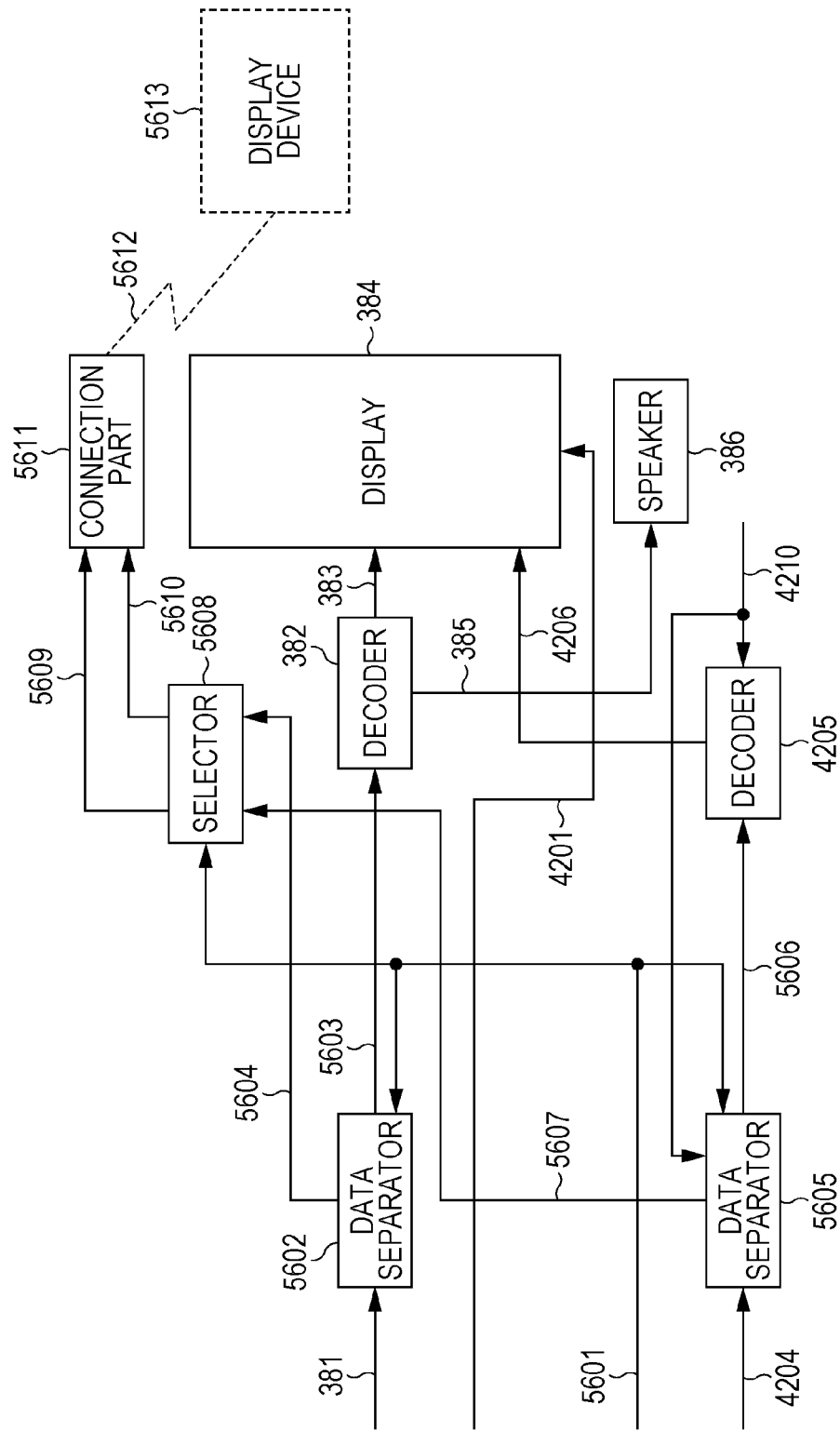
FIG. 56 is a view illustrating a configuration example of the periphery of the display.

FIG. 56 illustrates a configuration example of a periphery of the display in the terminal device of FIG. 42. In FIG. 56, the component operated similarly to FIGS. 3 and 42 is designated by the identical reference mark.

In the case that the terminal device has the configuration in FIG. 56, display 384 performs one of "first video is displayed", "second video is displayed", "first video and second video are displayed", "{first video} and {display screen based on at least one of character information (telegram information), still image information, and URL information} are displayed", "{second video} and {display screen based on at least one of character information (telegram information), still image information, and URL information} are displayed", and "{display screen based on at least one of character information (telegram information), still image information, and URL information} is displayed".

Display device 5510 performs one of "first video is displayed", "second video is displayed", "first video and second video are displayed", "{first video} and {display screen based on at least one of character information (telegram information), still image information, and URL information} are displayed", "{second video} and {display screen based on at least one of character information (telegram information), still image information, and URL information} are displayed", and "{display screen based on at least one of character information (telegram information), still image information, and URL information} is displayed".

Data 381 and control signal 5601 are input to data separator (data controller) 5602. In the case that control signal 5504 indicates that "first video and/or audio information" and "second video and/or audio information" are displayed on the separate displays, for example, data separator (data controller) 5602 separates data 381 into the data associated with "first video and/or audio information" and the data associated with "second video and/or audio information", outputs the data associated with "first video and/or audio information" as data 5603, and outputs the data associated with "second video and/or audio information" as data 5604.

Data 5407 is input to decoder 382, decoder 382 decodes data 5407, and the first video becomes a candidate displayed on display 384 (the video displayed on display 384 is selected from the candidate videos by determination result 4201).

The data associated with "second video and/or audio information" is delivered to display device 5613 through selector 5608 and connection part 5611 (connection 5612 may be either wireless or wired). Display device 5613 displays the second video (the second audio may be output from the speaker).

Another example will be described below.

Data 381 and control signal 5601 are input to data separator (data controller) 5602. In the case that control signal 5504 indicates that "first video and/or audio information" and "second video and/or audio information" are displayed on the separate displays, for example, data separator (data controller) 5602 separates data 381 into the data associated with "first video and/or audio information" and the data associated with "second video and/or audio information", outputs the data associated with "second video and/or audio information" as data 5603, and outputs the data associated with "first video and/or audio information" as data 5604.

Data 5407 is input to decoder 382, decoder 382 decodes data 5407, and the second video becomes the candidate displayed on display 384 (the video displayed on display 384 is selected from the candidate videos by determination result 4201).

The data associated with "first video and/or audio information" is delivered to display device 5613 through selector 5608 and connection part 5611 (connection 5612 may be either wireless or wired). Display device 5613 displays the first video (the first audio may be output from the speaker).

"Received data 4204 of at least one of character information (telegram information) after packet (or frame) processing, still image information, and URL information", information 4210 from URL, and control signal 5601 are input.

In the case that control signal 5601 indicates that one of "received data 4204 of at least of character information (telegram information) after packet (or frame) processing, still image information, and URL information" and "information 4210 from URL is displayed on display 384", data separator (data controller) 5605 outputs one of "received data 4204 of at least one of character information (telegram information) after packet (or frame) processing, still image information, and URL information" and "information 4210 from URL" as signal 5606.

In the case that control signal 5601 indicates that one of "received data 4204 of at least of character information (telegram information) after packet (or frame) processing, still image information, and URL information" and "information 4210 from URL is displayed on display device 5510", data separator (data controller) 5605 outputs one of "received data 4204 of at least one of character information (telegram information) after packet (or frame) processing, still image information, and URL information" and "information 4210 from URL" as signal 5607.

Signals 5604 and 5607 and control signal 5601 are input to selector 5608, and selector 5608 outputs the display information displayed on display device 5613 and the information about sound output from the speaker as outputs 5609 and 5610 based on control signal 5601.

Signals 5609 and 5610 are transferred to display device 5613 through connection part 5611.

The plurality of screens may be displayed on display 384 as described in the above example. The terminal device partially transfers the display information to display device 5613, and display device 5613 may display the video (or screen). For example, the display method may be controlled by control signal 5601.

Control signal 5601 may include control information switching between the case that the first video and the second video are displayed as described above and the case that the first video and the second video are displayed on display 384 as described in other exemplary embodiments. Control signal 5601 may include control information adjusting display timing of display 384 and display device 5613.

In the sixth exemplary embodiment, the terminal device including the display can be connected to another display device. At this point, the two videos may be displayed in a way different from the sixth exemplary embodiment using the display of the terminal device and another display device. For example, the video transmitted from the broadcasting station is displayed on the display of the terminal device, and the video linked with the video, the character information, or the still image (with or without character) may be displayed on another display device. The video transmitted from the broadcasting station is displayed on the display of another display device, and the video linked with the video, the character information, or the still image (with or without character) may be displayed on the display of the terminal device. The transfer method of the fifth exemplary embodiment may be adopted during the data transfer.

The configuration in which the terminal device does not include the display will be described below.

Figure 57:
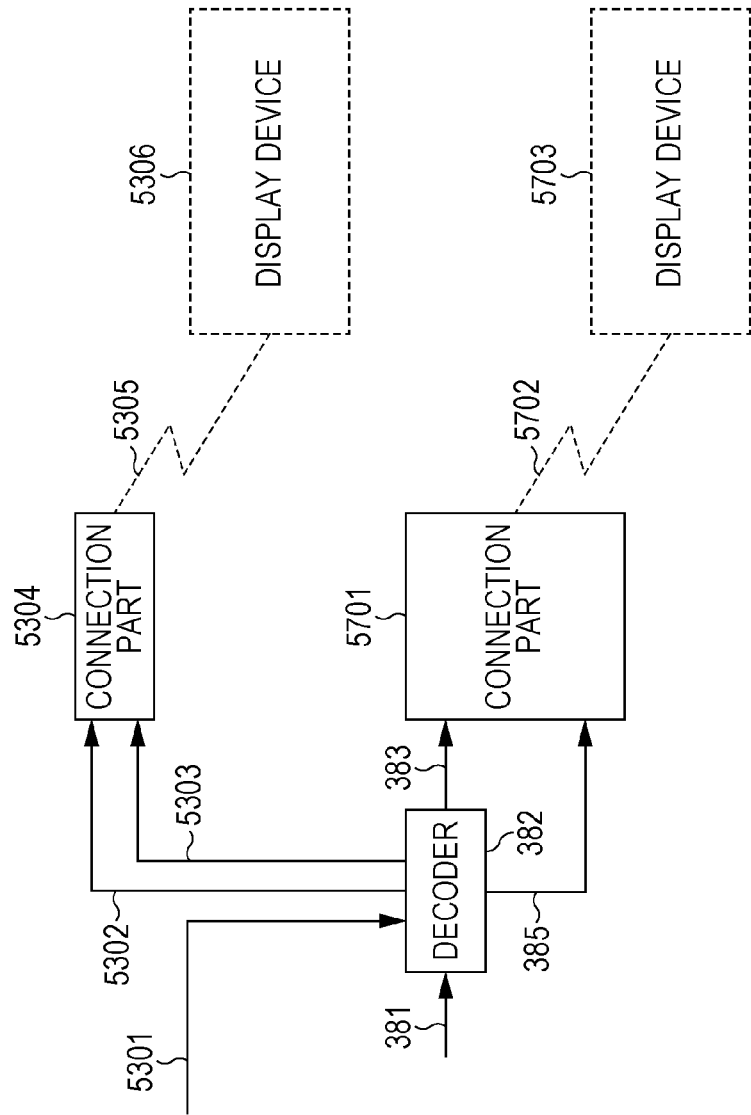
FIG. 57 is a view illustrating a configuration example of the periphery of the display.

FIG. 57 illustrates a configuration example of a periphery of the display in the terminal device of FIGS. 3, 28, 33, 37, 39, and 52. In FIG. 57, the component operated similarly to FIGS. 3 and 53 is designated by the identical reference mark.

Data 381 and control signal 5301 are input to decoder 382. In the case that control signal 5301 indicates that "first video and/or audio information" and "second video and/or audio information" are displayed on the separate displays, for example, decoder 382 outputs the video data after the decoding of "first video and/or audio information" as decoded video data 383 in FIG. 53, and outputs the audio data after the decoding of "first video and/or audio information" as decoded audio data 385 in FIG. 53. Decoded video data 383 and decoded audio data 385 are transferred to display device 5703 through connection part 5701. Display device 5703 displays the first video and outputs the audio (connection 5702 may be either wireless or wired).

Additionally, because control signal 5301 indicates that "first video and/or audio information" and "second video and/or audio information" are displayed on the separate displays, decoder 382 outputs the video data after the decoding of "second video and/or audio information" as decoded video data 5302 in FIG. 53, and outputs the audio data after the decoding of "second video and/or audio information" as decoded audio data 5303 in FIG. 53. Decoder 382 delivers decoded video data 5302 in FIG. 53 that is of the video data after the decoding of "second video and/or audio information" and decoded audio data 5303 in FIG. 53 that is of the audio data after the decoding of "second video and/or audio information" to display device 5306 through connection part 5304 (connection 5305 may be either wireless or wired). Display device 5306 displays the second video (the second audio may be output from the speaker).

Another example will be described below.

Data 381 and control signal 5301 are input to decoder 382. In the case that control signal 5301 indicates that "first video and/or audio information" and "second video and/or audio information" are displayed on the separate displays, for example, decoder 382 outputs the video data after the decoding of "second video and/or audio information" as decoded video data 383 in FIG. 53, and outputs the audio data after the decoding of "second video and/or audio information" as decoded audio data 385 in FIG. 53. Decoded video data 383 and decoded audio data 385 are transferred to display device 5703 through connection part 5701. Display device 5703 displays the second video and outputs the audio (connection 5702 may be either wireless or wired).

Additionally, because control signal 5301 indicates that "first video and/or audio information" and "second video and/or audio information" are displayed on the separate displays, decoder 382 outputs the video data after the decoding of "first video and/or audio information" as decoded video data 5302 in FIG. 53, and outputs the audio data after the decoding of "first video and/or audio information" as decoded audio data 5303 in FIG. 53.

Decoder 382 delivers decoded video data 5302 in FIG. 53 that is of the video data after the decoding of "first video and/or audio information" and decoded audio data 5303 in FIG. 53 that is of the audio data after the decoding of "first video and/or audio information" to display device 5306 through connection part 5304 (connection 5305 may be either wireless or wired). Display device 5306 displays the first video (the first audio may be output from the speaker).

Either the first video or the second video may be displayed on display device 5306, or either the first video or the second video may be displayed on display device 5306. For example, the display method may be controlled by control signal 5301.

Control signal 5301 may include control information switching between the case that the first video and the second video are displayed as described above and the case that the first video and the second video are displayed on display 384 as described in other exemplary embodiments. Control signal 5301 may include control information adjusting the display timing of display device 5306 and display device 384.

Figure 58:
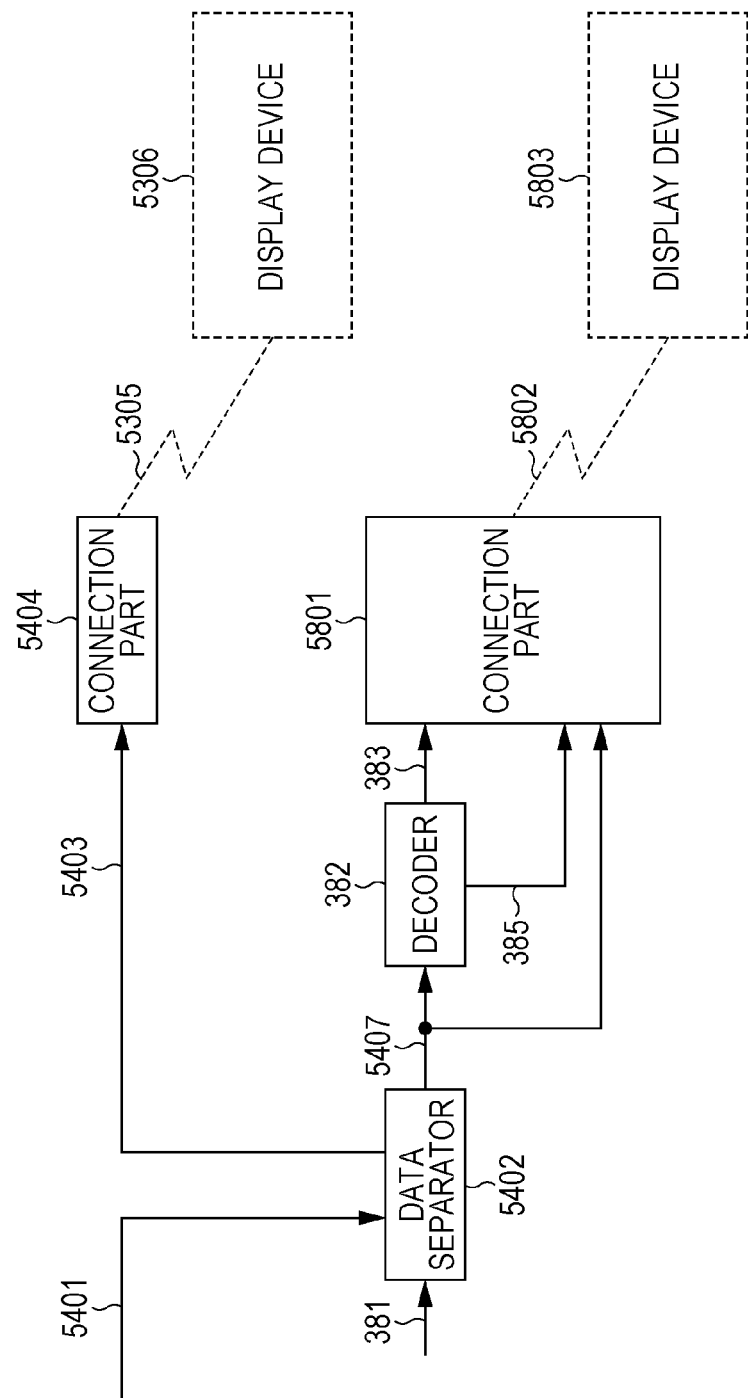
FIG. 58 is a view illustrating a configuration example of a periphery of a display.

FIG. 58 illustrates a configuration example of a periphery of the display in the terminal device of FIGS. 3, 28, 33, 37,
39, and 52. In FIG. 58, the component operated similarly to FIGS. 3, 53, and 54 is designated by the identical reference mark.

Data 381 and control signal 5401 are input to data separator (also referred to as a "data controller") 5402. In the case that control signal 5401 indicates that "first video and/or audio information" and "second video and/or audio information" are displayed on the separate displays, for example, data separator (data controller) 5402 separates data 381 into the data associated with "first video and/or audio information" and the data associated with "second video and/or audio information", outputs the data associated with "first video and/or audio information" as data 5407, and outputs the data associated with "second video and/or audio information" as data 5403.

Data 5407 is input to decoder 382, and decoder 382 outputs pieces of decoded data (video and audio) 383 and 395. Pieces of decoded data (video and audio) 383 and 395 and data 5407 are transferred to display device 5803 through connection part 5801 (connection 5802 may be either wireless or wired). Display device 5803 displays the first video (the first audio may be output from the speaker).

The data associated with "first video and/or audio information" is delivered to display device 5306 through connection part 5404 (connection 5305 may be either wireless or wired). Display device 5306 displays the second video (the second audio may be output from the speaker).

Another example will be described below.

Data 381 and control signal 5401 are input to data separator (also referred to as a "data controller") 5402. In the case that control signal 5401 indicates that "first video and/or audio information" and "second video and/or audio information" are displayed on the separate displays, for example, data separator (data controller) 5402 separates data 381 into the data associated with "first video and/or audio information" and the data associated with "second video and/or audio information", outputs the data associated with "second video and/or audio information" as data 5407, and outputs the data associated with "first video and/or audio information" as data 5403.

Data 5407 is input to decoder 382, and decoder 382 outputs pieces of decoded data (video and audio) 383 and 395. Pieces of decoded data (video and audio) 383 and 395 and data 5407 are transferred to display device 5803 through connection part 5801 (connection 5802 may be either wireless or wired). Display device 5803 displays the second video (the second audio may be output from the speaker).

The data associated with "first video and/or audio information" is delivered to display device 5306 through connection part 5404 (connection 5305 may be either wireless or wired). Display device 5306 displays the first video (the first audio may be output from the speaker).

Either the first video or the second video may be displayed on display device 5803, or either the first video or the second video may be displayed on display device 5306. For example, the display method may be controlled by control signal 5401.

Control signal 5401 may include control information switching between the case that the first video and the second video are displayed as described above and the case that the first video and the second video are displayed on display device 5803 as described in other exemplary embodiments. Control signal 5401 may include control information adjusting the display timing of display device 5803 and display device 5306.

In FIG. 58, display device 5308 includes the video decoder.

Figure 59:
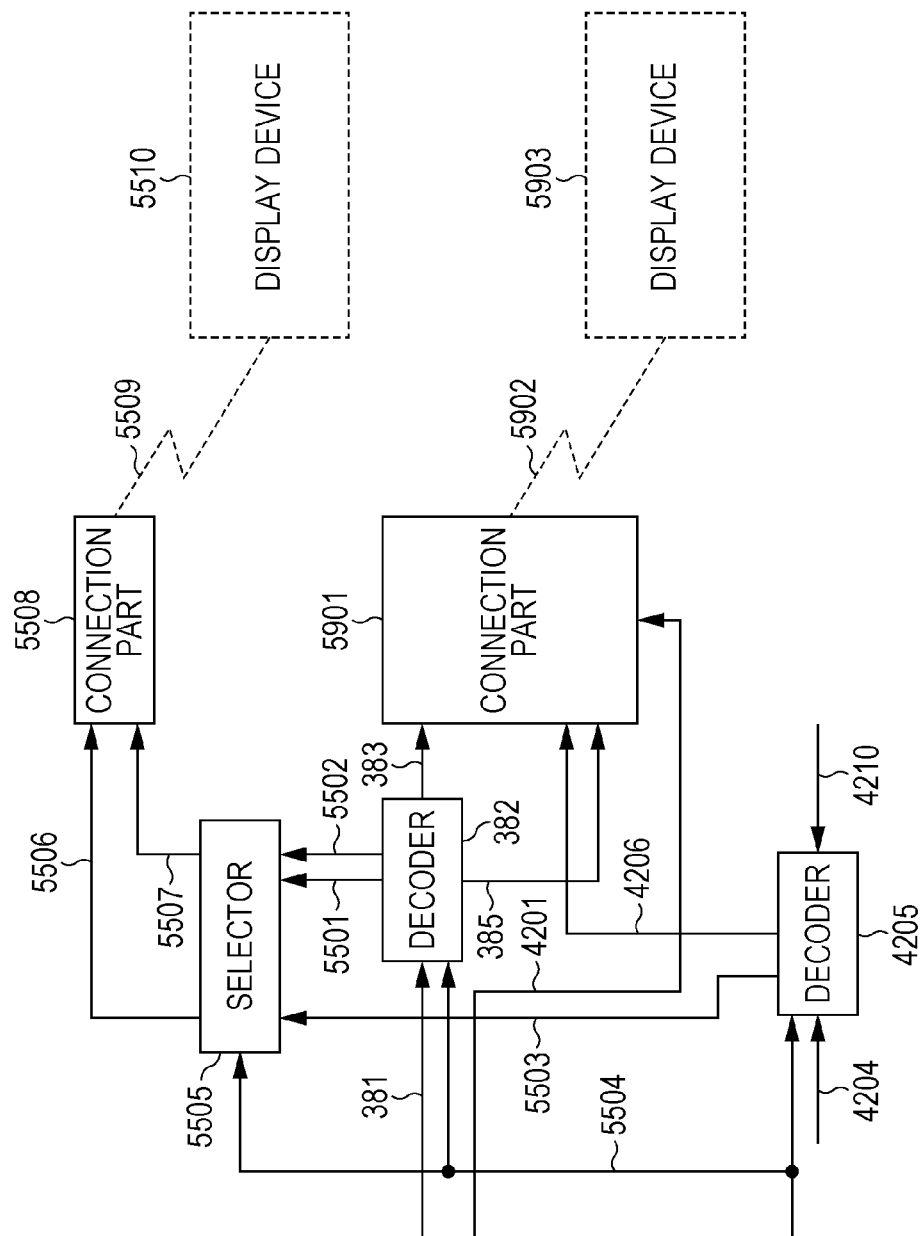
FIG. 59 is a view illustrating a configuration example of the periphery of the display.

FIG. 59 illustrates a configuration example of a periphery of the display in the terminal device of FIG. 42. In FIG. 59, the component operated similarly to FIGS. 3, 42, and 55 is designated by the identical reference mark.

In the case that the terminal device has the configuration in FIG. 59, display device 5903 performs one of "first video is displayed", "second video is displayed", "first video and second video are displayed", "{first video} and {display screen based on at least one of character information (telegram information), still image information, and URL information} are displayed", "{second video} and {display screen based on at least one of character information (telegram information), still image information, and URL information} are displayed", and "{display screen based on at least one of character information (telegram information), still image information, and URL information} is displayed".

Display device 5510 performs one of "first video is displayed", "second video is displayed", "first video and second video are displayed", "{first video} and {display screen based on at least one of character information (telegram information), still image information, and URL information} are displayed", "{second video} and {display screen based on at least one of character information (telegram information), still image information, and URL information} are displayed", and "{display screen based on at least one of character information (telegram information), still image information, and URL information} is displayed".

Data 381 and control signal 5504 are input to decoder 382. In the case that control signal 5504 indicates that "first video and/or audio information" and "second video and/or audio information" are displayed on the separate displays, for example, decoder 382 outputs the video data after the decoding of "first video and/or audio information" as output 383 in FIG. 59, and outputs the audio data after the decoding of "first video and/or audio information" as output 385 in FIG. 59.

Signals 383, 385, and 4206 are transferred to display device 5903 through connection part 5901 (connection 5902 may be either wireless or wired).

Additionally, because control signal 5504 indicates that "first video and/or audio information" and "second video and/or audio information" are displayed on the separate displays, decoder 382 outputs the video data after the decoding of "second video and/or audio information" as decoded video data 5501 in FIG. 59, and outputs the audio data after the decoding of "second video and/or audio information" as decoded audio data 5502 in FIG. 59.

Decoder 382 delivers decoded video data 5501 in FIG. 59 that is of the video data after the decoding of "second video and/or audio information" and decoded audio data 5302 in FIG. 59 that is of the audio data after the decoding of "second video and/or audio information" to display device 5510 through selector 5505 and connection part 5508 (connection 5509 may be either wireless or wired). Display device 5510 displays the second video (the second audio may be output from the speaker).

Another example will be described below.

Data 381 and control signal 5504 are input to decoder 382. In the case that control signal 5504 indicates that "first video and/or audio information" and "second video and/or audio information" are displayed on the separate displays, for example, decoder 382 outputs the video data after the decoding of "second video and/or audio information" as decoded video data 383 in FIG. 59, and outputs the audio data after the decoding of "second video and/or audio information" as decoded audio data 385 in FIG. 59.

Signals 383, 385, and 4206 are transferred to display device 5903 through connection part 5901 (connection 5902 may be either wireless or wired).

Additionally, because control signal 5504 indicates that "first video and/or audio information" and "second video and/or audio information" are displayed on the separate displays, decoder 382 outputs the video data after the decoding of "first video and/or audio information" as decoded video data 5501 in FIG. 59, and outputs the audio data after the decoding of "first video and/or audio information" as decoded audio data 5502 in FIG. 59.

Decoder 382 delivers decoded video data 5501 in FIG. 59 that is of the video data after the decoding of "first video and/or audio information" and decoded audio data 5302 in FIG. 59 that is of the audio data after the decoding of "first video and/or audio information" to display device 5510 through selector 5505 and connection part 5508 (connection 5509 may be either wireless or wired). Display device 5510 displays the first video (the first audio may be output from the speaker).

"Received data 4204 of at least one of character information (telegram information) after packet (or frame) processing, still image information, and URL information", information 4210 from URL, and control signal 5504 are input to decoder 4205.

Decoder 4205 outputs display screen information 4206 when control signal 5504 indicates that one of "received data 4204 of at least one of character information (telegram information) after packet (or frame) processing, still image information, and URL information" and "information 4210 from URL" is displayed.

Decoder 4205 outputs display screen information 5503 when control signal 5504 indicates that one of "received data 4204 of at least one of character information (telegram information) after packet (or frame) processing, still image information, and URL information" and "information 4210 from URL" is displayed on display device 5510".

Signals 5501, 5502, and 5505 and control signal 5504 are input to selector 5505, and selector 5505 outputs the display information displayed on display device 5510 and the information about sound output from the speaker as outputs 5506 and 5507 based on control signal 5504.

Signals 5506 and 5507 are transferred to display device 5510 through connection part 5508.

The plurality of screens may be displayed on display device 5510 as described in the above example. The terminal device partially transfers the display information to display device 5306, and display device 5306 may display the video (or screen). For example, the display method may be controlled by control signal 5504.

Control signal 5504 may include control information switching between the case that the first video and the second video are displayed as described above and the case that the first video and the second video are displayed on display 384 as described in other exemplary embodiments. Control signal 5504 may include control information adjusting display timing of display 384 and display device 5510.

Figure 60:
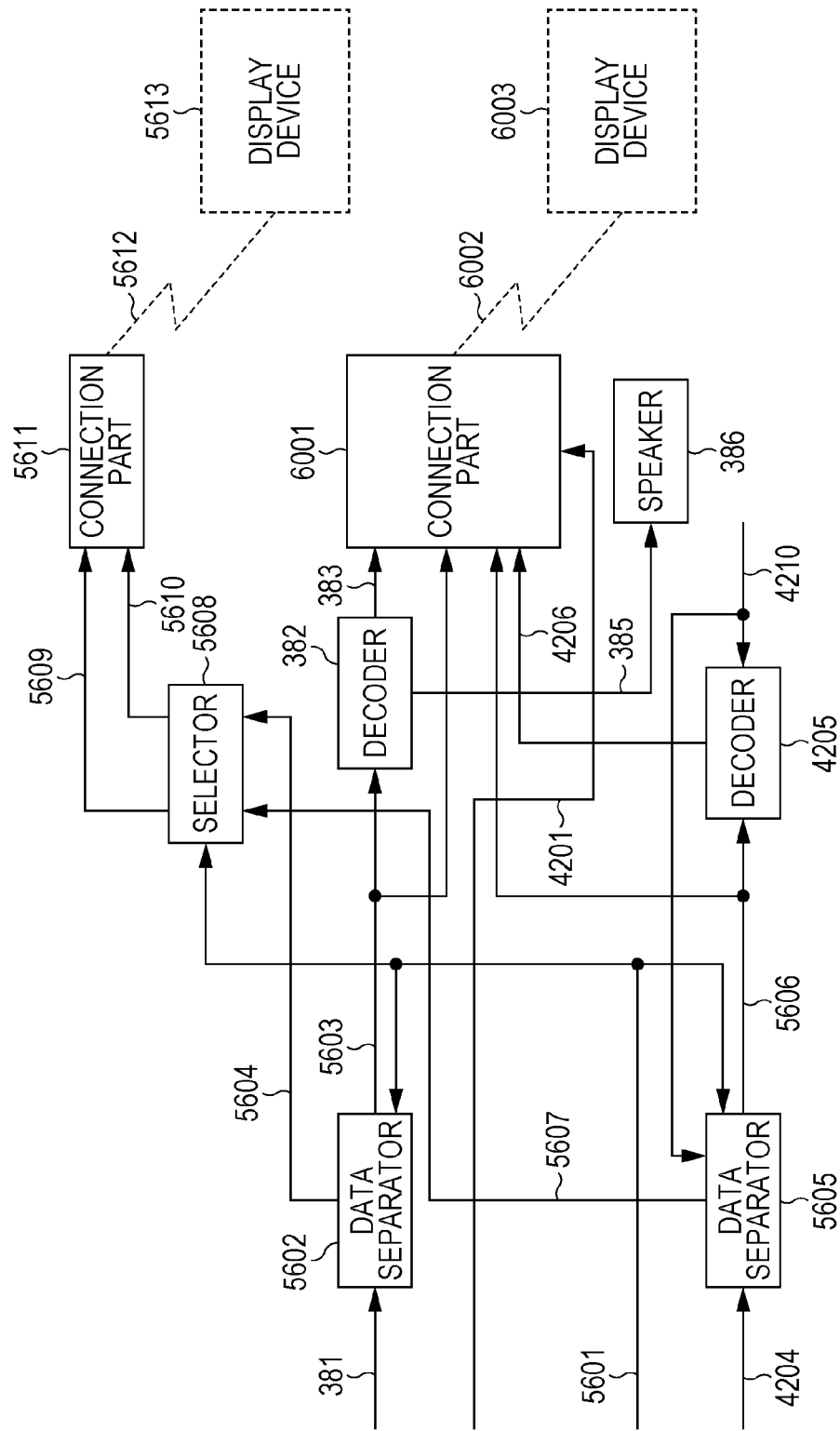
FIG. 60 is a view illustrating a configuration example of a periphery of a display.

FIG. 60 illustrates a configuration example of a periphery of the display in the terminal device of FIG. 42. In FIG. 60, the component operated similarly to FIGS. 3, 42, and 56 is designated by the identical reference mark.

In the case that the terminal device has the configuration in FIG. 56, display device 6003 performs one of "first video is displayed", "second video is displayed", "first video and second video are displayed", "{first video} and {display screen based on at least one of character information (telegram information), still image information, and URL information} are displayed", "{second video} and {display screen based on at least one of character information (telegram information), still image information, and URL information} are displayed", and "{display screen based on at least one of character information (telegram information), still image information, and URL information} is displayed".

Display device 5510 performs one of "first video is displayed", "second video is displayed", "first video and second video are displayed", "{first video} and {display screen based on at least one of character information (telegram information), still image information, and URL information} are displayed", "{second video} and {display screen based on at least one of character information (telegram information), still image information, and URL information} are displayed", and "{display screen based on at least one of character information (telegram information), still image information, and URL information} is displayed".

Data 381 and control signal 5601 are input to data separator (data controller) 5602. In the case that control signal 5504 indicates that "first video and/or audio information" and "second video and/or audio information" are displayed on the separate displays, for example, data separator (data controller) 5602 separates data 381 into the data associated with "first video and/or audio information" and the data associated with "second video and/or audio information", outputs the data associated with "first video and/or audio information" as data 5603, and outputs the data associated with "second video and/or audio information" as data 5604.

Data 5407 is input to decoder 382, and decoder 382 decodes data 5407, and outputs data 383 and audio data 385 of the first video.

Decoder 382 delivers the data associated with "second video and/or audio information" to display device 5613 through selector 5608 and connection part 5611 (connection 5612 may be either wireless or wired). Display device 5613 displays the second video (the second audio may be output from the speaker).

Another example will be described below.

Data 381 and control signal 5601 are input to data separator (data controller) 5602. In the case that control signal 5504 indicates that "first video and/or audio information" and "second video and/or audio information" are displayed on the separate displays, for example, data separator (data controller) 5602 separates data 381 into the data associated with "first video and/or audio information" and the data associated with "second video and/or audio information", outputs the data associated with "second video and/or audio information" as data 5603, and outputs the data associated with "first video and/or audio information" as data 5604.

Data 5407 is input to decoder 382, and decoder 382 decodes data 5407, and outputs data 383 and audio data 385 of the second video.

Decoder 382 delivers the data associated with "first video and/or audio information" to display device 5613 through selector 5608 and connection part 5611 (connection 5612 may be either wireless or wired). Display device 5613 displays the first video (the first audio may be output from the speaker).

"Received data 4204 of at least one of character information (telegram information) after packet (or frame) processing, still image information, and URL information", information 4210 from URL, and control signal 5601 are input to data separator (data controller) 5605.

In the case that control signal 5601 indicates that one of "received data 4204 of at least of character information (telegram information) after packet (or frame) processing, still image information, and URL information" and "information 4210 from URL" is displayed on display 384, data separator (data controller) 5605 outputs one of "received data 4204 of at least one of character information (telegram information) after packet (or frame) processing, still image information, and URL information" and "information 4210 from URL" as signal 5606.

In the case that control signal 5601 indicates that one of "received data 4204 of at least of character information (telegram information) after packet (or frame) processing, still image information, and URL information" and "information 4210 from URL" is displayed on display device 5510, data separator (data controller) 5605 outputs one of "received data 4204 of at least one of character information (telegram information) after packet (or frame) processing, still image information, and URL information" and "information 4210 from URL" as signal 5607.

Signals 5604 and 5607 and control signal 5601 are input to selector 5608, and selector 5608 outputs the display information displayed on display device 5613 and the information about sound output from the speaker as outputs 5609 and 5610 based on control signal 5601.

Signals 5609 and 5610 are transferred to display device 5613 through connection part 5611.

Connection part 5901 is connected (5902) to display device 5903, and display device 5903 outputs the audio from the speaker while displaying the video (connection 5902 may be either wireless or wired).

The plurality of screens may be displayed on display device 5903 as described in the above example. The terminal device partially transfers the display information to display device 5613, and display device 5613 may display the video (or screen). For example, the display method may be controlled by control signal 5601.

Control signal 5601 may include control information switching between the case that the first video and the second video are displayed as described above and the case that the first video and the second video are displayed on display device 5903 as described in other exemplary embodiments. Control signal 5601 may include control information adjusting the display timing of display device 5903 and display device 5613.

In the sixth exemplary embodiment, the terminal device can be connected to the first display device and the second display device. At this point, the two videos may be displayed in a way different from the sixth exemplary embodiment using the first display device and the second display device. For example, the video transmitted from the broadcasting station is displayed on the first display device, and the video linked with the video, the character information, or the still image (with or without character) may be displayed on the second display device. The video transmitted from the broadcasting station is displayed on the second display device, and the video linked with the video, the character information, or the still image (with or without character) may be displayed on the first display device. The transfer method of the fifth exemplary embodiment may be adopted during the data transfer.

Therefore, the terminal device can obtain the data with high reception quality, and the highly flexible broadcasting system (multicast system) can be constructed.

A transmission method except for that of the fifth exemplary embodiment may be adopted in the broadcasting station. At this point, the broadcasting station switches between the transmission method of the fifth exemplary embodiment and the transmission method except for that of the fifth exemplary embodiment.

(Supplement 1)

Although the term "video (and/or audio (audio) information)" is described in the present disclosure, the above exemplary embodiments are implemented on the assumption that the video information is included in the transmitted/received information.

Although the term "audio" is described in the present disclosure, the above exemplary embodiments can be implemented even if the "audio" is voice, sound, and the like.

In the description, for example, the display is described as the configuration of the reception device of the terminal device in FIGS. 3, 28, 33, 37, 39, 42, 49, and 52. However, the terminal device needs not to include the display. For example, a configuration of "the terminal device including the terminal from which the video and/or audio data is output", "the terminal device including the storage (such as a hard disk, a semiconductor memory, and a disk) in which the video and/or audio data is stored" is considered as the terminal device (at this point, the video and/or audio data may be the data obtained through a reception operation with the terminal device or the data in which the data obtained through a reception operation with the terminal device is subjected to the format conversion).

For example, the display is described as the configuration of the reception device of the terminal device in FIGS. 3, 28, 33, 37, 39, 42, 49, and 52. However, when the terminal device does not include the display, the terminal device includes an output part that outputs "video and/or audio data", and the user can view the video and/or audio by connecting the display device of the output part.

The above exemplary embodiments may be implemented while a plurality of other contents are combined with each other.

The above exemplary embodiments and other contents are described only by way of example. For example, even if "modulation scheme, error correction coding scheme (such as the error correction code, code length, and code rate used), and control information" are illustrated, the exemplary embodiments can be implemented by the similar configuration when another "modulation scheme, error correction coding scheme (such as the error correction code, code length, and code rate used), and control information" is applied.

A symbol used to transfer the control information (such as the information about the transmission method) and a symbol, such as a preamble, a pilot symbol, a reference symbol, a unique word, and a postamble, which is used to perform the demodulation, may be included in each packet and each frame in addition to the data (information) (however, the symbols may flexibly be named, and the function may be satisfied).

In the above exemplary embodiments, the broadcasting station wirelessly transfers the data. At this point, any transmission method may be adopted. Examples of the transmission method include a transmission method in which the single carrier is used, a multi-carrier transfer method such as an OFDM (Orthogonal Frequency Division Multiplexing) scheme, and a transmission method in which pre-coding or temporal space (or time-frequency) coding (such as temporal space block coding (space-time block codes)) is performed to transmit the plurality of modulated signals at the identical clock time and the identical frequency. A method in which the data is transferred using a cable may be adopted in the broadcasting station.

In the above exemplary embodiments, the transmission device of the telecommunications line provider transfers the data in the wired manner by way of example. Alternatively, the data may wirelessly be transferred. Both the wired transfer and the wireless transfer may be used.

In the above exemplary embodiments, the reception device and antenna of the terminal device may be separated from each other. For example, the reception device includes an interface to which the signal received from the antenna or the signal, in which the frequency conversion is performed on the signal received from the antenna, is input through a cable, and the reception device performs the subsequent processing.

The data and information obtained with the reception device are converted into the video and video, displayed on the monitor, or output from the speaker. The data and information obtained with the reception device may be subjected to signal processing associated with the video and audio (or need not to be subjected to the signal processing), and output from an RCA terminal (video terminal and audio terminal), a USB (Universal Serial Bus), an HDMI (registered trademark) 2.0, and a digital terminal, which are included in the reception device.

In the description, it is considered that a communication device such as a television set, a radio, the terminal device, a personal computer, a mobile phone, an access point, and a base station includes the reception device. It is considered that the transmission device and reception device of the present disclosure are equipment having a communication function, and that the equipment can be connected to a device, such as the television set, the radio set, the personal computer, and the mobile phone, which executes an application through a certain interface.

The present disclosure is not limited to each exemplary embodiment, but various changes can be made. For example, each exemplary embodiment is implemented as the communication device. Alternatively, the communication method can be performed as software.

For both the transmit antenna of the transmission device and the receive antenna of the reception device, one antenna illustrated in the drawings may include the plurality of antennas.

For example, a program executing the communication method may previously be stored in a ROM (Read Only Memory), and executed by a CPU (Central Processor Unit).

The program executing the communication method is stored in a computer-readable storage medium, the program stored in the storage medium is recorded in a RAM (Random Access Memory), and a computer may be operated according to the program.

Each configuration of the above exemplary embodiments may typically be implemented as an LSI (Large Scale Integration) of an integrated circuit including an input terminal and an output terminal. The configuration may separately be formed into one chip, or all or some of the configurations of each of the above exemplary embodiments may be formed into one chip.

Sometimes the LSI is also referred to as an IC (Integrated Circuit), a system LSI, a super LSI, and an ultra LSI depending on integration. A circuit integration technique is not limited to the LSI, but the configuration may be implemented as a dedicated circuit or a general-purpose processor. A programmable FPGA (Field Programmable Gate Array) or a reconfigurable processor that can reconfigure the connection or setting of circuit cell in the LSI may be used after production of the LSI.

When a circuit integration technology that replaces the LSI emerges with the progress of a semiconductor technology or a derivative technology, the functional blocks may be integrated using the technology. A biotechnology might be applied.

(Supplement 2)

In the first to third exemplary embodiments, by way of example, each of the broadcasting station and the telecommunications line provider transfers the content through one or the plurality of paths (transmission mediums). For example, the control of the transmission timing described in the first to third exemplary embodiments may be applied in the case that the broadcasting station transmits the content through the plurality of transmission mediums, or in the case that the telecommunications line provider transfers the content through the plurality of paths.

For example, telecommunications line provider #1 and telecommunications line provider #2 may transfer the contents through the plurality of paths (transmission mediums), or broadcasting station #1 and broadcasting station #2 may transfer the contents through the plurality of paths (transmission mediums). Alternatively, at least two broadcasting stations may transfer the contents through the plurality of paths (transmission mediums).

For example, in the case that the telecommunications line provider (the transmission station and the base station) transmits the content through the plurality of different paths including a first path and a second path, the transmission device of the telecommunications line provider may control the transmission timing of one of or both the packet group transmitted through the first path and the packet group transmitted through the second path according to a difference between a first time until the data arrives at the terminal device through the first path since the transmission device transmits the data and a second time until the data arrives at the terminal device through the second path since the transmission device transmits the data. That is, the time division is performed (however, at least a part of the packets may simultaneously be transmitted), and the packet groups are delivered to the terminal device using the plurality of communication paths. As described above, each of the packet groups includes the information whether the packet-level error correction coding is performed.

As long as at least parts of the first path and second path differ from each other, remaining parts of the first path and second path may be identical to each other. Sometimes a difference in time between the transmission device and the terminal device until the data arrives at the terminal device since the transmission device transmits the data is generated due to the use of different transfer mediums or protocols between relay devices. In such cases, the transmission timing may be controlled while the identical relay devices on the path are regarded as different paths.

On the other hand, sometimes the difference in time between the transmission device and the terminal device until the data arrives at the terminal device since the transmission device transmits the data is actually small even if the pieces of data are transmitted through different relay devices. In such cases, the different relay devices may be dealt with as the identical path. For example, although the contents are actually transferred through at least three paths, at least the three paths can be classified into a first group in which the time until the data arrives at the terminal device since the transmission device transmits the data is included in a first range and a second group in which the time until the data arrives at the terminal device since the transmission device transmits the data is included in a second range. In such cases, the transmission timing may be controlled while the first group and the second group are regarded as the first path and the second path.

The transmission device that transmits the packet group through the first path may be identical to or different from the transmission device that transmits the packet group through the second path.

Therefore, the generation of the disturbance of the synchronously-played back content can be suppressed. The circuit scale can be reduced in the terminal device.

In the first to third exemplary embodiments, by way of example, the multiangle first and second videos photographed with the plurality of cameras are transmitted from the broadcasting station and the telecommunications line provider, respectively. The transmitted contents are not necessarily the multiangle first and second videos. When the necessity to synchronously play back the data transmitted through each path arises, the generation of the disturbance of the synchronously-played back content is suppressed by controlling the transmission timing described in the first to third exemplary embodiments.

For example, the synchronously-played back audio and video may be transferred through different paths, or the coded data generated by the coding of the video is separated into a first stream and a second stream, and the separated first stream and second stream may be transmitted through different paths. The first stream may solely include the coded data in a first hierarchy in which the data can be played back as a low-quality video, and the second stream may include the coded data in a second hierarchy in which the data can be played back as a high-quality video in combination with the coded data in the first hierarchy. Alternatively, both the first stream and second stream may include the coded data that needs to be played back in combination with the coded data included in the other stream. The second stream may include the identical coded data with respect to at least a part of the coded data included in the first stream.

The method for controlling the transmission timing described in Supplement 2 may be performed while combined with one or a plurality of the fourth to sixth exemplary embodiments.

In the present disclosure, the service provided by the multi-cast is mainly described by way of example. However, the present disclosure can also be applied to the service provided by the uni-cast. That is, the plurality of telecommunications line providers may transmit the packet groups through the plurality of paths. At this point, the terminal device performs a feedback to each telecommunications line provider, and the telecommunications line provider may receive a request to re-transmit the packet.

For example, the present disclosure is useful for the transfer of the information about the high-quality video in the broadcasting and communication cooperation service.

What is claimed is:

1. A receiving device comprising:
   a receiver configured to:
      receive a first frame from a transmission device over radio waves, the first frame including parity bits; and
      receive a second frame from the transmission device over radio waves, the second frame including information bits, the second frame being transmitted delayed from transmission of the first frame by a delay time corresponding to frame processing; and a processor coupled to the receiver and configured to:
  rearrange the information bits; and
  perform error correction decoding on the parity bits and the information bits rearranged to derive information.

2. A transmission method, performed by a transmission device, comprising:
  performing error correction coding on information to generate a first frame and a second frame including parity bits and information bits, respectively;
  performing a first transmission in which the first frame is transmitted over radio waves; and
  performing a second transmission in which the second frame is transmitted over radio waves, wherein
  the first transmission is performed in advance of the second transmission by a delay time, the delay time corresponding to frame processing.

3. The transmission method according to claim 2, wherein the second transmission is performed in a state where the information bits are rearranged.

* * * * *